US012509913B2

(12) United States Patent
Peters et al.

(10) Patent No.: US 12,509,913 B2
(45) Date of Patent: Dec. 30, 2025

(54) DEADBOLT CONTROL AND SECURITY SYSTEMS

(71) Applicant: Imperium Electronics, LLC, Portland, OR (US)

(72) Inventors: Ron A. Peters, Tigard, OR (US); Quentin Theodore Pierce, Forest Grove, OR (US); Kim Alan Foster, Oregon City, OR (US); Jason Plankers, Milwaukie, OR (US)

(73) Assignee: IMPERIUM ELECTRONICS, LLC, Portland, OR (US)

( * ) Notice: Subject to any disclaimer, the term of this patent is extended or adjusted under 35 U.S.C. 154(b) by 166 days.

(21) Appl. No.: 17/943,043

(22) Filed: Sep. 12, 2022

(65) Prior Publication Data

US 2023/0082726 A1 Mar. 16, 2023

Related U.S. Application Data

(60) Provisional application No. 63/243,265, filed on Sep. 13, 2021.

(51) Int. Cl.
*E05B 47/00* (2006.01)
*E05B 63/00* (2006.01)

(52) U.S. Cl.
CPC ...... *E05B 47/0012* (2013.01); *E05B 63/0017* (2013.01); *E05B 2047/0017* (2013.01);
(Continued)

(58) Field of Classification Search
CPC ................. E05B 47/00; E05B 47/0012; E05B 2047/0014–0018; E05B 2047/002;
(Continued)

(56) References Cited

U.S. PATENT DOCUMENTS 4,272,974 A 6/1981 Hennessy
4,290,282 A 9/1981 Wildenradt
(Continued)

FOREIGN PATENT DOCUMENTS

WO 2018212979 11/2018

OTHER PUBLICATIONS

August Smart Lock; "Smart Lock + Connect"; product description; at least as early as Feb. 6, 2020; 4 pages; August Smart Lock website; https://august.com/products/august-smart-lock-3rd-generation.
(Continued)

*Primary Examiner* — Nathan Cumar
(74) *Attorney, Agent, or Firm* — LAW OFFICE OF KAREN DANA OSTER, LLC

(57) ABSTRACT

A deadbolt control and security system for preventing rotation of a deadbolt manual egress handle of a deadbolt lock is described herein. The system preferably includes a deadbolt interface unit and at least one actuator unit. The deadbolt interface unit has a manual mode (the deadbolt interface unit manual egress handle controlling locking and unlocking the deadbolt lock) and a remote mode (the at least one actuator unit controlling locking and unlocking the deadbolt lock). The deadbolt interface unit includes: a deadbolt interface unit manual egress handle; a gear train having a shaft coordinated with the deadbolt interface unit manual egress handle; a unit-handle coupler that interfaces between the deadbolt manual egress handle and the deadbolt interface unit manual egress handle via the shaft; and a clutch. Preferred systems prevent the deadbolt lock from being unlocked using keys and/or other bypass tools.

12 Claims, 59 Drawing Sheets

(52) U.S. Cl.
CPC . *E05B 2047/002* (2013.01); *E05B 2047/0026* (2013.01); *E05B 2047/0091* (2013.01)

(58) Field of Classification Search
CPC ..... E05B 2047/0026; E05B 2047/0091; E05B 63/00; E05B 63/0017; E05B 63/0021
USPC .......................................................... 70/279.1
See application file for complete search history.

(56) References Cited

U.S. PATENT DOCUMENTS

| | | | | |
|---|---|---|---|---|
| 4,438,962 | A | 3/1984 | Soloviff et al. | |
| 4,489,576 | A | 12/1984 | Mullich et al. | |
| 4,662,665 | A | 5/1987 | Lin | |
| 5,226,852 | A | 7/1993 | Asaba et al. | |
| 5,678,436 | A | 10/1997 | Alexander | |
| 5,765,412 | A | 6/1998 | Koskela et al. | |
| 5,997,054 | A | 12/1999 | Baudu et al. | |
| 6,216,502 | B1 | 4/2001 | Cannella et al. | |
| 7,373,795 | B2 | 5/2008 | Kilbourne | |
| 7,695,032 | B2 | 4/2010 | Bodily | |
| 8,736,120 | B2 | 5/2014 | Maeda et al. | |
| 9,644,398 | B1 | 5/2017 | Cheng et al. | |
| 9,982,461 | B1 | 5/2018 | Kilbourne | |
| 10,087,656 | B1 | 10/2018 | Cannella | |
| 10,127,752 | B2 | 11/2018 | Ribas et al. | |
| 10,273,718 | B2 | 4/2019 | Cannella | |
| 10,445,999 | B2 | 10/2019 | Johnson et al. | |
| 2003/0094023 | A1* | 5/2003 | Emiel Van Parys | E05B 47/0012 70/257 |
| 2008/0296912 | A1 | 12/2008 | Whitner et al. | |
| 2013/0192316 | A1* | 8/2013 | McKibben | E05B 47/02 70/279.1 |
| 2017/0002585 | A1* | 1/2017 | Ku | E05B 47/0012 |
| 2017/0002586 | A1 | 1/2017 | Lee | |
| 2018/0372326 | A1* | 12/2018 | Park | F27D 21/02 |
| 2019/0264465 | A1 | 8/2019 | Adje | |

OTHER PUBLICATIONS

Instalock; "Turn Your Dumb Lock into a Smart lock.TM—Remote Keyless Entry for Your Home Door"; webpage entry; 2020; 10 pages; article available online at: https://www.instalock.com.

Johnson, Dave; "How tech-savvy thieves can steal your house keys"; CBS news article; Aug. 25, 2014; 2 pages; news article available at https://www.cbsnews.com/news/how-tech-savvy-thieves-can-steal-your-house-keys/.

Purcher, Jack; "Apple Sued by Inventor of a Remote Control Electronic Deadbolt Keyless Entry System for Patent Infringement"; web article; at least as early as Oct. 31, 2017; 4 pages; Patently Apple website; available online at: https://www.patentlyapple.com/patently-apple/2017/10/apple-sued-by-the-inventor-of-a-remote-control-electronic-deadbolt-keyless-entry-system-for-patent-infringement.html.

Remotizer; "About Remotizer"; product description; at least as early as Feb. 6, 2020; 1 page; Remotizer website; available online at: http://www.remotizer.com/about.html.

Rossignol, Joe; "Creator of 'Remotizer' Keyless Entry System Sues Apple for Selling HomeKit-Enabled August Smart Lock"; web article; Oct. 30, 2017; 1 page; Mac Rumors website; available online at: https://www.macrumors.com/2017/10/30/kilbourne-vs-apple-august-smart-lock/.

Schlage; "Schlage Deadbolt Diagram"; diagram; accessed at least as early as Jul. 21, 2021; 1 page; Schlage website; available online at: http://www.harborcitysupply.net/images/products/detail/SchlageB60data.jpg.

United Locksmith; "6 Types of Door Locks Commonly Used on Residential Properties"; web article; Jan. 22, 2018; 8 pages; United Locksmith website; available online at: https://unitedlocksmith.net/blog/6-types-of-door-locks-that-are-commonly-used-on-residential-properties.

YouTube; "Easy No Tools Installation"; transcript of video available on Instalock website; Apr. 19, 2019; 2 pages; video available on YouTube at: https://www.instalock.com/.

* cited by examiner

FIG. 24C
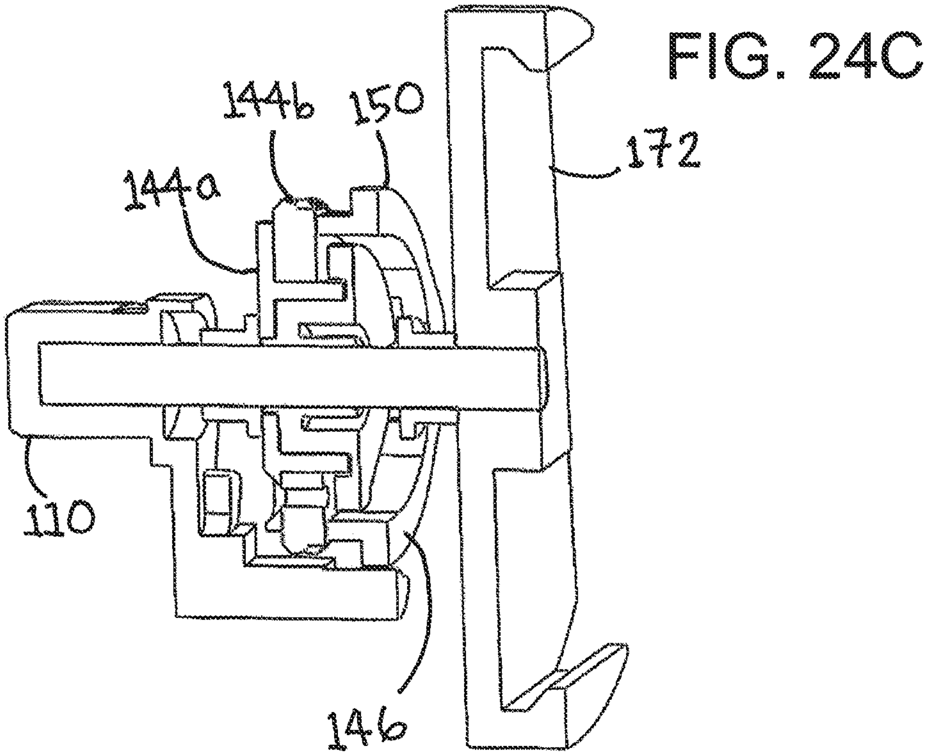
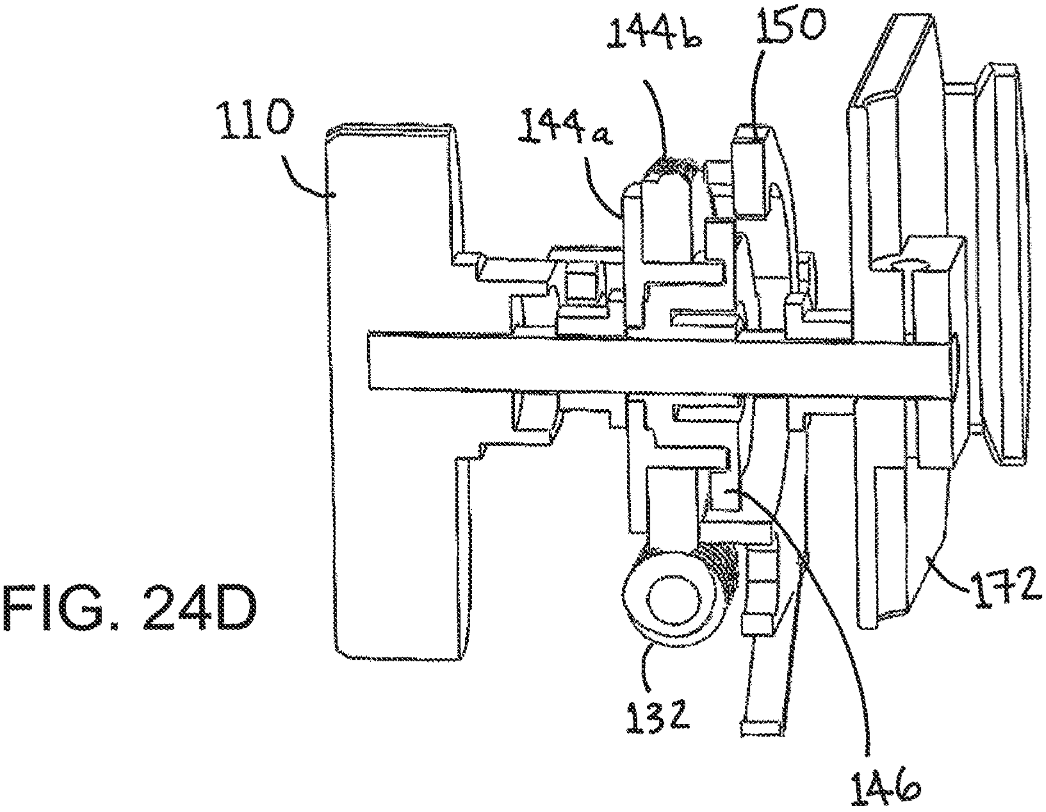
FIG. 24D

FIG. 26A
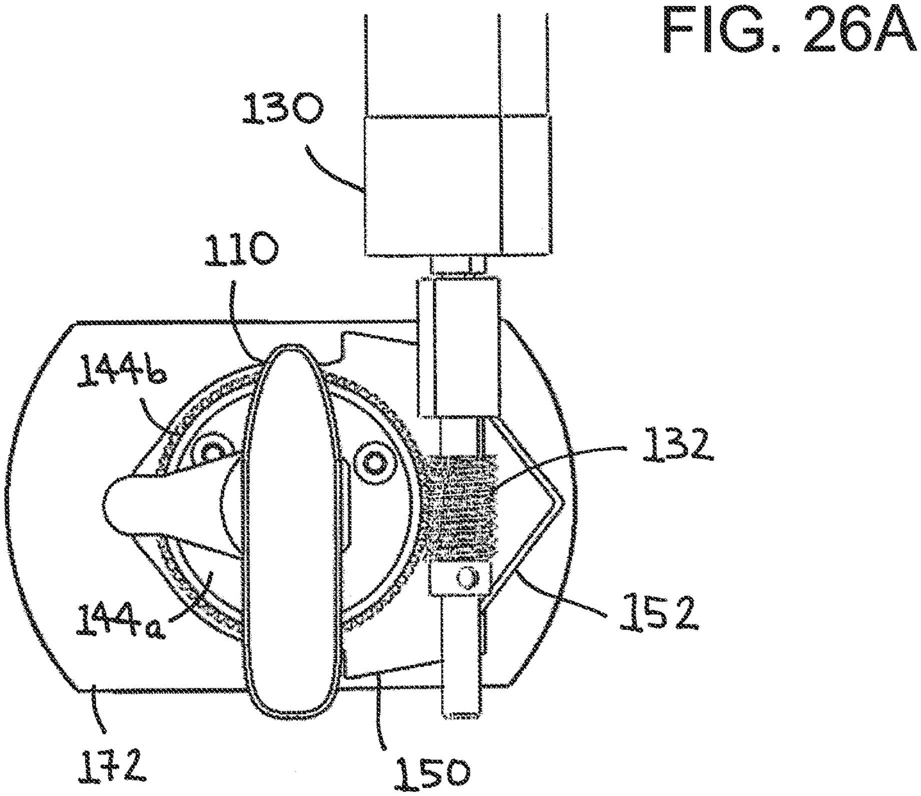
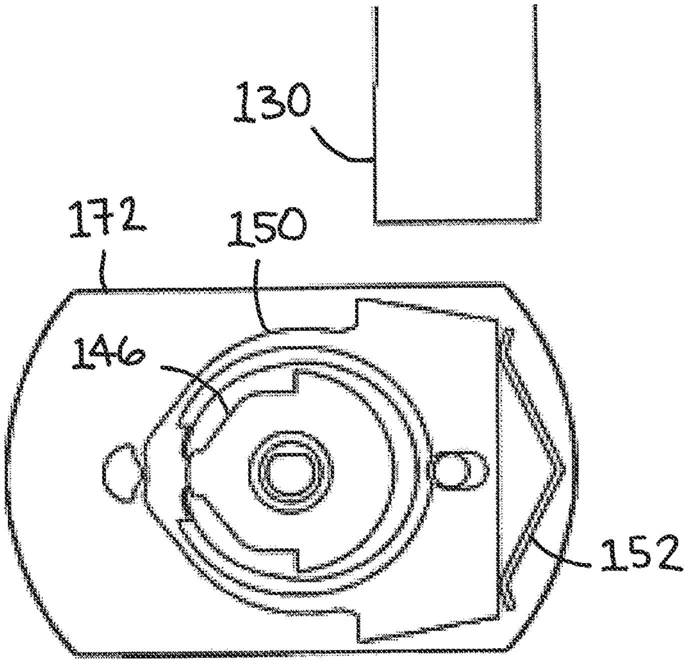
FIG. 26B

FIG. 26C
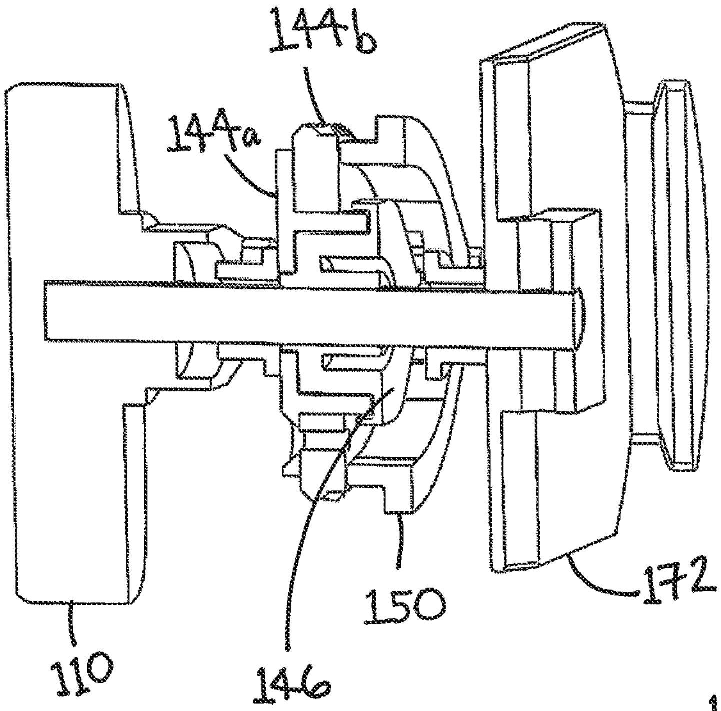
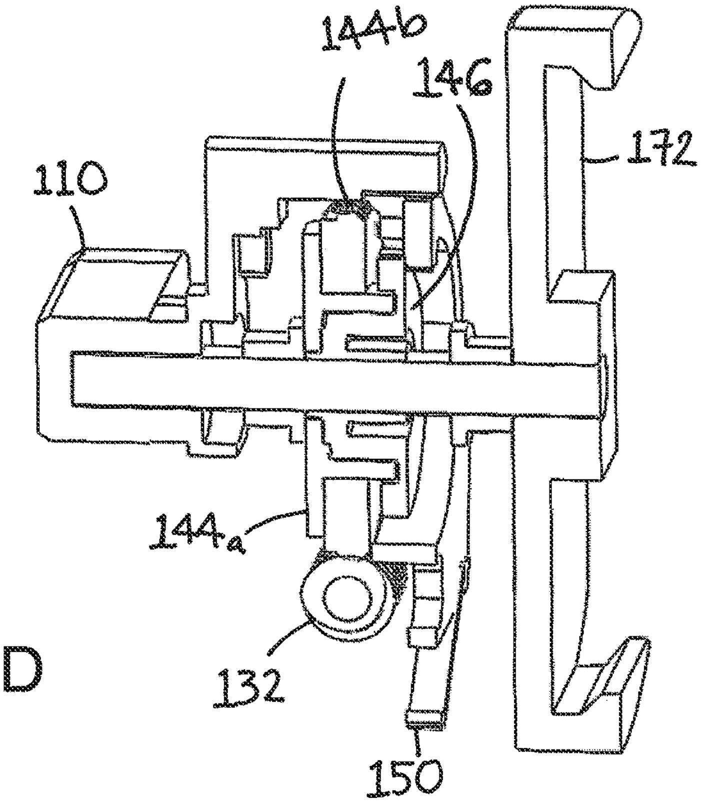
FIG. 26D

FIG. 27A
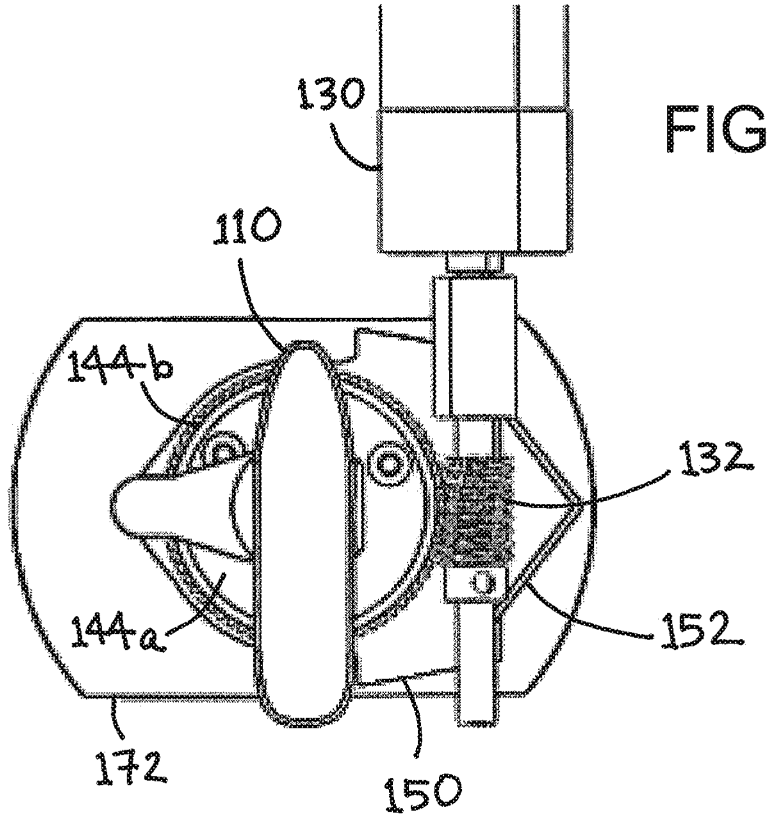
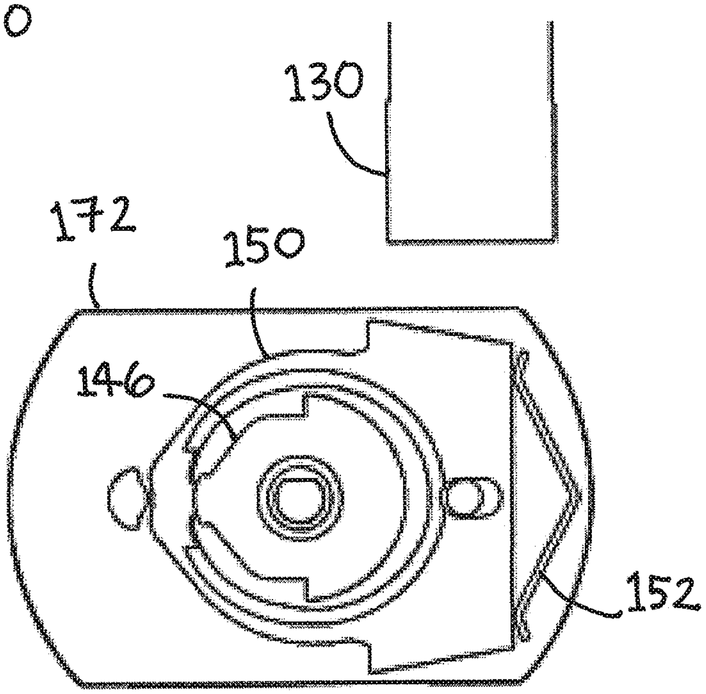
FIG. 27B

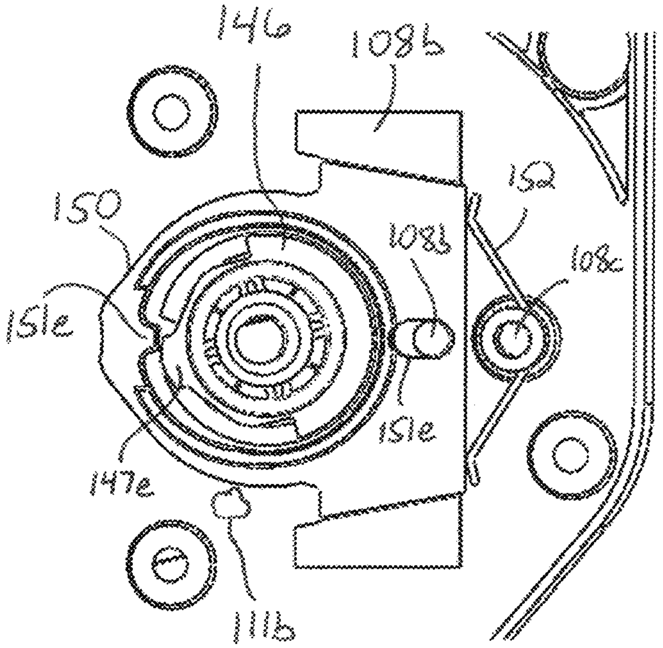
FIG. 42
FIG. 43
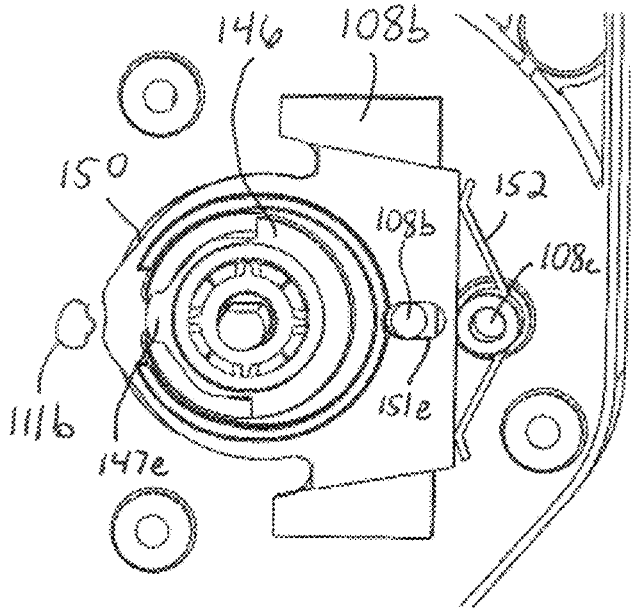

FIG. 44
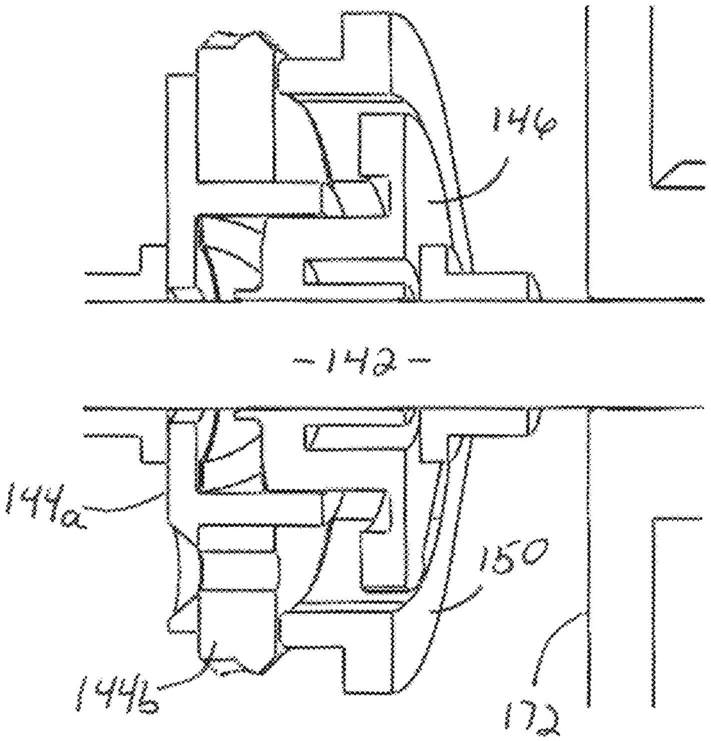
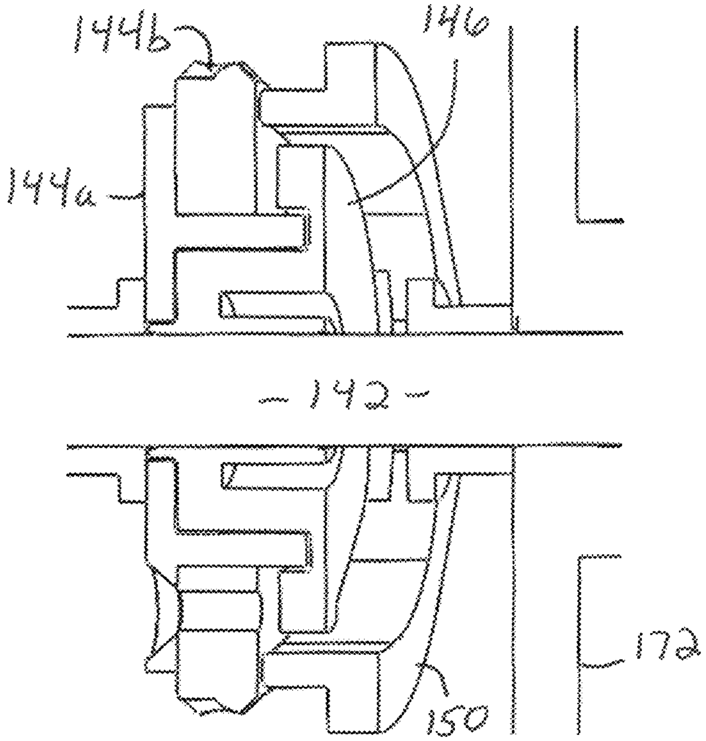
FIG. 45

Electronics Block Diagram

Firmware Logic Diagram

Motor Tapping Using the Encoder.

High level overview of the firmware's infinite loop.

main()
In main_LinkTo.c
And main_LinkListen.c

1. Global and extern variables are declared.
2. Initialization functions are called.
3. Radio Link information is restored.
4. Calls ProcessStateMachine()

ProcessStateMachine()
In StateMachine.c

1. The primary loop of the firmware.
2. This loop does not end.

The primary loop.

a. Determine if new devices have been added or deleted.
b. switch( StateMchineState )
c. The cases of this switch call the work functions.

FIG. 55

DEADBOLT CONTROL AND SECURITY SYSTEMS

The present application is an application claiming the benefit of U.S. Provisional Patent Application No. 63/243,265, filed Sep. 13, 2021. The present application is based on and claims priority from this application, the disclosure of which is hereby expressly incorporated herein by reference in its entirety.

COPYRIGHT NOTICE

A portion of the disclosure of this patent document contains material that is subject to copyright protection. The copyright owner has no objection to the facsimile reproduction of the patent disclosure as it appears in the Patent and Trademark Office patent files or records, but otherwise reserves all copyright rights whatsoever.

TECHNICAL FIELD

The present disclosure describes systems, apparatuses, and/or methods that generally relate to the technical field of control of a deadbolt lock associated with a door, and specifically relate to the technical field of deadbolt control and security systems that include a deadbolt interface unit and at least one actuator unit.

BACKGROUND

Deadbolt locks have traditionally been thought of as providing doors with an additional layer of security beyond a doorknob locking mechanism. Deadbolt locks can reduce the risk of forced entry by creating a secure lock system that makes it nearly impossible for a burglar to break in physically through the deadbolted door. Common deadbolt locks include a deadbolt assembly and at least one key slot cylinder (e.g. single cylinder locks have a single key slot cylinder and a manual egress handle, and double cylinder locks have two key slot cylinders).

A deadbolt assembly may be described using terminology from U.S. Pat. No. 5,765,412 to Koskela et al. and/or U.S. Pat. No. 7,695,032 to Bodily. A deadbolt assembly may include, for example, a projecting/retracting bolt (also referred to as a bolt) associated with a bolt extension (as shown in U.S. Pat. No. 5,765,412 to Koskela et al.) or a bolt bar (as shown in U.S. Pat. No. 7,695,032 to Bodily). The bolt extension or bolt bar may be associated with (e.g. integral with or attached to) and/or in line with (e.g. so as to extend from) the projecting/retracting bolt. The deadbolt assembly may also include a bolt housing (also referred to as a latch case) from which the projecting/retracting bolt projects and into which the projecting/retracting bolt retracts. At least one motion transfer mechanism (e.g. cams, levers, gears, and/or other mechanical connecters) associates the key slot cylinder (or at least one motion transfer mechanism associated with the key slot cylinder) with the projecting/retracting bolt (and/or the bolt extension or bolt bar). Rotating a key (in the key slot of the key slot cylinder) or a manual egress handle in a first direction causes the projecting/retracting bolt to selectively project beyond the bolt housing and into the latch bore (the cavity in the door jamb covered by the strike plate) such that the deadbolt lock is in a locked position. Rotating the key (in the key slot of the key slot cylinder) or the manual egress handle in a second direction causes the projecting/retracting bolt to selectively retract into the bolt housing (removing the projecting/retracting bolt from the latch bore such that the deadbolt lock is in an unlocked position).

Single cylinder locks have a key slot cylinder on a first side of the door and a manual egress handle (also referred to as a twist knob, turn piece, and thumb turn) associated with a second side of the door. The key slot cylinder is associated with the first side of the door, which is generally the external or outside of a room or building. The manual egress handle is associated with the second side of the door, which is generally the internal or inside of a room or building. Exemplary single cylinder deadbolt locks are shown and described in U.S. Pat. No. 4,290,282 to Wildenradt and U.S. Pat. No. 4,438,962 to Soloviff et al.

Double cylinder locks have a key slot cylinder on both sides of the door. Double cylinder locks, therefore, require the use of a key on both sides of the door. Double cylinder locks are particularly suited for use in places where it is undesirable to allow unauthorized people to lock the door from the inside (e.g. a public building). Double cylinder locks also prevent unwanted unlocking of the door by forced access to the interior manual egress handle (via a nearby window, for example). Exemplary double cylinder deadbolt locks are shown and described in U.S. Pat. No. 4,272,974 to Hennessy and U.S. Pat. No. 4,489,576 to Mullich et al.

Each key slot cylinder may include, for example, a cylinder body with a key slot at one end and at least one motion transfer mechanism at the other end. Within the cylinder body, there may be several spring-loaded pins that move when a correctly fitted key is inserted and rotated. A key is preferably designed with key characteristics (e.g. notches and grooves) to fit the cylinder correctly. A correctly fitted key can rotate a deadbolt lock between the locked position and the unlocked position.

Similar to a key associated with a key slot cylinder, turning a manual egress handle can transition the deadbolt lock between the locked position and the unlocked position. Manual egress handles may be appropriate when a key is not needed and/or wanted. For example, manual egress handles may be preferred for internal portions of buildings that are generally more secure than external portions of a building. Also, being able to lock and unlock a door from the inside without a key can be a significant safety feature allowing an occupant to leave a room quickly in the event of an emergency (e.g. a fire) without having to locate the key. The manual egress handle can rotate a deadbolt lock between the locked position and the unlocked position.

Many devices and systems have been invented to improve upon traditional deadbolt locks. A few examples of such systems include, but are not limited to:

- U.S. Pat. No. 5,678,436 to Alexander, entitled Remote Control Door Lock System;
- U.S. Pat. No. 9,644,398 to Cheng et al., entitled Intelligent Door Lock System with a Haptic Device;
- U.S. Pat. No. 9,982,461 to Kilbourne, entitled Deadbolt and Passage Lock Adapter;
- U.S. Pat. No. 10,445,999 to Johnson et al., entitled Security System Coupled to a Door Lock System;
- U.S. Patent Application Publication No. 2008/0296912 to Whitner et al., entitled Remote Door Access Device;
- U.S. Patent Application Publication No. 2017/0002586 to Lee, entitled Installation-Free Rechargeable Door Locking Apparatus Systems and Methods; and
- U.S. Patent Application Publication No. 2019/0264465 to Adje, entitled Electronic Deadbolt and Key Fob.

Each of these systems have one or more problems including, but not limited to, complicated or time-consuming physical installation (e.g. requiring tools and/or partial disassembly of the deadbolt lock), wasting existing deadbolt locks (e.g. a complete replacement), requiring additional holes to be added to the door, difficult battery replacement, complicated manual egress, complicated or time-consuming software installation, introduction of vulnerabilities to hacking (e.g. through the use of Smartphone applications entrusted to a third party), and/or not solving security threats such as lock picking and/or copied or otherwise obtained physical keys.

InstaLOCK is a keyless smart remote that is described at https://www.instalock.com/and in U.S. Pat. Nos. 6,216,502, 10,087,656, and PCT International Publication No. WO2018/212979 in which Thomas Canella is listed as at least one of the inventors. The keyless locking system is used with a door having an existing rotatable deadbolt lock. The keyless locking system has a housing that has a front plate, a rear plate, and a periphery therebetween forming a chamber. A plurality of magnets removably couple the housing to a door. The door has an exterior surface with a rotatable existing deadbolt lock. A drive train sub-assembly with a motor is within the chamber. A power transfer sub-assembly is also within the chamber. The power transfer sub-assembly includes an elastomeric component and a C-channel positionable over the existing rotatable deadbolt lock. Rotational motive force of the motor is transferred from the actuator to the C-channel shaped element. The power transfer sub-assembly is powered by the drive train sub-assembly. A control member is adapted to be pressed to power the motor to rotate the C-channel and the existing deadbolt lock. One of its "features" is that it allows a homeowner to continue to use the deadbolt lock's existing key for outside access.

Although deadbolt locks can reduce the risk of forced physical entry, they still have known security threats. Several of these security threats originate with the use of a key for outside access. A first exemplary security threat involves the use of lock-picking tools such as "bump keys" (specially cut keys that can fit into most cylinder locks) and lock pick key tools to open a locked deadbolt lock, both of which are readily available through online stores, and bypass tools. A second exemplary security threat is the duplication of the homeowner's physical key. Criminals no longer even require a physical key to duplicate a homeowner's key. Online locksmiths and/or related smart phone applications use a photograph of the key to create a physical copy that can be mailed to a criminal. With 3D printing, the duplication service is not even required for the process of creating a key from a photograph. A third exemplary security threat involves keys that the homeowner lost or gave to no longer trustworthy individuals (e.g. an ex-boyfriend, a disgruntled housekeeper), as well as keys entrusted to contractors, but which are not returned, especially on new home construction. These lost or un-retrieved keys can be used unless the lock is re-keyed or replaced, both of which are expensive. Small unit landlords may not re-key locks when tenants move out, leaving the new tenant vulnerable to break-ins via use of keys in the possession of the former tenant.

SUMMARY

The present disclosure describes systems, apparatuses, and/or methods that generally relate to the technical field of control of a deadbolt lock associated with a door, and specifically relate to the technical field of deadbolt control and security systems that include a deadbolt interface unit and at least one actuator unit.

Described herein is a deadbolt control and security system for preventing rotation of a deadbolt manual egress handle of a deadbolt lock. The deadbolt control and security system preferably includes a deadbolt interface unit having a manual mode and a remote mode and at least one actuator unit. The deadbolt interface unit preferably includes: (i) a deadbolt interface unit manual egress handle; (ii) a gear train having a shaft coordinated with the deadbolt interface unit manual egress handle; (iii) a unit-handle coupler that interfaces between the deadbolt manual egress handle and the deadbolt interface unit manual egress handle via the shaft; (iv) a motor; (v) a power source; and (vi) a clutch. In the manual mode, the deadbolt interface unit manual egress handle controls locking and unlocking the deadbolt lock. In the remote mode, the at least one actuator unit controls locking and unlocking the deadbolt lock.

Preferably, the deadbolt interface unit prevents unlocking of the deadbolt lock using a key.

Preferably, the deadbolt interface unit prevents the deadbolt lock from being unlocked using lock picking tools, bump keys, or other bypass tools.

As mentioned, some deadbolt control and security systems described herein include a manual mode and a remote mode. The manual mode has a manual locking function in which the deadbolt interface unit manual egress handle locks the deadbolt lock. The manual mode has a manual unlocking function in which the deadbolt interface unit manual egress handle unlocks the deadbolt lock. The remote mode has a remote locking function in which the at least one actuator unit locks the deadbolt lock. The remote mode has a remote unlocking function in which the at least one actuator unit unlocks the deadbolt lock.

For some deadbolt control and security systems described herein the shaft is a coordinated shaft.

Some unit-handle couplers described herein include: (a) an adapter; (b) a coupling lock slide; and (c) a coupling insert functionally connecting the adapter and the coupling lock slide. The adapter may be selectively attachable to the deadbolt manual egress handle. The coupling lock slide is preferably coordinated to the shaft. The coupling insert preferably transmits torque and accommodates misalignment between the adapter and the coupling lock slide.

Some gear trains described herein include: (a) the shaft; (b) the deadbolt interface unit manual egress handle; (c) a worm wheel rotated by a worm gear rotated by the motor; (d) a passage control plate; and (e) a drive crown coordinated to the shaft. Movement of the deadbolt interface unit manual egress handle controls movement of the passage control plate. Movement of the passage control plate allows the drive crown to move independently from the worm wheel.

For some deadbolt control and security systems described herein, the deadbolt interface unit manual egress handle preferably includes a gripping portion and a downwardly projecting leg. Further, the gear train may include: the shaft; the deadbolt interface unit manual egress handle; a worm wheel rotated by a worm gear rotated by the motor; a passage control plate, and a drive crown. The downwardly projecting leg moves the passage control plate when the deadbolt interface unit manual egress handle is rotated. Movement of the passage control plate allows the drive crown to move independently from the worm wheel. Rotating the deadbolt interface unit manual egress handle causes the shaft, the unit-handle coupler, and the deadbolt manual egress handle to rotate.

For some deadbolt control and security systems described herein, the clutch preferably includes the motor, a worm gear rotated by the motor, a worm wheel rotated by the worm gear, a drive crown, and a passage control plate. The clutch is for selectively connecting and disconnecting the drive crown from the worm wheel. Preferably, this allows the drive crown to move independently of the worm wheel when the worm wheel and the drive crown are disconnected for rotation in the manual mode. Preferably, the drive crown and the worm wheel move in tandem when the worm wheel and the drive crown are connected for rotation in the remote mode. Preferably, the drive crown and the worm wheel are held in place together when the worm wheel and the drive crown are connected for rotation in the remote mode.

For some deadbolt control and security systems described herein, the clutch preferably includes the motor, a worm gear rotated by the motor, a worm wheel rotated by the worm gear, a drive crown, and a passage control plate. Preferably, movement of the deadbolt interface unit manual egress handle controls movement of the passage control plate. Preferably, the worm wheel and the drive crown connect or disconnect in response to movement of the passage control plate. Preferably, the drive crown moves independently of the worm wheel when the worm wheel and the drive crown are disconnected for rotation in the manual mode. Preferably, the drive crown and the worm wheel move in tandem or are held in place together when the worm wheel and the drive crown are connected for rotation in the remote mode.

For some of the deadbolt control and security systems described herein, the deadbolt interface unit associated with a deadbolt interface unit controller, a deadbolt interface unit transceiver, and a deadbolt interface unit motor driver for driving the motor. The at least one actuator unit is preferably associated with an actuator unit controller and an actuator unit transceiver. The deadbolt interface unit is preferably remotely associated with the at least one actuator unit via signals between the deadbolt interface unit transceiver and the actuator unit transceiver. The deadbolt interface unit transceiver may communicate with the actuator unit transceiver of each the at least one actuator unit using an encoded RF signal (which may be an AES 128-bit encoded RF signal).

The at least one actuator unit may include a vibration motor for provide tactile feedback.

The at least one actuator unit may uniquely and mutually have a resettable pairing with the deadbolt interface unit.

An exemplary deadbolt control and security system for preventing rotation of a deadbolt manual egress handle of a deadbolt lock includes a deadbolt interface unit and at least one actuator unit. The deadbolt interface unit preferably has a manual mode and a remote mode. The manual mode preferably has a manual locking function and a manual unlocking function for controlling locking and unlocking the deadbolt lock. The remote mode preferably has a remote locking function and a remote unlocking function for controlling locking and unlocking the deadbolt lock. The deadbolt interface unit preferably includes: a deadbolt interface unit manual egress handle, a motor, a gear train, a clutch, a power source, and a unit-handle coupler. The deadbolt interface unit manual egress handle maybe used in the manual mode such that turning the deadbolt interface unit manual egress handle controls locking and unlocking the deadbolt lock. The gear train preferably includes a shaft, the deadbolt interface unit manual egress handle coordinated to the shaft, a worm wheel rotated by a worm gear rotated by the motor, a drive crown coordinated to the shaft, and a passage control plate. The clutch preferably includes the motor, the worm gear rotated by the motor, the worm wheel rotated by the worm gear, the drive crown, and the passage control plate. The unit-handle coupler further preferably includes an adapter selectively attachable to the deadbolt interface unit manual egress handle, a coupling lock slide, and a coupling insert functionally connecting the adapter and the coupling insert. The at least one actuator unit preferably controls locking and unlocking the deadbolt lock in the remote mode. The deadbolt interface unit preferably prevents unlocking of the deadbolt lock using a key, lock picking tools, bump keys, or other bypass tools.

A preferred deadbolt control and security system prevents rotation of a deadbolt manual egress handle of a deadbolt lock. The system preferably includes a deadbolt interface unit and at least one actuator unit. The deadbolt interface unit preferably has a manual mode and a remote mode. The deadbolt interface unit preferably includes a deadbolt interface unit manual egress handle, a motor, a gear train, a clutch, a power source, and a unit-handle coupler. The deadbolt interface unit manual egress handle may be used in the manual mode. The at least one actuator unit may be used in the remote mode.

In a preferred deadbolt control and security system, the deadbolt interface unit prevents unlocking of the deadbolt lock using a key.

In a preferred deadbolt control and security system, the deadbolt interface unit prevents unlocking of the deadbolt lock using lock picking tools, bump keys, or other bypass tools.

In a preferred deadbolt control and security system, the manual mode preferably has a manual locking function and a manual unlocking function in which the deadbolt interface unit manual egress handle is used to lock and unlock the deadbolt lock. In a preferred deadbolt control and security system, the remote mode preferably has a remote locking function and a remote unlocking function in which one of the at least one actuator units is used to lock and unlock the deadbolt lock.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

DESCRIPTION OF THE DRAWINGS

The accompanying drawings illustrate various exemplary deadbolt control systems, components of various exemplary deadbolt control systems, and/or provide teachings by which the various exemplary deadbolt control systems are more readily understood.

FIG. 24C shows a cross-sectional side view of the gear train in an unlocked initial position as the manual egress handle is used manually to lock the associated deadbolt lock (manual mode).

FIG. 24D shows a cross-sectional top view of the gear train in the unlocked initial position as the manual egress handle is used manually to lock the associated deadbolt lock (manual mode).

FIG. 26A shows a front view of the gear train in the locked finished position as the manual egress handle is used manually to lock the associated deadbolt lock (manual mode).

FIG. 26B shows a front view of the gear train (with the manual egress handle and worm wheel removed) in the locked finished position as the manual egress handle is used manually to lock the associated deadbolt lock (manual mode).

FIG. 26C shows a cross-sectional side view of the gear train in a locked finished position as the manual egress handle is used manually to lock the associated deadbolt lock (manual mode).

FIG. 26D shows a cross-sectional top view of the gear train in the locked finished position as the manual egress handle is used manually to lock the associated deadbolt lock (manual mode).

FIG. 27A shows a front view of the gear train in the locked initial position as the manual egress handle is used manually to unlock the associated deadbolt lock (manual mode).

FIG. 27B shows a front view of the gear train (with the manual egress handle and worm wheel removed) in the locked initial position as the manual egress handle is used manually to unlock the associated deadbolt lock (manual mode).

FIG. 42 is a front view showing the passage control plate positioned by pressure from the plate return spring to allow the drive crown from lowering ("pass-through" position).

FIG. 43 is a front view showing the passage control plate after the pressure from the plate return spring has been overcome, the passage control plate positioned to prevent the drive crown to lower ("blocking" position).

FIG. 44 is a cross-sectional view of the gear train showing the lowered drive crown (moved toward the door) in relation to the motorized worm wheel.

FIG. 45 is a cross-sectional view of the gear train showing the drive crown positioned close (nested) to the motorized worm wheel.

FIGS. 48A-48C are a series of front views showing the projecting leg of the manual egress handle moving the passage control plate from a pass-through position (FIGS. 48A-48B) allowing downward (toward the door) passage of the drive crown that facilitates manual rotation to a blocking position (FIG. 48C) preventing downward (toward the door) passage of the drive crown that.

FIG. 55 is an exemplary high-level overview of an infinite loop of exemplary firmware.

Figure 1:
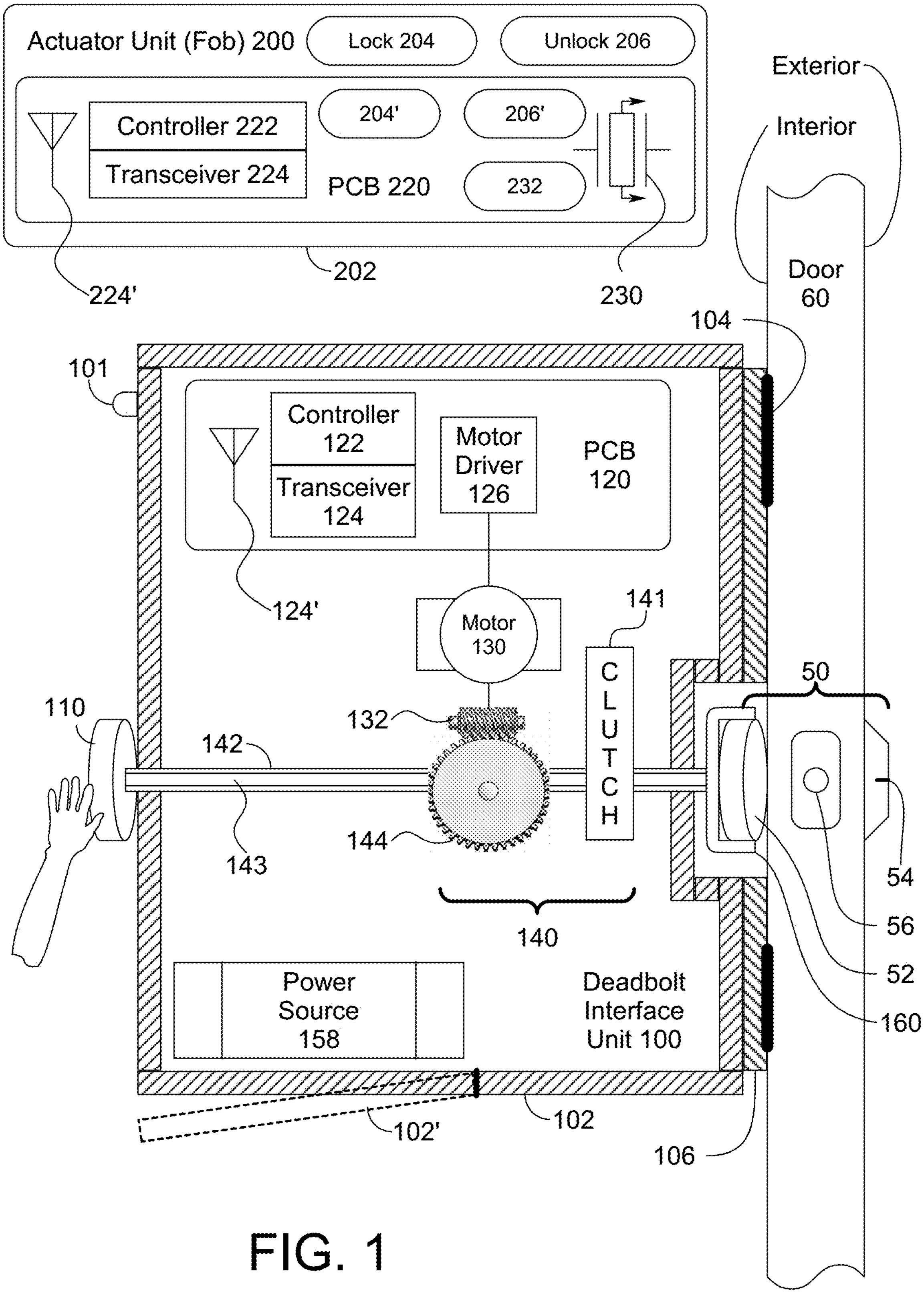
FIG. 1 is an electro-mechanical block diagram showing an exemplary deadbolt interface unit and an exemplary actuator unit.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION

FIG. 1 shows an overview of an exemplary deadbolt control system associated with and functionally controlling the operation of a deadbolt lock 50 installed on a door 60. Deadbolt control systems, as described herein, are preferably electro-mechanical security systems that can control existing deadbolt locks 50 (e.g. single cylinder locks and/or double cylinder locks) on doors 60 (e.g. doors for houses, apartments, businesses, and/or other types of buildings or parts of buildings (e.g. rooms)). The doors 60 provide a physical division between an interior area (e.g. inside a house or room) and an exterior area (e.g. outside a house or room).

Deadbolt control systems preferably include a deadbolt interface unit 100 and at least one actuator unit 200 (e.g. a fob). Preferred deadbolt interface units 100 are easily installed to control the deadbolt lock 50. From the interior area, authorized users (e.g. homeowners) are able to use a deadbolt interface unit manual egress handle 110 (also referred to as the manual egress handle 110) of the deadbolt interface unit 100 in much the same manner as they would use a deadbolt manual egress handle 52 of a traditional deadbolt lock 50. As an example, an authorized user can simply turn the deadbolt interface unit manual egress handle 110 for emergency or routine egress from inside a house. From the exterior area, authorized users are able to use the actuator unit 200 to lock and unlock the deadbolt lock 50 in much the same manner as they would use a car fob to lock and unlock a car door. Unauthorized users (e.g. an intruder), however, are unable to enter the interior area even if they have a key.

Figure 2:
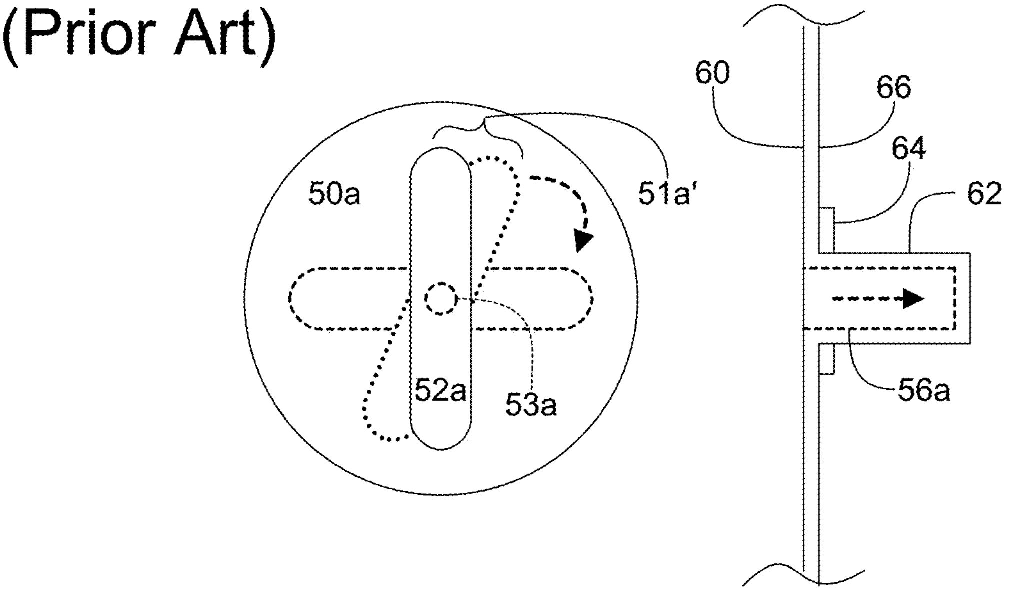
FIG. 2 (Prior Art)
FIG. 2 is a front view of a simplified prior art deadbolt lock with a central pivot moving from an unlocked position to a locked position.
Figure 3:
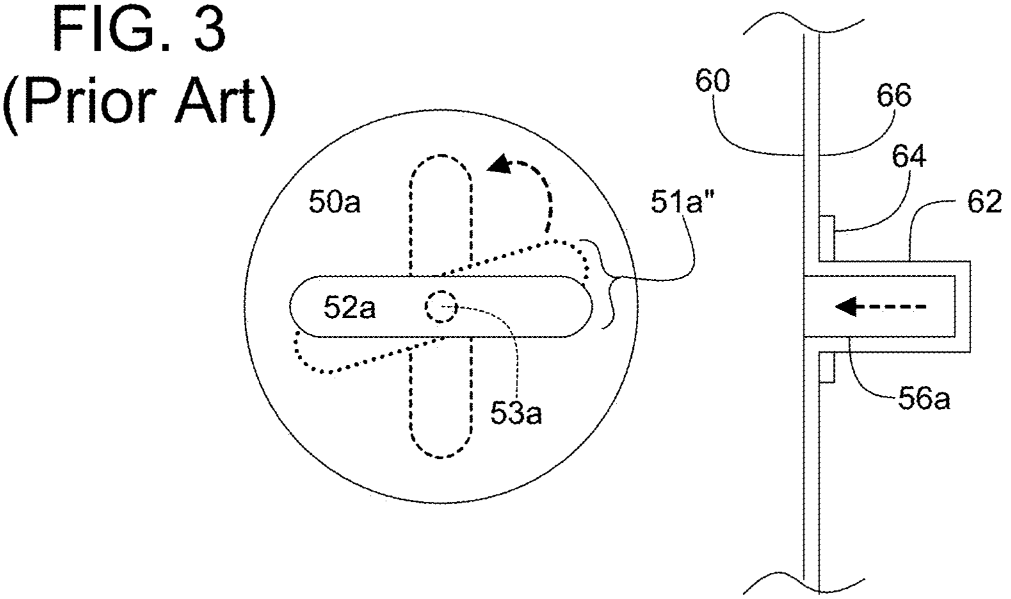
FIG. 3 (Prior Art)
FIG. 3 is a front view of the prior art deadbolt lock of FIG. 2 moving from the locked position to the unlocked position.
Figure 4:
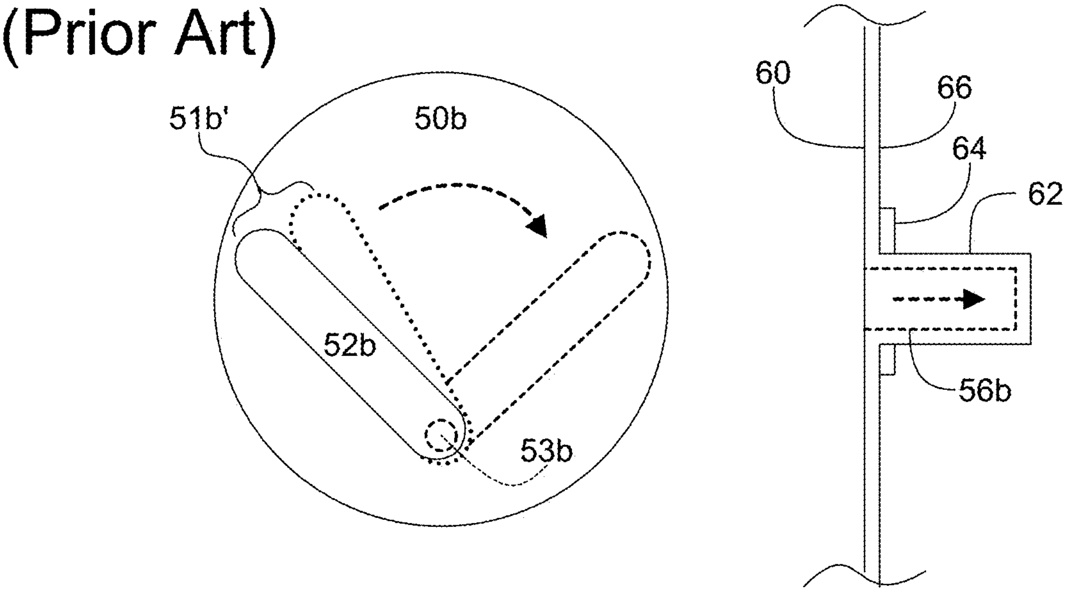
FIG. 4 (Prior Art)
FIG. 4 is a front view of a simplified prior art deadbolt lock with an off-center pivot moving from an unlocked position to a locked position.
Figure 5:
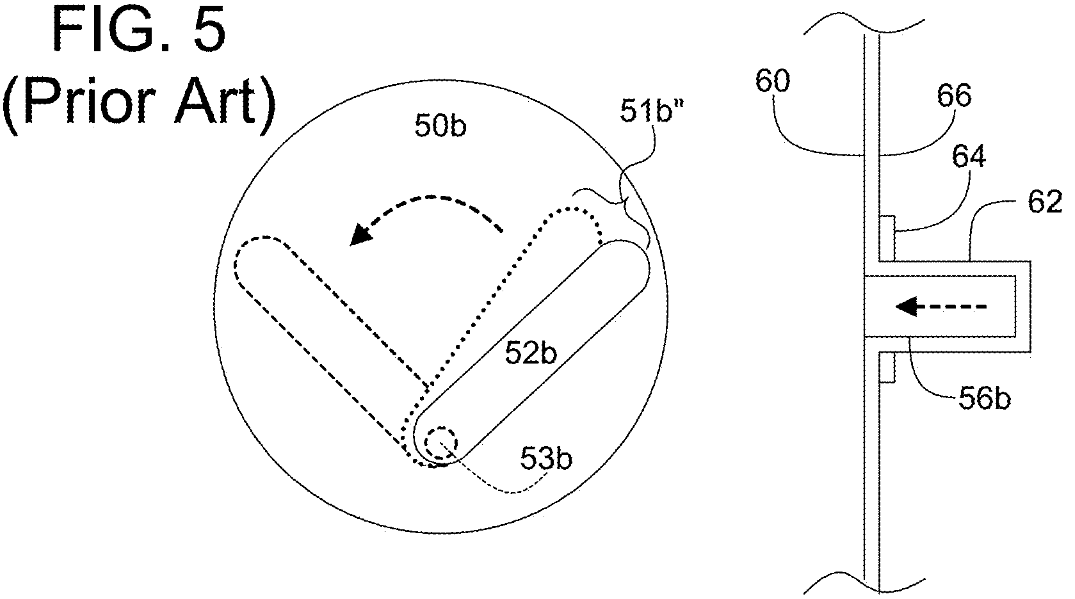
FIG. 5 (Prior Art)
FIG. 5 is a front view of the prior art deadbolt lock of FIG. 4 moving from the locked position to the unlocked position.

The shown deadbolt lock 50 is a single cylinder lock with a deadbolt manual egress handle 52 on the interior side of the door 60, a key slot cylinder 54 (including a keyhole) on the exterior side of the door 60, and a projecting/retracting bolt 56. The deadbolt interface unit 100 preferably associates with the interior side of the door 60 and, more specifically, with the deadbolt manual egress handle 52 on the interior side of the door 60. FIGS. 2-3 show a simplified deadbolt lock 50*a* with a central pivot 53*a*. FIGS. 4-5 show a simplified deadbolt lock 50*a* with an off-center pivot 53*b*. Although shown as mounted on left-hinged doors, the same principles would work with right-hinged doors.

FIG. 1 also shows an overview of the deadbolt interface unit 100 and the at least one actuator unit 200. The deadbolt interface unit 100 preferably includes a housing 102 with at least one door connector 104 (shown in FIGS. 6-10 as 104*a*, 104*b*, 104*c*, and 104*d*) and a deadbolt interface unit manual egress handle 110. (The optional mounting plate 106 may also be considered a door connector.) Preferably within the housing 102 are at least one printed circuit board (PCB) 120, at least one motor 130, at least one gear train 140 (which may at least partially include or otherwise be associated with a clutch 141), and at least one power source 158 (e.g. a battery pack). An adapter 160, which may be distinct from the deadbolt interface unit 100, is preferably used to connect the deadbolt interface unit 100 to the deadbolt manual egress handle 52.

Unlike other systems described in the BACKGROUND, the deadbolt control systems described herein preferably have several of the following features:

- they are quick and easy to physically install (e.g. requiring no tools and not requiring any disassembly of the original deadbolt lock);
- they use existing deadbolt locks;
- they are convenient, easy to control with actuator 200;
- they do not require the addition of holes to the door;
- they have easy power source (e.g. battery) replacement;
- they allow for easy manual egress, using at least substantially the same manner and motion of the manual egress handle 110, as for the deadbolt manual egress handle 52;
- they do not introduce vulnerabilities to hacking; and
- they solve security threats, such as lock picking, bump keys, and/or copied or otherwise obtained physical keys.

Exemplary deadbolt control systems (and components thereof) may be better understood with reference to the drawings, but the drawings are not intended to be of a limiting nature. The same reference numbers are used throughout the drawings and description in this document to refer to the same or like parts. Unless specified otherwise, the shown shapes and relative dimensions are preferred, but are not meant to be limiting unless specifically claimed, in which case they may limit the scope of that particular claim.

Exemplary Deadbolt Locks:

Common deadbolt locks are described in the BACKGROUND. There are, however, many variations in common deadbolt locks. Reference numbers associated with FIGS. 2-3 are modified with an "a" (e.g. the deadbolt lock is identified by reference number 50*a* instead of reference number 50). Reference numbers associated with FIGS. 4-5 are modified with a "b" (e.g. the deadbolt lock is identified by reference number 50*b* instead of reference number 50). If no modifier is used, a reference number would apply to either, both, and/or another structure as indicated by context.

FIGS. 2-5 show exemplary simplified deadbolt locks 50*a*, 50*b* that will be used in discussing the deadbolt control systems. In particular, FIGS. 2-5 show exemplary deadbolt manual egress handles 52*a*, 52*b* with exemplary nominal angle ranges of operation of 90 degrees and exemplary slop angles 51*a*', 51*a*", 51*b*', 51*b*". ("Slop angles" may be either a particular angle or a range of angles to be understood based on context.) Exemplary slop angles are inherent in known deadbolt locks and may be, for example, +/−15 degrees at each end (lock/unlock) of the nominal angle ranges of operation. Slop angles may be particular to each deadbolt lock.

FIGS. 2-3 show a simplified deadbolt lock 50*a* with a central pivot 53*a*. As shown in FIG. 2, the manual egress handle 52*a* moves from an unlocked position (shown in solid lines) to a locked position (shown in dashed lines). The movement of the manual egress handle 52*a* causes the projecting/retracting bolt 56*a* to project outward from the door 60. At the beginning of the motion of the manual egress handle 52*a* there is a certain angle 51*a*' between the original position (where the movement begins) of the manual egress handle 52*a* and the position of the manual egress handle 52*a* (shown in dotted lines) in which the projecting/retracting bolt 56*a* actually engages and starts projecting outward from the door 60. This angle 51*a*' in which the projecting/retracting bolt 56*a* is not engaged can be referred to as "slop." As shown in FIG. 3, the manual egress handle 52*a* moves from a locked position (shown in solid lines) to an unlocked position (shown in dashed lines). The movement of the manual egress handle 52*a* causes the projecting/retracting bolt 56*a* to retract inward into the door 60. At the beginning of the motion of the manual egress handle 52*a* there is a certain angle 51*a*" between the original position (where the movement begins) of the manual egress handle 52*a* and the position of the manual egress handle 52*a* (shown in dotted lines) in which the projecting/retracting bolt 56*a* actually engages and starts retracting inward into the door 60. This angle 51*a*" in which the projecting/retracting bolt 56*a* is not engaged can be referred to as "slop." Slop angles 51*a*', 51*a*" are inherent in known deadbolt locks.

FIGS. 4-5 show a simplified deadbolt lock 50*a* with an off-center pivot 53*b*. (It should be noted that although the off-center pivot 53*b* is shown toward the end of the manual egress handle 52*a*, the pivot 53*b* could be at any location between the center of the manual egress handle 52*b* and the end of the manual egress handle 52*b*.) As shown in FIG. 4, the manual egress handle 52*b* moves from an unlocked position (shown in solid lines) to a locked position (shown in dashed lines). The movement of the manual egress handle 52*b* causes the projecting/retracting bolt 56*b* to project outward from the door 60. At the beginning of the motion of the manual egress handle 52*b* there is a certain angle 51*b*' between the original position (where the movement begins) of the manual egress handle 52*b* and the position of the manual egress handle 52*b* (shown in dotted lines) in which the projecting/retracting bolt 56*b* actually engages and starts projecting outward from the door 60. This angle 51*b*' in which the projecting/retracting bolt 56*b* is not engaged can be referred to as "slop." As shown in FIG. 5, the manual egress handle 52*b* moves from a locked position (shown in solid lines) to an unlocked position (shown in dashed lines). The movement of the manual egress handle 52*b* causes the projecting/retracting bolt 56*b* to retract inward into the door 60. At the beginning of the motion of the manual egress handle 52*b*, there is a certain angle 51*b*" between the original position (where the movement begins) of the manual egress handle 52*b* and the position of the manual egress handle 52*b* (shown in dotted lines) in which the projecting/retracting bolt 56*b* actually engages and starts retracting inward into the door 60. This angle 51*b*" in which the projecting/retracting bolt 56*b* is not engaged can be referred to as "slop." Slop angles 51*b*', 51*b*" are inherent in known deadbolt locks.

Variations of common deadbolt locks include, but are not limited to, dimension variations, door mounting variations, pivot variations, range (the angle range of operation) variations, lock/unlock variations, and/or projecting/retracting bolt travel variations.

- Dimensions: Deadbolt locks 50 may have deadbolt manual egress handles 52 that vary in length (the longest and/or longitudinal dimension), width/thickness (the dimension perpendicular to the length), and height (the dimension from the surface closest the door to the surface most distal from the door).
- Pivots: Deadbolt manual egress handles (e.g. deadbolt manual egress handle 52) may have various pivot points (e.g. center rotation pivot 52*a* (FIGS. 2-3) or off-center rotation pivot 52*b* (FIGS. 4-5)).
- Range: A deadbolt manual egress handle (e.g. deadbolt manual egress handle 52) has an angle range of operation that is the angle between its start position (lock/unlock position) and its end position (unlock/lock position). (For example, if the start position was the right-most side and the deadbolt manual egress handle was in the lock position, then the end position would be when the deadbolt manual egress handle was in the unlock position at the left-most side. Another example is that if the start position was the left-most side and the deadbolt manual egress handle was in the lock position, then the end position would be when the deadbolt manual egress handle was in the unlock position at the right-most side.) While most deadbolt manual egress handles have an angle range of operation of approximately 90 degrees, alternative deadbolt manual egress handles may have alternative angle ranges of operation (e.g. from 75 degrees to 105 degrees). Put another way, a deadbolt manual egress handle may rotate 75 degrees (or 90 degrees or 105 degrees) between the lock/unlock position and the unlock/lock position. (It should be noted that this extra rotation can be considered "slop" as discussed herein.)
- Lock/Unlock Position: Deadbolt manual egress handles may have different locked and unlocked positions. A locked position is the angle of the deadbolt manual egress handle when the deadbolt lock is locked. An unlocked position is the angle of the deadbolt manual egress handle when the deadbolt lock is unlocked. FIGS. 2-5 show examples of deadbolt manual egress handles 52*a*, 52*b* that operate through nominal (approximately) 90 degrees (although alternative ranges of operation are possible). FIGS. 2-3 show a deadbolt manual egress handle 52*a* with a vertical (90 degrees) unlocked position and a horizontal (0 degrees-90 degrees to the right of vertical) locked position. Alternative deadbolt manual egress handles may operate through nominal 90 degrees, but instead of a deadbolt manual egress handle 52 having starting vertical/horizontal unlocked/locked positions, the deadbolt manual egress handles may have alternative locked and unlocked positions (e.g. the deadbolt manual egress handle 52*b* shown in FIGS. 4-5 that has an unlocked position of 45 degrees and a locked position of 135 degrees). The deadbolt manual egress handles may likewise have a +/−15 degree range about either of those positions. Exemplary positions of deadbolt manual egress handles that operate through nominal 90 degrees include, but are not limited to, 0 degrees to 90 degrees, 90 degrees to 0 degrees, 135 degrees to 45 degrees, 45 degrees to 135 degrees, 180 degrees to 90 degrees, 90 degrees to 180 degrees, etc.
- Projecting/Retracting Bolt Travel: The projecting/retracting bolt 56 (shown as projecting/retracting bolt 56*a* in FIGS. 2-3 and as projecting/retracting bolt 56*b* in FIGS. 4-5) may have a differing range of travel relating to the deadbolt lock design. The distance the projecting/retracting bolt 56 travels may also be limited based on the depth of the latch bore 62 (that may be surrounded by a strike plate 64) in the doorjamb 66.
- Door Mountings: Deadbolt locks may be found on both left-handed mounted doors and right-hand mounted doors.

Installation:

The deadbolt interface unit 100 preferably associates with the interior side of the door 60 and, more specifically, with the deadbolt manual egress handle 52 on the interior side of the door 60. The mounting of the deadbolt interface unit 100 requires neither tools nor modification to the deadbolt lock 50. Further, the deadbolt interface unit 100 may be installed without measuring.

Figure 6:
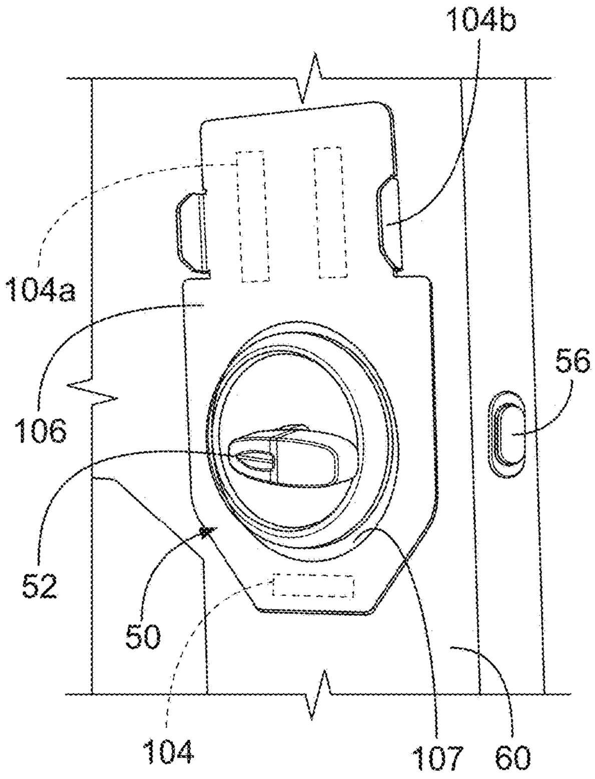
FIGS. 6-9 are a series of photographs showing the steps of physical installation and operation of an exemplary deadbolt interface unit.
Figure 7:
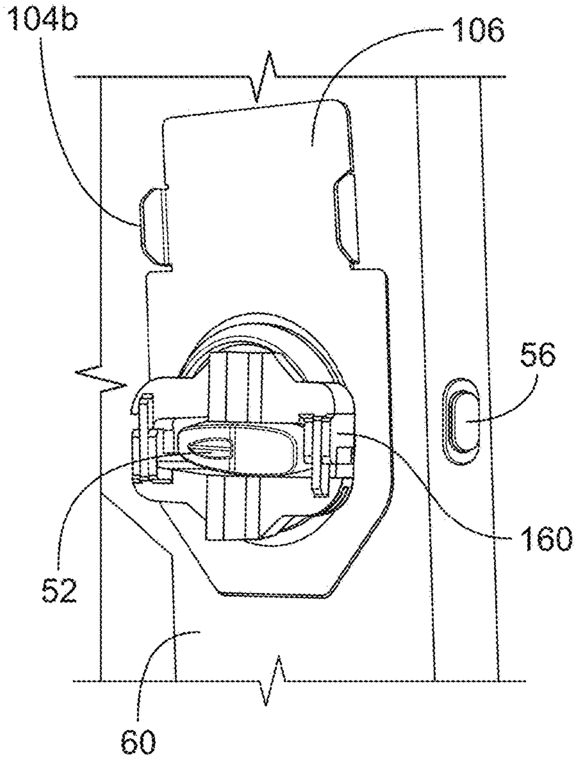
Figure 8:
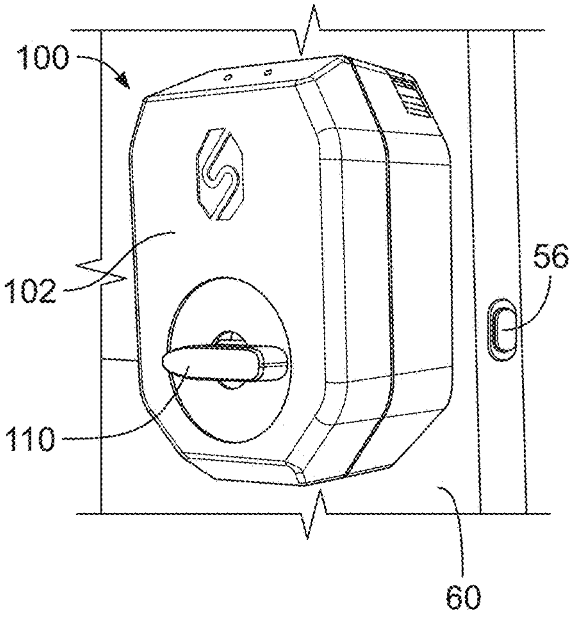
Figure 9:
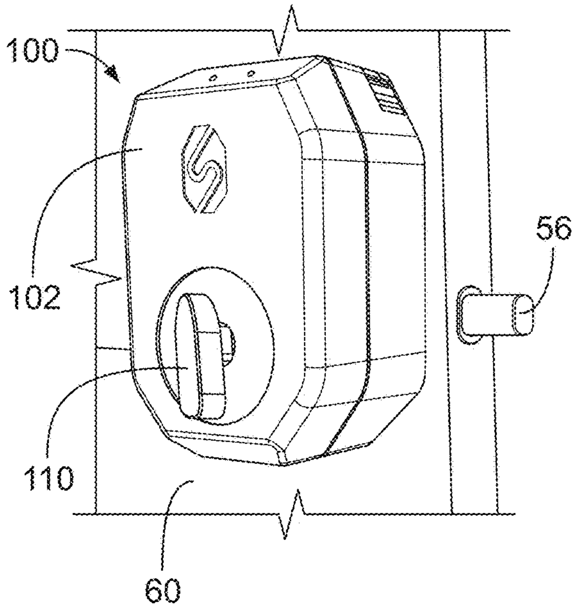

FIGS. 6-9 show the physical installation and operation of an exemplary deadbolt interface unit 100: FIG. 6 shows an optional mounting plate 106 positioned on the interior surface of the door 60; FIG. 7 shows an exemplary adapter 160 grabbing the deadbolt manual egress handle 52; FIG. 8 shows the installed deadbolt interface unit 100 in an "unlocked" state (with the projecting/retracting bolt 56 in the retracted position); and FIG. 9 shows the installed deadbolt interface unit 100 in a "locked" state (with the projecting/retracting bolt 56 in the projected position).

FIGS. 6-10 show the exemplary deadbolt interface unit 100 being physically installed using at least one door connector 104. The at least one door connector 104 may be, for example, at least one adhesive device 104*a*, at least one mechanical connector 104*b*, 104*c* (e.g. tabs 104*b* and slots 104*c*), and/or at least one magnet 104*d*. An optional mounting plate 106 could also be considered part of the at least one door connector 104. Further, all or part of the at least one door connector 104 may be associated with the back of housing 102.

The shown preferred mounting plate 106 has an opening 107. The mounting plate 106 is preferably made of durable material such as sheet metal or rigid plastic. The opening 107 may be, for example, cut out from the durable material or formed in the durable material. As shown, the optional mounting plate 106 may be positioned on the interior surface of the door 60 at least near the deadbolt lock 50. As shown in FIG. 6, the opening 107 may be positioned to surround the deadbolt lock 50. Positioning the opening 107 around the deadbolt lock 50 helps to align the deadbolt interface unit 100 properly without the need to measure.

The optional mounting plate 106 is shown as being connected to the door 60 using a plurality of adhesive devices 104*a* (e.g. a "command strip" type adhesive device). The optional mounting plate 106 is shown as including mechanical connectors (shown as tabs 104*b*) that associate with mating mechanical connectors (shown as slots 104*c*) associated with the back of housing 102. The interaction between the tabs 104*b* and slots 104*c* guarantees the deadbolt interface unit 100 is in the right position on the mounting plate 106 every time without any guesswork. The shown back of housing 102 may also include one or more magnets 104*d* that may magnetically connect with the magnetically attractive mounting plate 106 (or with the door 60 itself if the door is made of magnetically attractive material).

It should be noted that alternative deadbolt control systems may be associated with the interior side of the door 60 in alternative ways. For example, the optional mounting plate 106 may be eliminated (or incorporated into the housing 102) if the door 60 is made of a magnetically attractive material and there are sufficient (enough in quantity and/or strength) magnets 104*d* associated with the housing 102 to securely support the deadbolt interface unit 100. The adhesive devices 104*a* may be replaced with other devices for deadbolt interface unit manual egress handle connecting the optional mounting plate 106 to the door 60 including, but not limited to, suction cups, hook and loop fabric, removable putty, double sticky glue putty, POST-IT NOTE® style adhesive strips, and other known or yet to be discovered means for connecting the mounting plate 106 to the door 60. If the mounting plate 106 was omitted, these same means for connecting could be used to connect the back of the housing 102 directly to the door 60. While the shown mechanical connectors are tabs 104*b* and slots 104*c*, alternative mechanical connectors could be used to attach the back of the housing 102 to the mounting plate 106 or directly to the door 60. Exemplary alternative mechanical connectors include, but are not limited to, clips, brackets, straps, rails, clamps, hooks, and other known or yet to be discovered means for mechanically connecting the back of the housing 102 to the mounting plate 106 or directly to the door 60.

Figure 13:
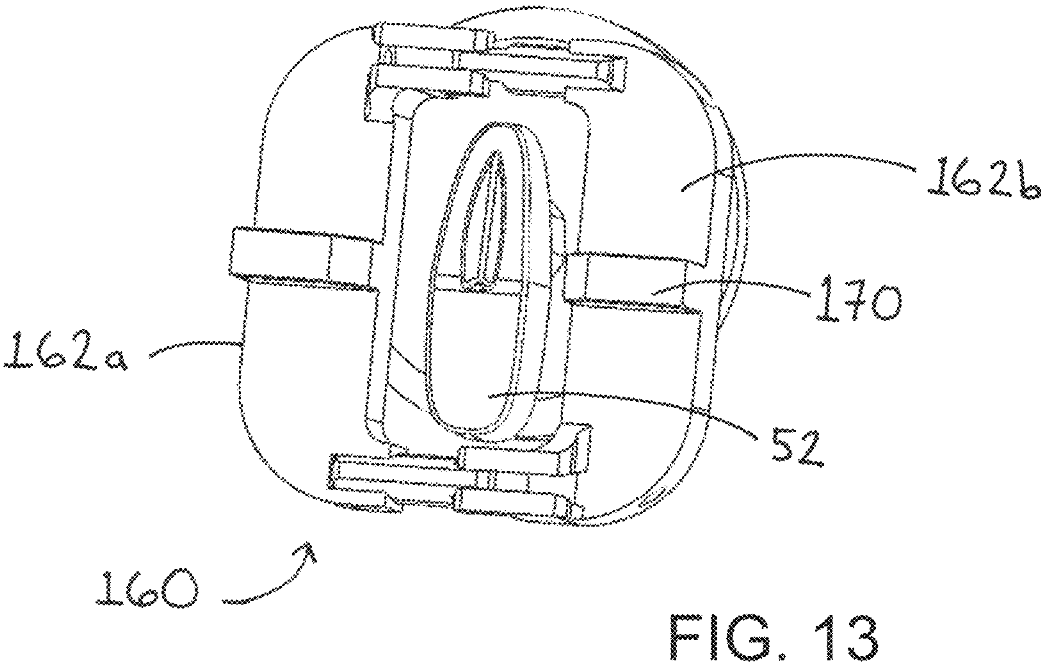
FIG. 13 is a front view of the spring-loaded adapter of FIG. 11 showing the installation steps.
Figure 14:
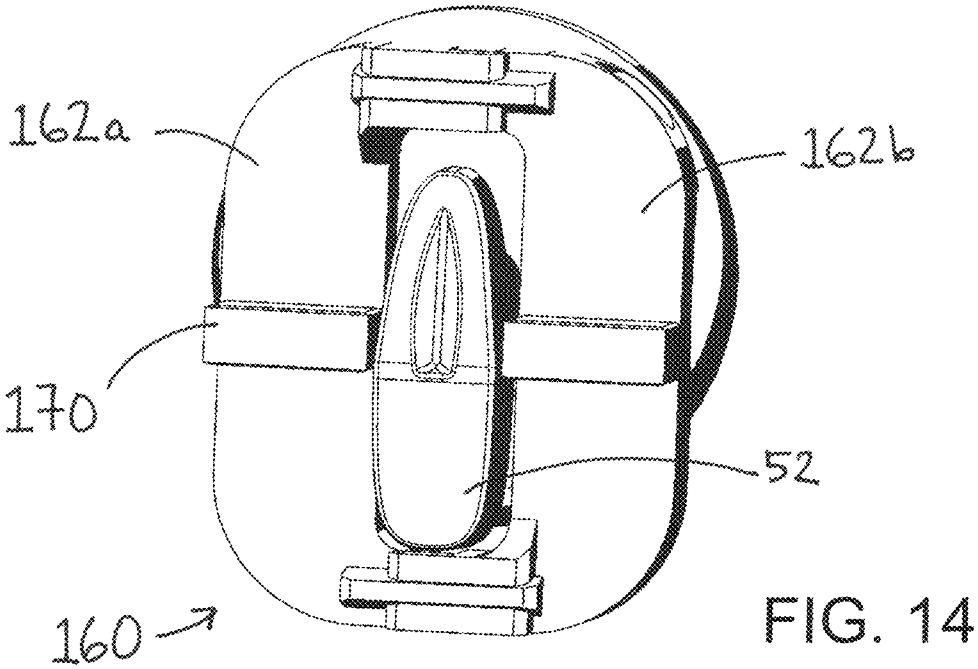
FIG. 14 is a front view of the spring-loaded adapter of FIG. 11 installed on a deadbolt manual egress handle.
Figure 15:
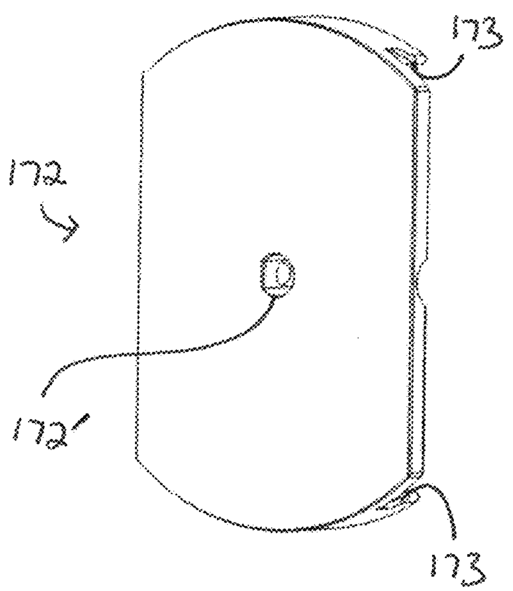
FIG. 15 is a perspective view of the front of an exemplary coupling lock slide.
Figure 16:
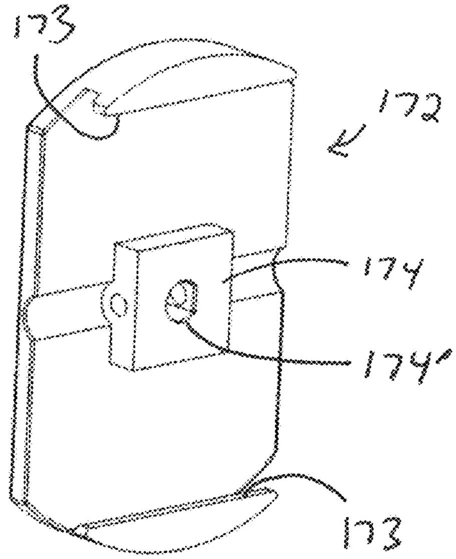
FIG. 16 is a perspective view of the back of the coupling lock slide of FIG. 15.

FIG. 7 and FIGS. 11-16 show an exemplary adapter 160 (shown as a spring-loaded adapter) that can also be referred to as a "grabber." The shown adapter 160 has a first adapter side 162*a* and a second adapter side 162*b*. The first and second adapter sides 162*a*, 162*b* (also shown as adapter sides 162) are shown as being held together by spring-loaded fasteners 164*a*, 164*b* (also shown as spring-loaded fastener 164). At the both ends (e.g. top and the bottom) of the adapter sides 162 are slide guides 168 that allow the adapter sides 162 to slide together and apart. As shown in FIG. 13, the adapter sides 162 may be pulled apart (step 1) and, once positioned on both sides of the deadbolt manual egress handle 52, are allowed to "grab" the deadbolt manual egress handle 52 (pulled together by the spring-loaded fasteners 164 and guided by the slide guides 168). Using this or similar processes, the adapter 160 automatically centers on the deadbolt manual egress handle 52.

Although the shown exemplary adapter 160 is a spring-loaded adapter, alternative adapters could be used. For example, instead of being spring-loaded, the adapter sides could be screwed together. The adapter could also be custom made for a particular deadbolt manual egress handle 52. In such a case, each deadbolt control system could come with several adapters, each adapter designed for a specific deadbolt manual egress handle or a specific type of deadbolt manual egress handle. There could also be one or more sub-adapters (e.g. shims or padding) that are used to perfect (or at least make suitable for use) the fit of a basic adapter.

It should be noted that the adapter 160 or an alternative adapter (e.g. a custom adapter) could be used with a key positioned within the interior key slot cylinder of a double cylinder lock. Put another way, instead of interacting with a deadbolt manual egress handle, the adapter could interact with (e.g. grip) the "head" of the key (the part of a key a user would grip) while the "shaft" of the key is inside the interior key slot cylinder of a double cylinder lock.

Figure 17:
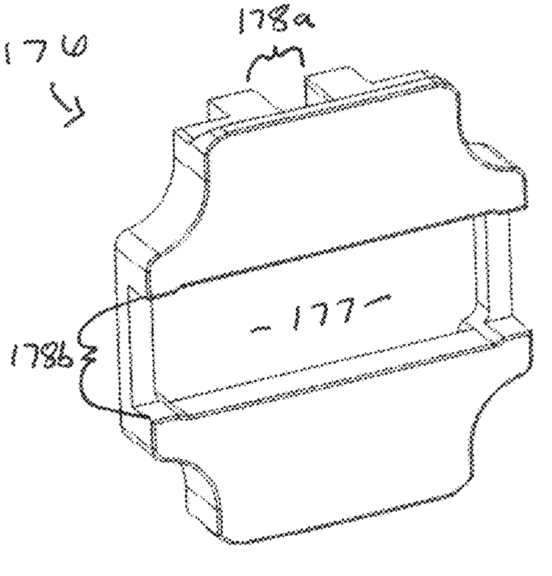
FIG. 17 is a perspective view of the front of an exemplary coupling insert showing a coupling lock slide slot.
Figure 18:
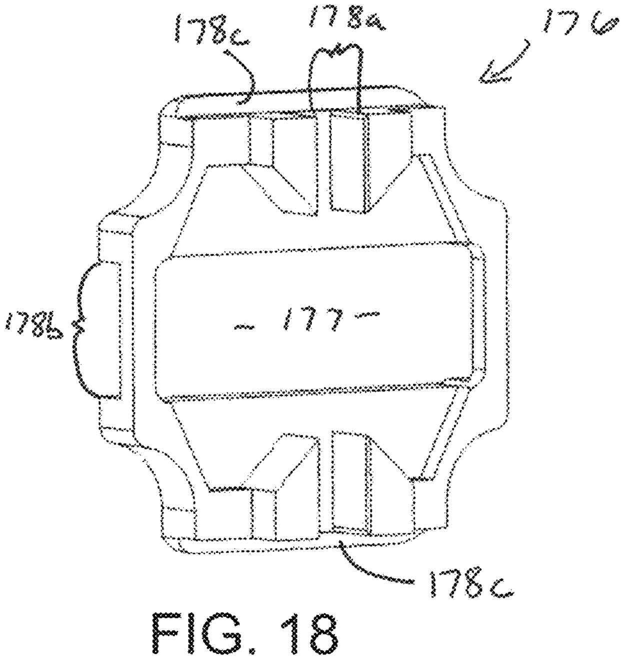
FIG. 18 is a perspective view of the back the coupling insert of FIG. 17 showing an adapter protrusion slot.
Figure 19:
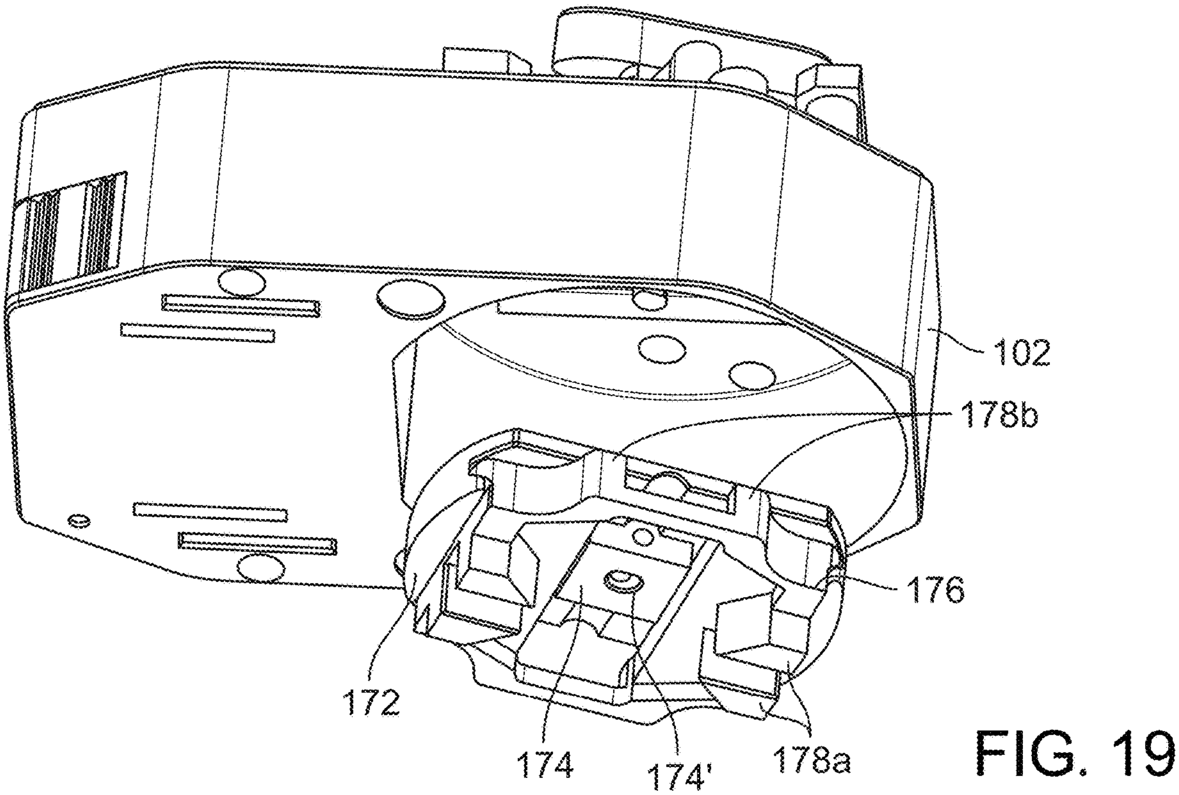
FIG. 19 is an exploded perspective view of the coupling lock slide and the coupling insert spaced from the back of the housing.
Figure 20:
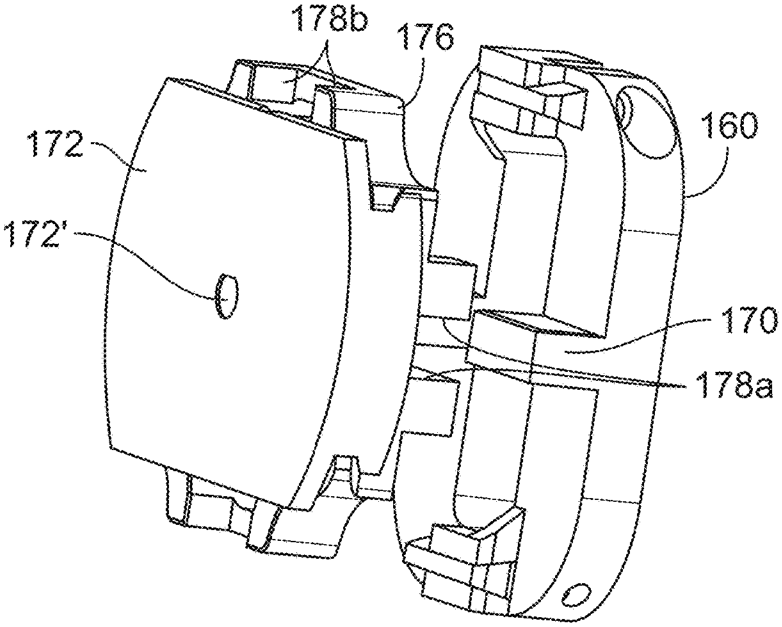
FIG. 20 is an exploded perspective of the coupling lock slide and the coupling insert spaced from spring-loaded adapter of FIG. 11.

The adapter 160 preferably functions as one hub of an Oldham-type coupling. Oldham-type couplings have two hubs: the adapter 160 (FIGS. 11-14) and the coupling lock slide 172 (FIGS. 15-16)) and a disk (the coupling insert 176 (FIGS. 17-18)) that connects the two hubs 160, 172 (as shown in FIGS. 19-20). (The adapter 160, coupling lock slide 172, and coupling insert 176 together function as a "unit-handle coupler" between the deadbolt interface unit 100 and the deadbolt manual egress handle 52 of the traditional deadbolt lock 50, but other means for coupling the deadbolt interface unit 100 to the deadbolt manual egress handle 52 are possible.) The coupling insert 176 both transmits torque and accommodates misalignment between the adapter 160 and the coupling lock slide 172. (The coupling lock slide 172 has a central aperture 172' that coordinates with the "coordinated" (keyed) shaft 142.) As shown, the adapter 160 has at least one protrusion 170

(shown as two protrusions 170*a*, 170*b* in FIG. 11, one on each adapter side 162) on the face that interacts with the coupling insert 176. The coupling lock slide 172 has at least one protrusion 174 on the face that interacts with the coupling insert 176. (The protrusion 174 has a central aperture 174' that coordinates with the "coordinated" (keyed) shaft 142.) The coupling insert 176 has two faces: a first face that interacts with the adapter 160 and a second face that interacts with the coupling lock slide 172. The front face of the coupling insert 176 has a front face slot 178*b* (which may be multiple slots). The back face of the coupling insert 176 has a back face slot 178*a* (which is shown as being two parts divided by a central aperture 177). The first slot 178*a* and the second slot 178*b* are shown as perpendicular to each other. The back face slot 178*a* is an adapter protrusion slot 178*a* designed to couple with the protrusion(s) 170 of the adapter 160. The front face slot 178*b* is a clearance slot. The coupling lock slide 172 has two opposing slide slots 173 that are designed to couple with and be in sliding relation to the two opposing ledges 178*c* of the coupling insert 176. This configuration allows the hubs (the adapter 160 and the coupling lock slide 172) to move independently of each other, which accommodates misalignment and variations in the deadbolt manual egress handle 52 (which can, for example, can be pivoted from a central point or from an end point). U.S. Pat. No. 5,226,852 to Asaba et al. and U.S. Pat. No. 8,736,120 to Maeda et al. provide additional information on Oldham-type Couplers.

Figure 51:
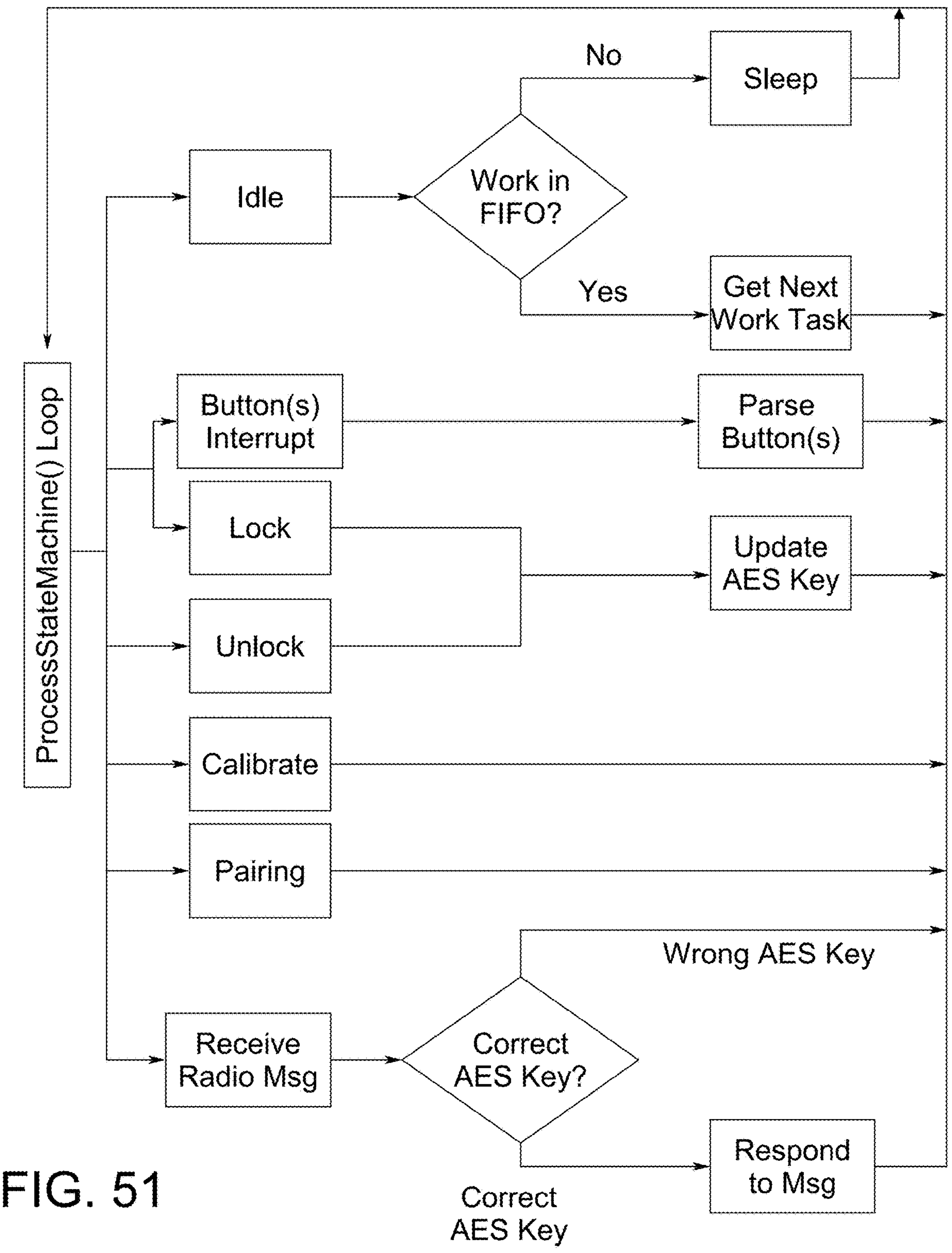
FIG. 51 is a logic diagram of exemplary firmware of an exemplary deadbolt control system.

The use of the adapter 160 (including a spring-loaded adapter) and/or the coupling insert 176 preferably facilitates the use of the deadbolt interface unit 100 with almost any deadbolt lock 50. Although single use and/or custom systems are possible, more generic systems would use a calibration function, examples of which are shown in FIG. 51 (the Firmware Logic Diagram—the Calibration Lock) and FIG. 54 (the Calibration Diagram). It should be noted that the calibration for multiple features (e.g. those bulleted below that may require calibration including the Lock/Unlock Positions, Projecting/Retracting Bolt Travel, and Door Mountings) may be performed as a single calibration function (all of the features calibrated simultaneously) or there may be multiple distinct calibration functions (each calibration function calibrating for at least one feature). The following are examples of the adaptability of the deadbolt interface unit 100:

- Dimensions: The deadbolt interface unit 100 preferably accommodates variations in the lengths, widths/thicknesses, and heights of deadbolt manual egress handles (e.g. deadbolt manual egress handle 52). Variations in deadbolt manual egress handles lengths (the longest and/or longitudinal dimension) may be accommodated by the length of the slot (which is longer than most deadbolt manual egress handles) defined between the adapter sides 162. Variations in deadbolt manual egress handle widths/thicknesses (the dimension perpendicular to the length) may be accommodated by the "give" of the springs 164*a*, 164*b* of the spring-loaded adapter 160. Variations in heights (the dimension from the surface closest the door to the surface most distal the door) of deadbolt manual egress handles may be accommodated by the fact that the slot defined between the adapter sides 162 "open" and/or because the height of the adapter sides 162 is thicker than most deadbolt manual egress handles.
- Pivots: The deadbolt interface unit 100 preferably accommodates deadbolt manual egress handles (e.g. deadbolt manual egress handle 52) having various pivot points (e.g. center rotation (FIGS. 2 and 3) and off-center rotation (FIGS. 4 and 5)). This may be accomplished using, for example, the Oldham-type coupling. Alternatively, or in combination with the Oldham-type coupling, an alternative adapter that is specifically designed for a particular type of pivot may replace the shown exemplary adapter 160.
- Range: An angle range of operation of a deadbolt manual egress handle (e.g. deadbolt manual egress handle 52) is the angle between its start position (lock/unlock position) and its end position (unlock/lock position). While most deadbolt manual egress handles have an angle range of operation of approximately 90 degrees (see the examples in FIGS. 2-5), the deadbolt interface unit 100 preferably accommodates deadbolt manual egress handles having alternative angle ranges of operation (e.g. from 75 degrees to 105 degrees). Accommodating the different angle ranges of operation may be accomplished using, for example, the Oldham-type coupling.
- Lock/Unlock Positions: The deadbolt interface unit 100 preferably accommodates differences in locked positions (in which a deadbolt manual egress handle 52 is in the locked position) and unlocked positions (in which a deadbolt manual egress handle 52 is in the unlocked position). Accommodating the different locked/unlocked positions may be accomplished using, for example, one or both of the Oldham-type coupling and a calibration process (e.g. as shown in FIG. 51 (the Firmware Logic Diagram—the calibrate block) and FIG. 54 (the Calibration Diagram)).
- Projecting/Retracting Bolt Travel: The projecting/retracting bolt 56 (shown as projecting/retracting bolt 56*a* in FIGS. 2-3 and as projecting/retracting bolt 56*b* in FIGS. 4-5) may have differing ranges of travel relating to the deadbolt lock design. Accommodating the different locked/unlocked positions may be accomplished using, for example, one or both of the Oldham-type coupling and a calibration process (e.g. as shown in FIG. 51 (the Firmware Logic Diagram—the calibrate block) and FIG. 54 (the Calibration Diagram)).
- Door Mountings: The deadbolt interface unit 100 preferably accommodates both left-handed mounted doors and right-handed mounted doors. This may be accomplished, for example, by using the calibration function in the firmware, as initiated by pushing a calibration/reset interface (e.g. button(s)) within the deadbolt interface unit 100. This process can be seen in the flowcharts of FIG. 51 (the Firmware Logic Diagram—the calibrate block) and FIG. 54 (the Calibration Diagram)).

It is estimated that the adapter 160 can interface and function with 90% of known deadbolt manual egress handles. Custom adapters or a sub-adaptor may be used to handle many of the remaining deadbolt manual egress handles.

Figure 10:
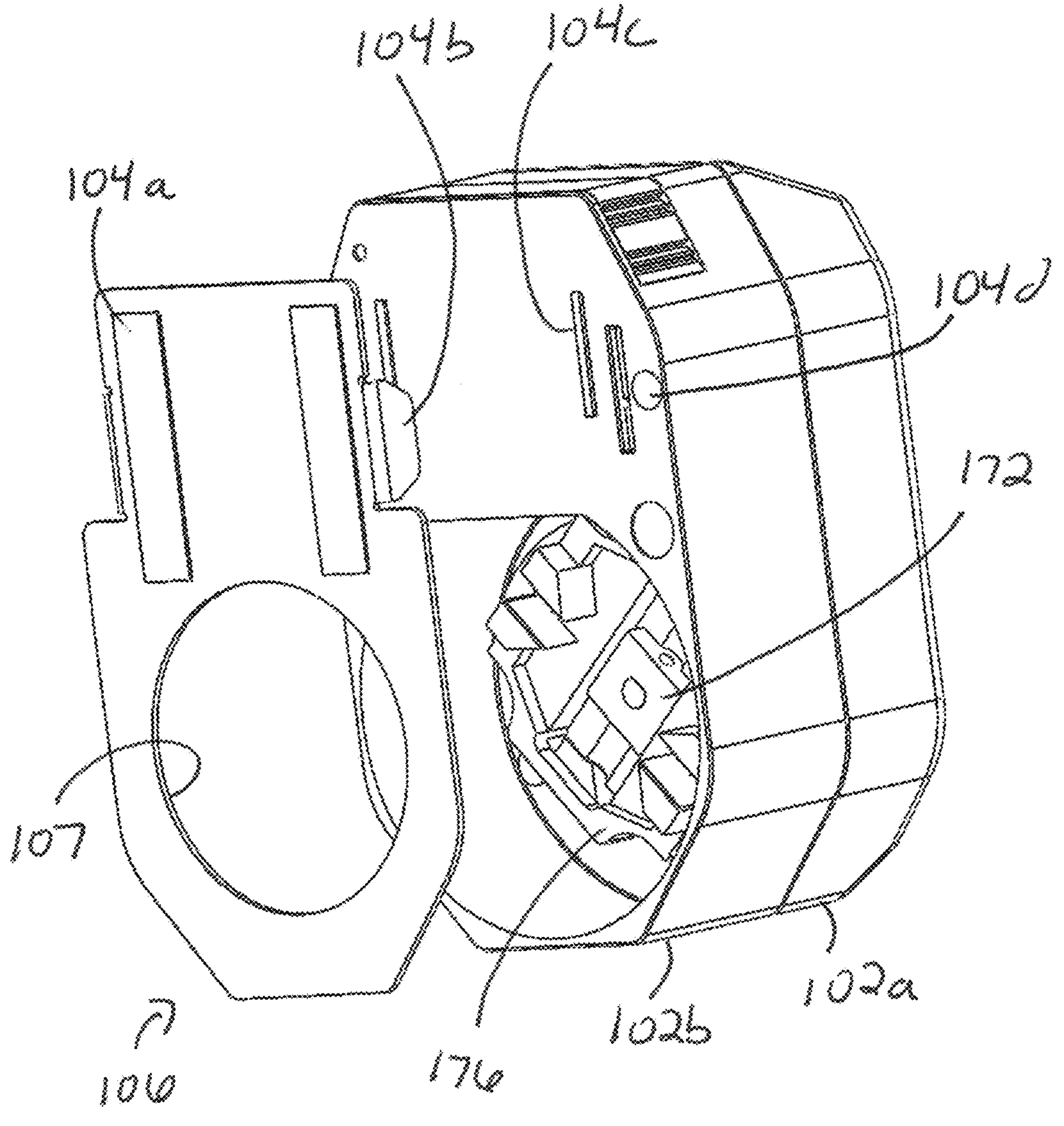
FIG. 10 is an exploded back perspective view of an exemplary optional mounting plate and a housing of an exemplary deadbolt interface unit.
Figure 11:
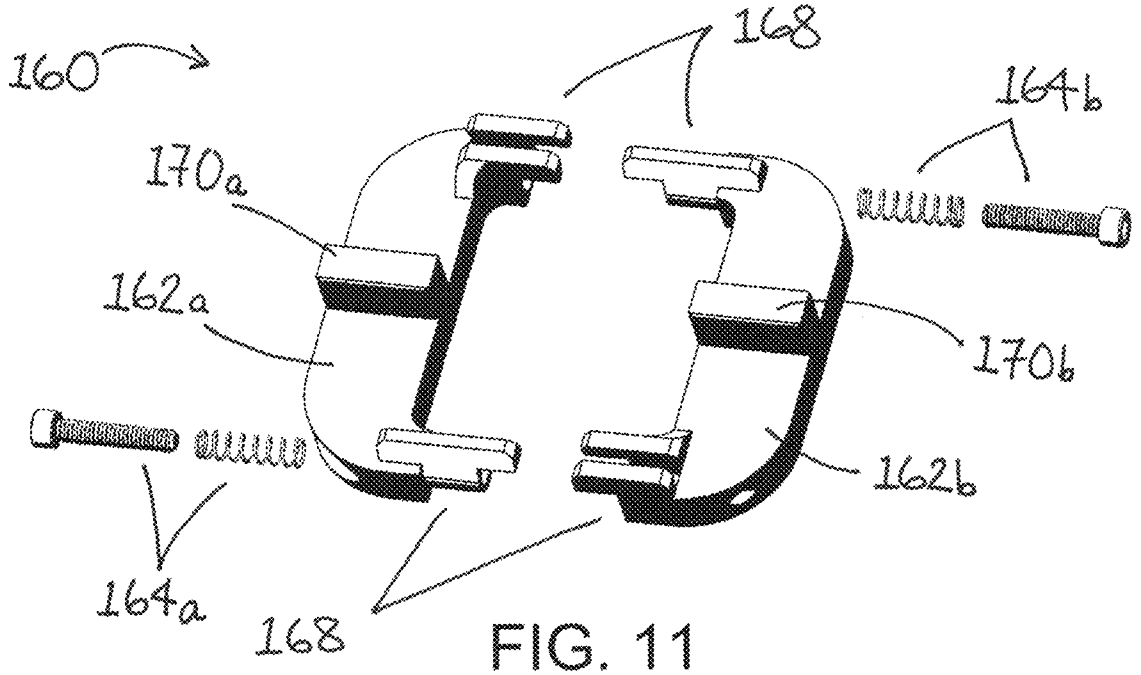
FIG. 11 is an exploded perspective view of an exemplary spring-loaded adapter.
Figure 12:
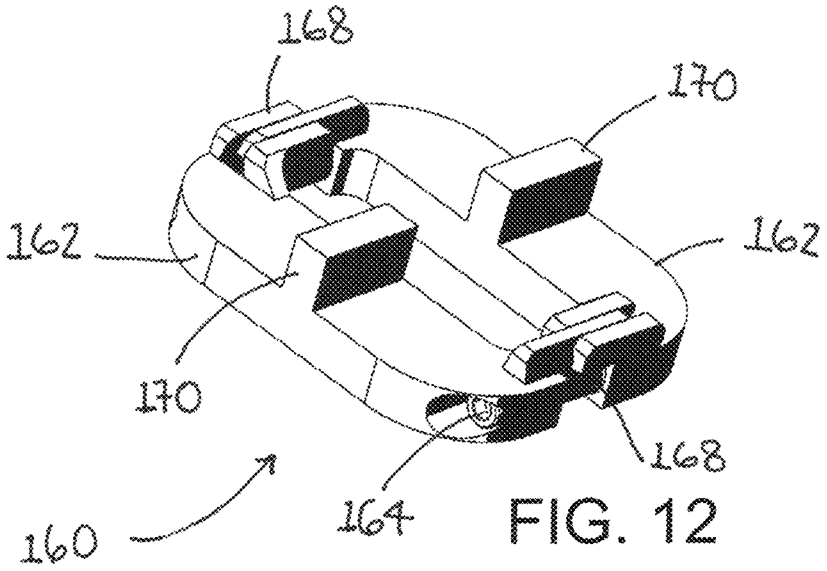
FIG. 12 is a perspective view of the spring-loaded adapter of FIG. 11.

FIGS. 8 and 9 show the deadbolt interface unit 100 associated with and functionally controlling the operation of a deadbolt lock 50 installed on a door 60. In these figures, the optional mounting plate 106 has been positioned on the interior surface of the door 60 and secured by at least one adhesive device 104*a*. Further, in these figures, mechanical connectors 104*b*, 104*c* (e.g. tabs 104*b* and slots 104*c*) and/or magnets 104*d* have been mated (pre-mating is shown in FIG. 10) so that the housing 102 (in which the internal components are housed) covers the mounting plate 106. Still further, the adapter 160 (which surrounds and/or grips the deadbolt manual egress handle 52) has been associated with the coupling insert 176 and the coupling lock slide 172. The housing 102 may be positioned without measuring and/or tools. Further, when the deadbolt interface unit 100 is physically installed, the Oldham-type coupling (the unit-handle coupler) 160, 172, 176 accommodates misalignment between the adapter 160 and the coupling lock slide 172.

Figure 54:
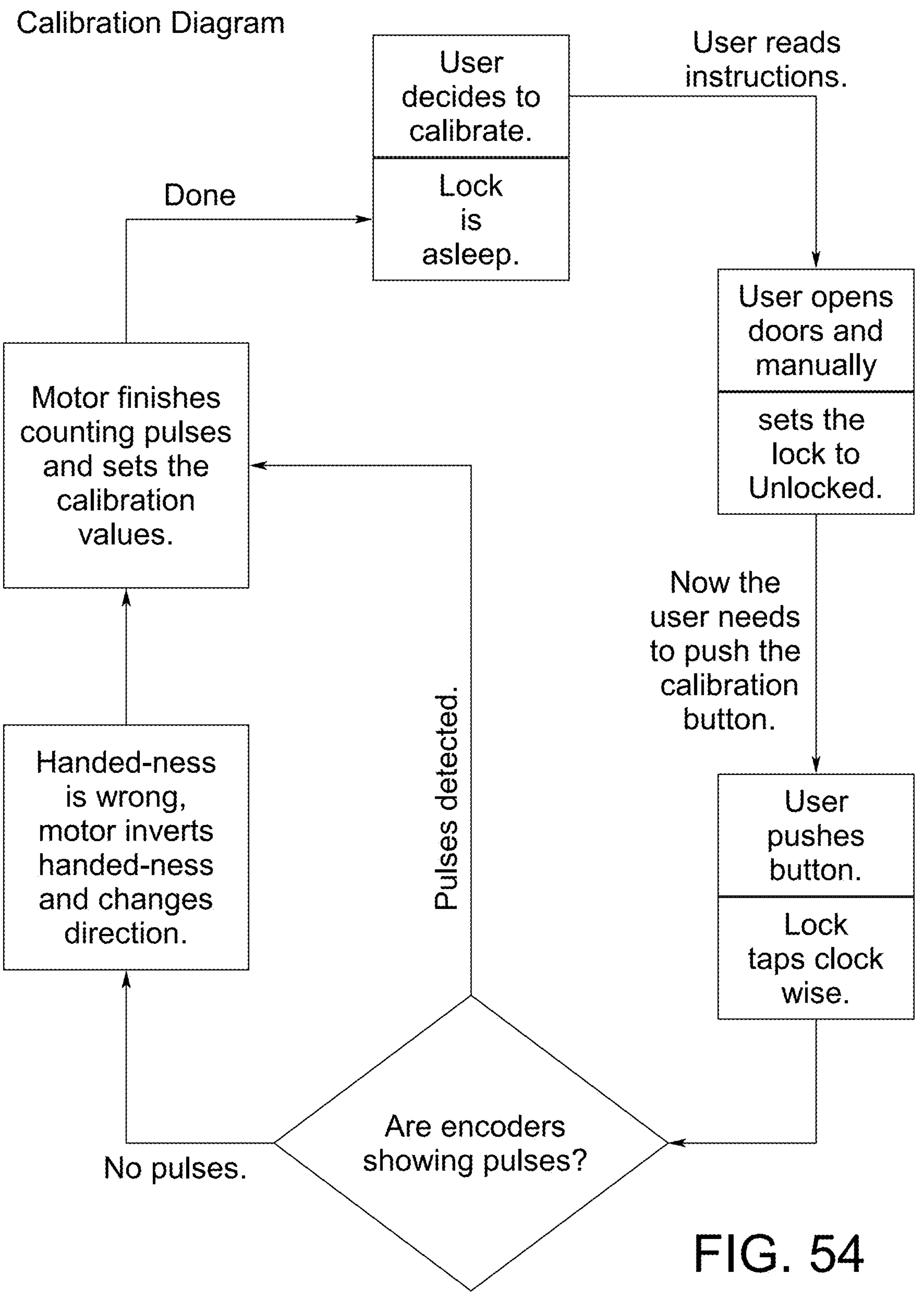
FIG. 54 is a flowchart showing exemplary calibration steps of an exemplary deadbolt control system.
Figure 56A:
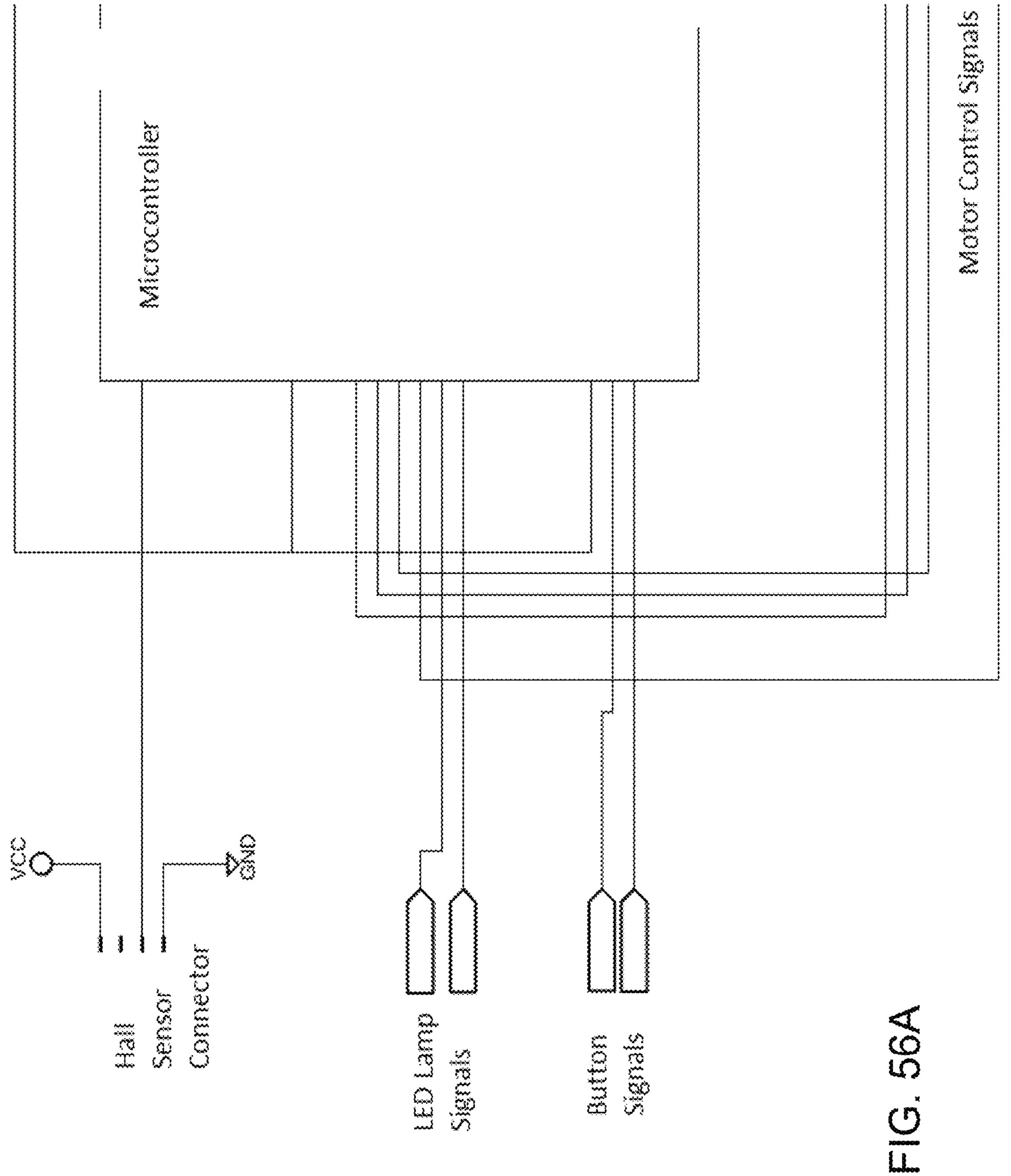
FIGS. 56A-56F are schematic diagrams of the electronics associated with an exemplary deadbolt interface.
Figure 56B:
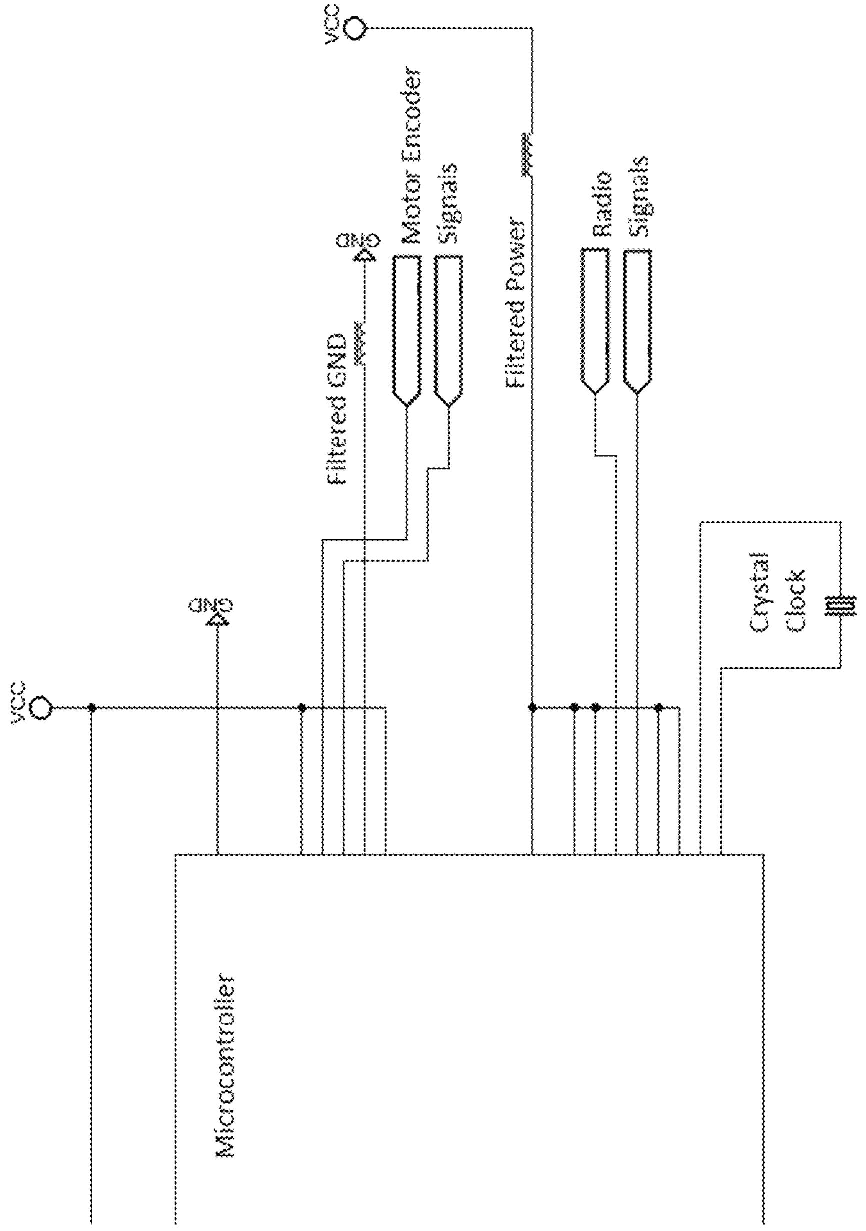
Figure 56C:
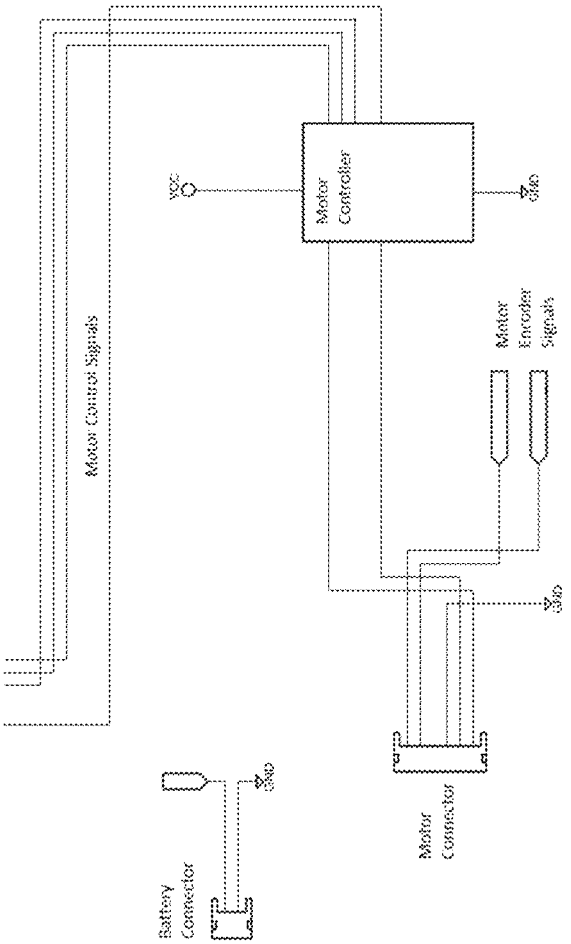
Figure 56D:
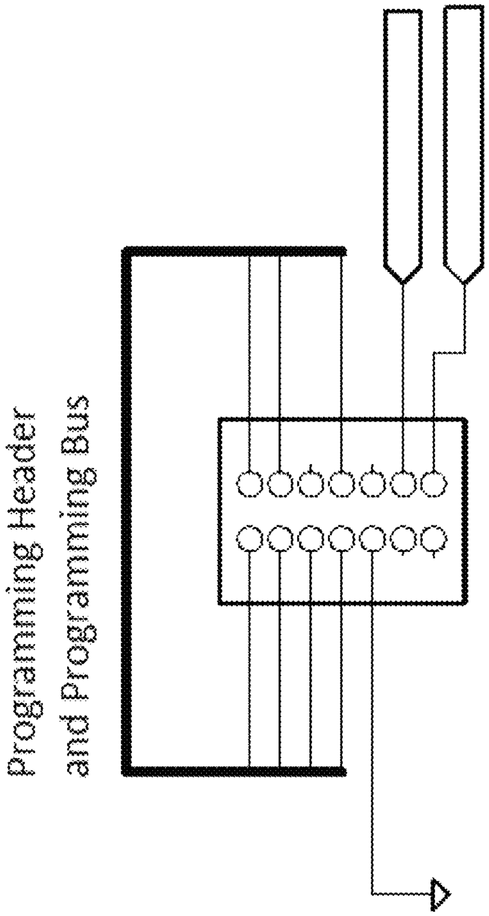
Figure 56E:
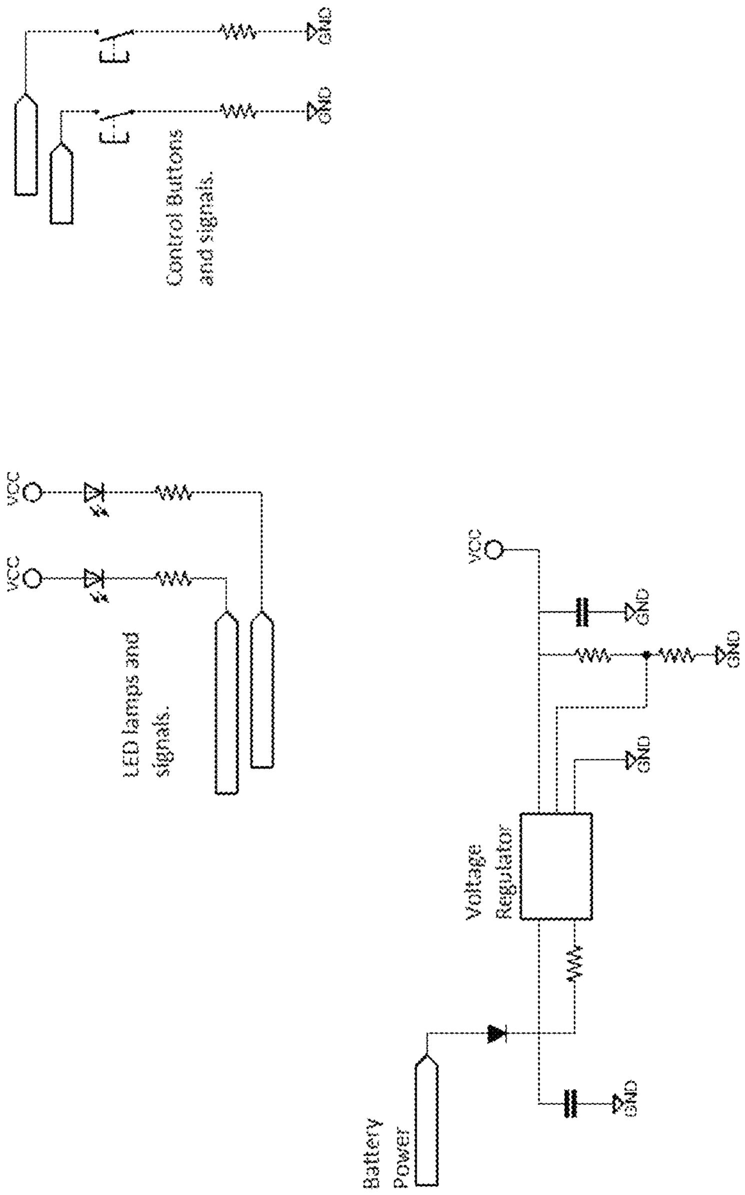
Figure 56F:
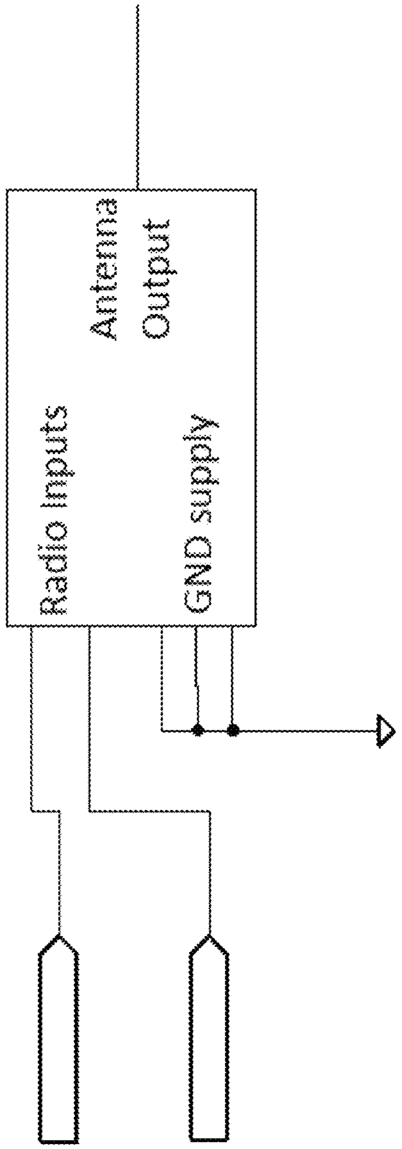
Figure 57A:
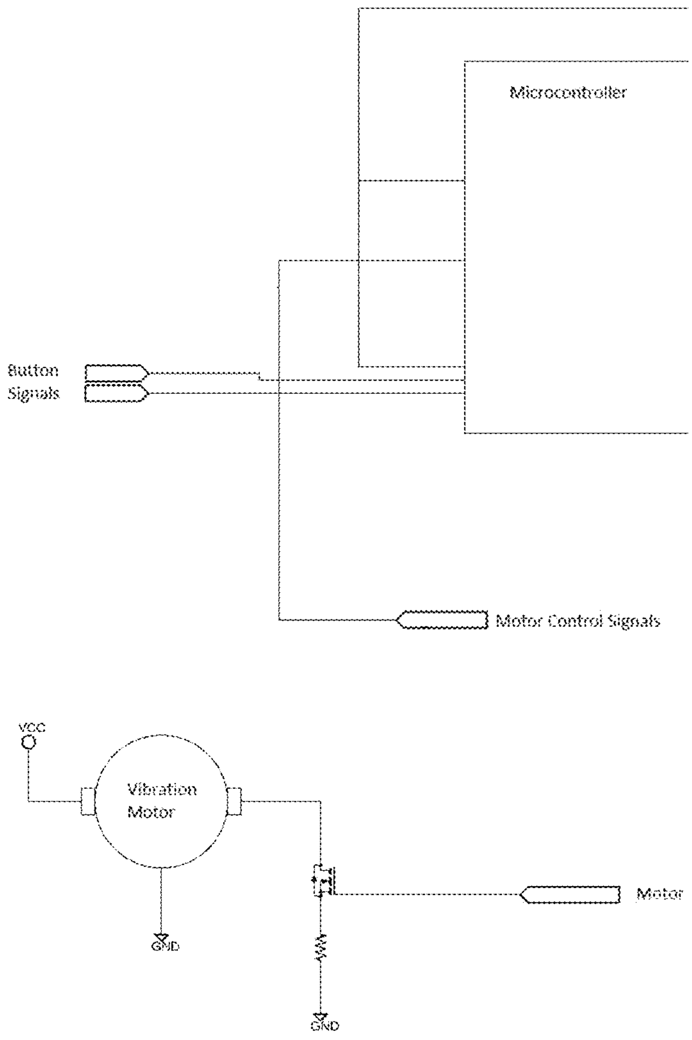
FIGS. 57A-57D are schematic diagrams of the electronics associated with an exemplary actuator unit.
Figure 57B:
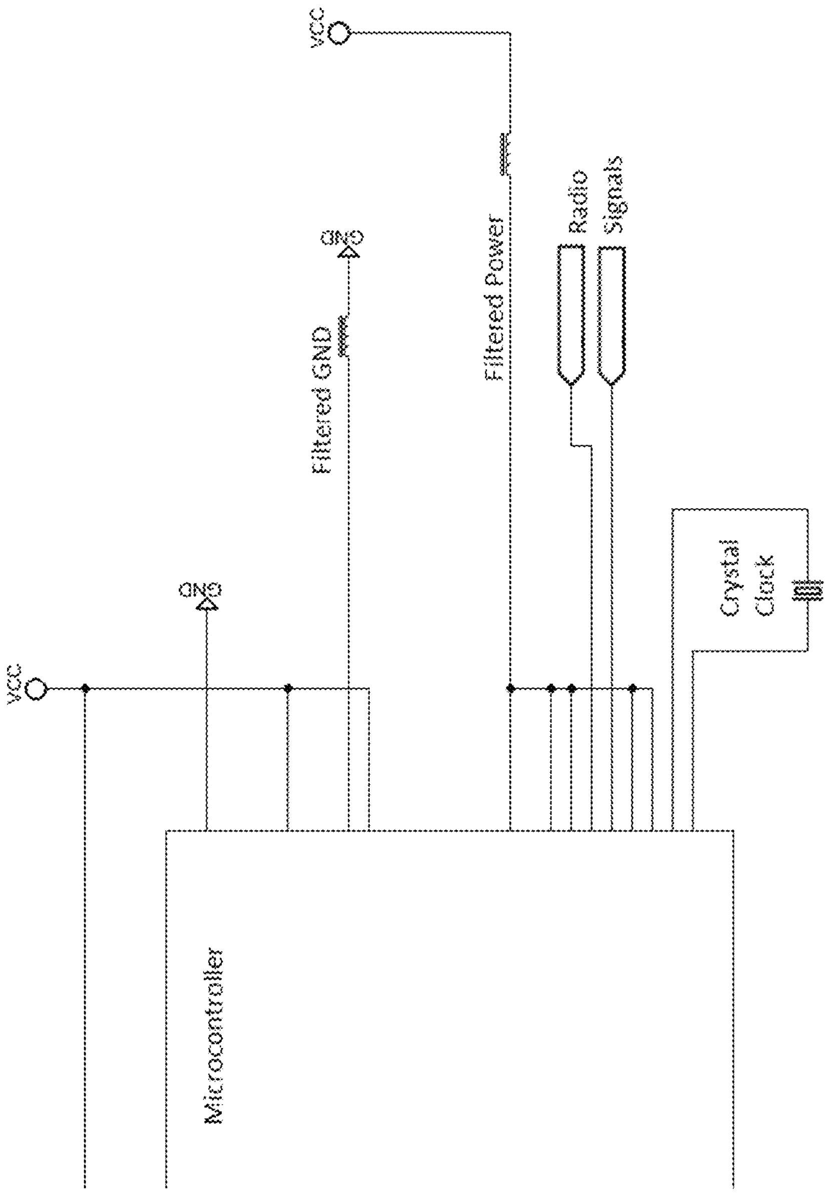
Figure 57C:
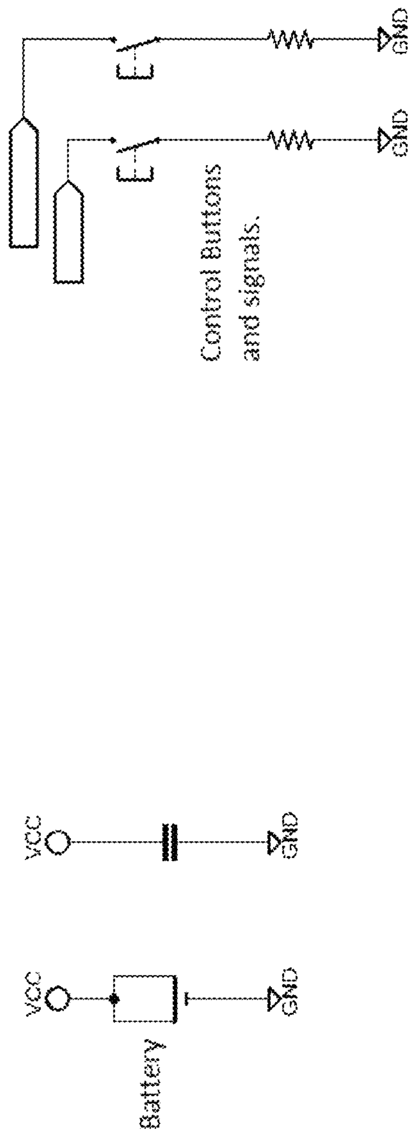
Figure 57D:
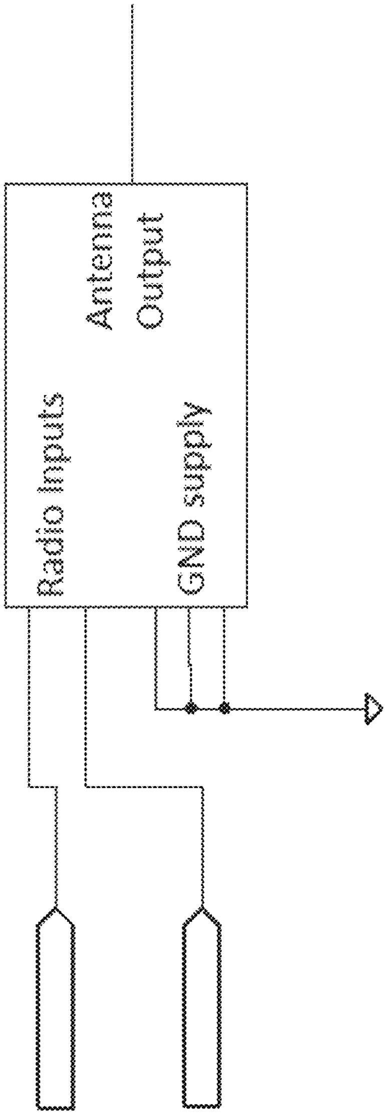

From the user's standpoint, there may be a setup process for calibrating and/or pairing the deadbolt control system. FIGS. 51 and 54 show an exemplary calibration function of an exemplary deadbolt control system. FIG. 51 shows an exemplary pairing function of an exemplary deadbolt control system. Exemplary deadbolt interface units 100 may have a user interface (e.g. at least one button) for calibrating/resetting actuator units 200, a user interface (e.g. at least one button) for pairing actuator units 200, and/or a multipurpose user interface (e.g. a switch with multiple settings) for both calibrating/resetting and pairing actuator units 200. (This interface may be accessible from inside the battery access door of the deadbolt interface units 100.)

Although the actual set up steps may vary, from the standpoint of the user, setup might only require activating (e.g. by interacting with a user interface) the calibration function. The calibration function could include an initial pairing function for pairing the deadbolt interface units 100 to an initial actuator unit 200. The setup process may also allow pairing (e.g. by interacting with a user interface) of a new or additional actuator unit 200 (or an initial actuator unit 200 if one was not paired as part of the calibration process) and/or re-pairing a previously paired actuator unit 200 (e.g. an actuator unit 200 that lost power or otherwise lost its pairing) to the deadbolt interface unit 100.

For the pairing function, preferably the deadbolt control system uses an "advanced pairing capability" that allows at least one actuator unit 200 (e.g. a plurality of actuator units 200) to be paired to one deadbolt interface unit 100 or, vice versa. For example, a user caring for a relative may have a single actuator unit 200 controlling both his deadbolt interface unit 100 and the relative's deadbolt interface unit 100. Multiple people in a household can each have their own actuator unit 200 for the home's deadbolt interface unit 100. If there are multiple deadbolt interface units 100 on a house (e.g. a deadbolt interface unit on the front door and a deadbolt interface unit on the back door), then each person's actuator unit 200 can control multiple deadbolt interface units 100.

Deadbolt Interface Unit 100

The deadbolt interface unit 100 is associated with the deadbolt manual egress handle 52 and preferably associated (e.g. remotely via signals) with the at least one actuator unit 200. There are three ways to interact with the deadbolt interface unit 100: using an actuator unit 200 in a remote mode, using a deadbolt interface unit manual egress handle 110 manually in a manual mode, and using a key or other device (e.g. lock picking tool) manually in an intruder mode. For each of these modes there is a locking function and an unlocking function. Using the actuator unit 200 in the remote mode, a user can both lock and unlock an associated deadbolt lock 50. Using the manual egress handle 110 in the manual mode, a user can both lock and unlock an associated deadbolt lock 50. Using the key or other device in the intruder mode, a user can neither lock nor unlock an associated deadbolt lock 50. As described herein, in the manual mode, only the deadbolt interface unit manual egress handle controls locking and unlocking the deadbolt lock and, in the remote mode, only the at least one actuator unit controls locking and unlocking the deadbolt lock.

FIG. 1 shows an overview of the internal components deadbolt interface unit 100 including, but not limited to, a deadbolt interface unit manual egress handle 110, a deadbolt interface unit printed circuit board (PCB) 120, a deadbolt interface unit motor 130, a deadbolt interface unit gear train 140, and a deadbolt interface unit power source 158 (e.g. a battery pack). Some of the other features of the deadbolt interface unit 100 or components associated with the deadbolt interface unit 100 are discussed elsewhere herein.

As shown (e.g. in FIGS. 1, 8, and 9), the outer physical appearance of an installed deadbolt interface unit 100 may include a housing 102 with an access door 102' (through which the power source 158 may be accessed). The deadbolt interface unit manual egress handle 110 is shown as prominently featured on the outer face of the housing 102. Means for providing visual feedback (e.g. an LED 101) and/or audible feedback (e.g. a speaker (not shown)) may also be on the outer face of the housing 102. Some housings may include other means for the user to interface with the deadbolt interface unit 100 including, but not limited to, buttons (e.g. for calibration or reset), numeric touch pad, screens (touch or normal (not responsive to touch)), fingerprint sensor, voice input, motion interpreter (a sensor that can interpret motions—e.g. for hands-free use), and/or other known or yet to be discovered interface mechanisms.

Associated with (e.g. mounted upon or functionally connected to) the deadbolt interface unit printed circuit board (PCB) 120 is a deadbolt interface unit controller 122, a deadbolt interface unit transceiver 124, and a deadbolt interface unit motor driver 126. Exemplary hardware of the PCB 120 is shown in FIGS. 56A-56F.

The controller 122 preferably includes the software (e.g. programs and subprograms) and hardware (e.g. processors and memory) necessary to control the functions of the deadbolt interface unit 100 described herein. The software would include, for example, instructions to implement functions and control subcomponents including, but not limited to, those shown in FIGS. 50-55.

The shown transceiver 124 may communicate, for example, with the transceiver 224 using, for example, an Advanced Encryption Standard (AES) 128-bit encoded radio frequency (RF) signal. (It should be noted that other levels of encoding (e.g. 512-bit) and other coding schemes are possible.) The communications may be, for example, instructions pertaining to unlocking, locking, and resetting. The transceiver 124 may include, be replaced with, and/or be augmented by other technology that may be used to implement "signals," "communications," and/or "transmissions" including, but not limited to, the shown associated antenna 124'.

Figure 21:
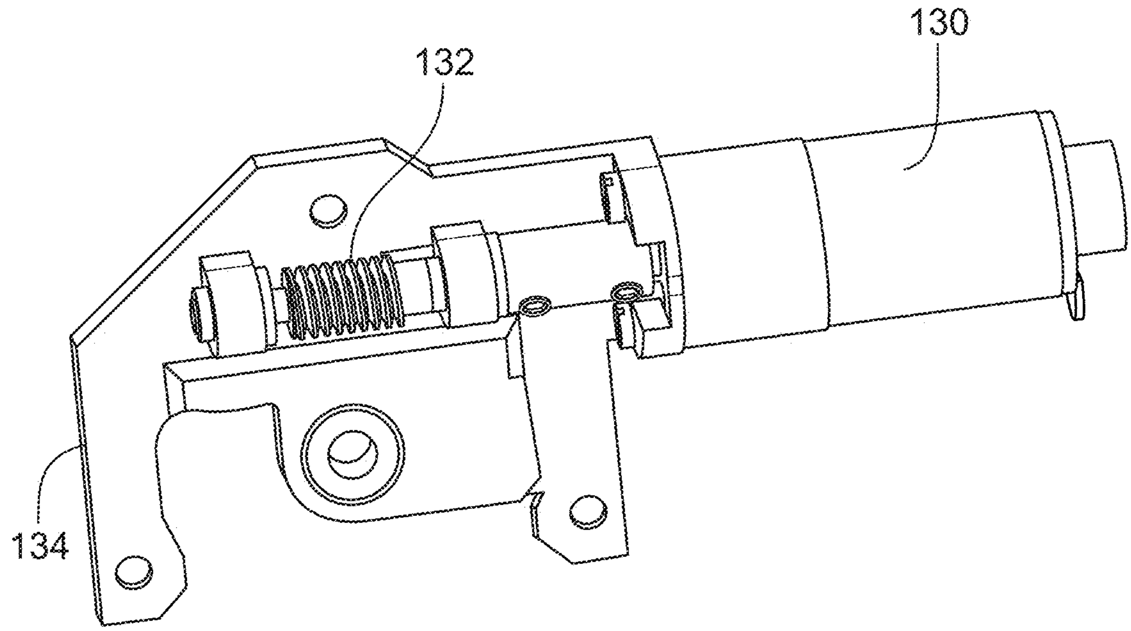
FIG. 21 is a perspective view of an exemplary motor drive assembly including a motor and a worm gear.
Figure 22:
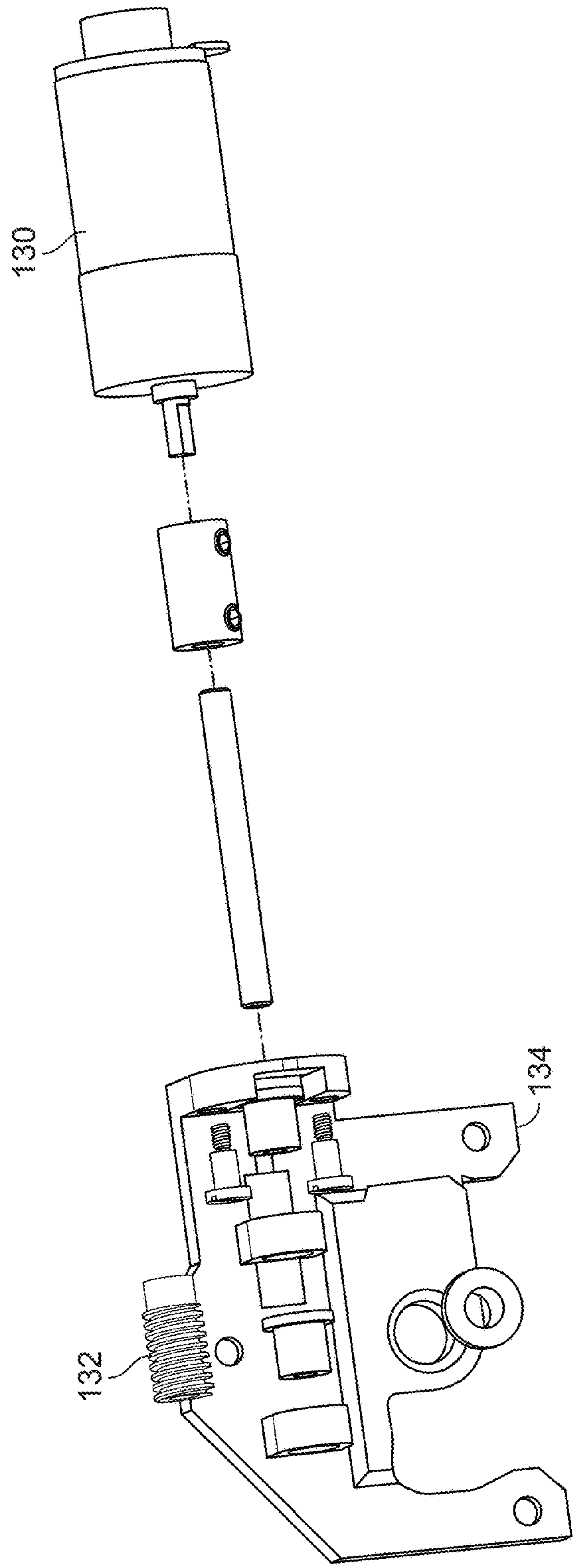
FIG. 22 is an exploded view of the exemplary motor drive assembly of FIG. 21.
Figure 23:
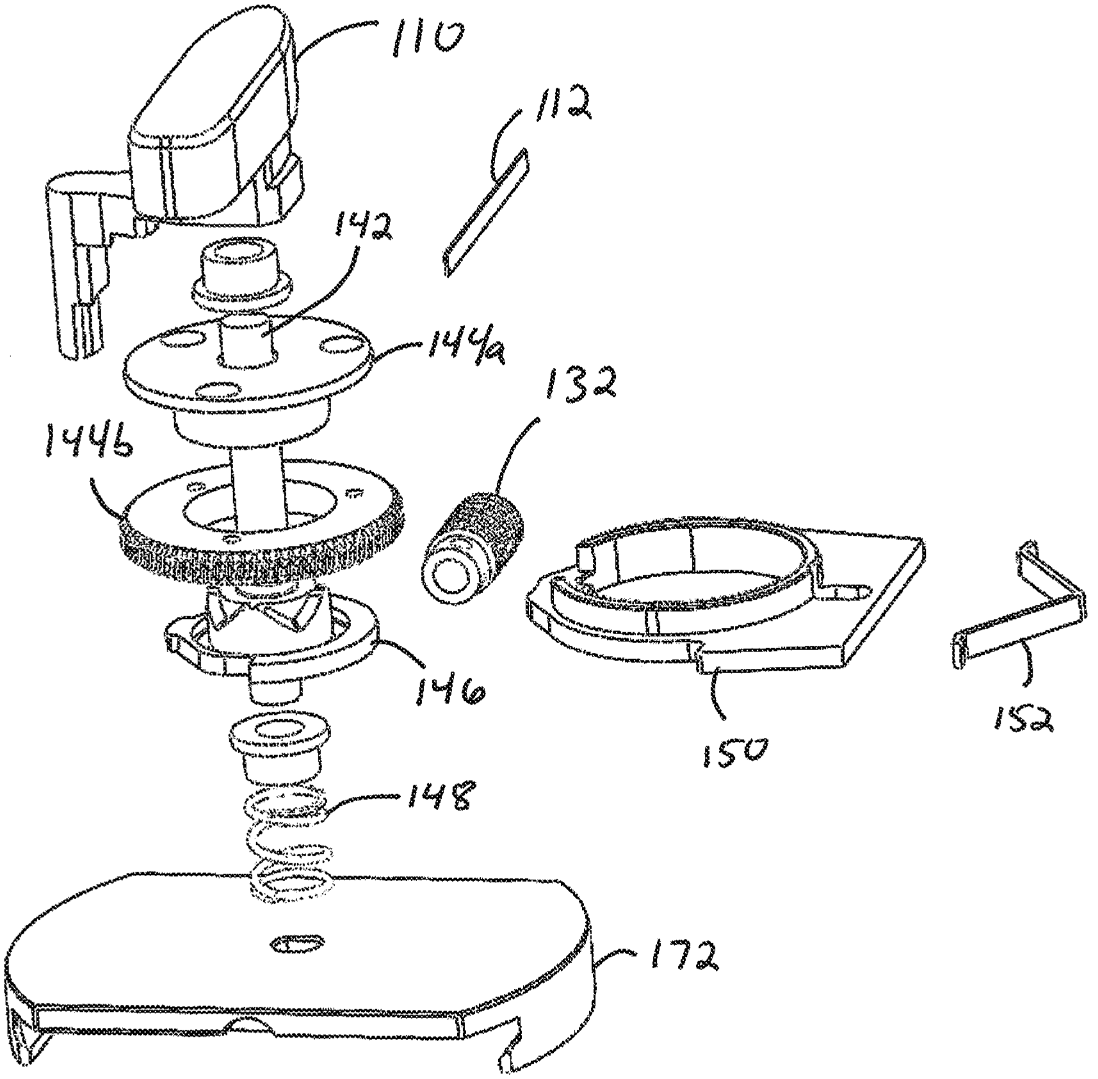
FIG. 23 is an exploded view of the gear train and associated components.
Figure 24A:
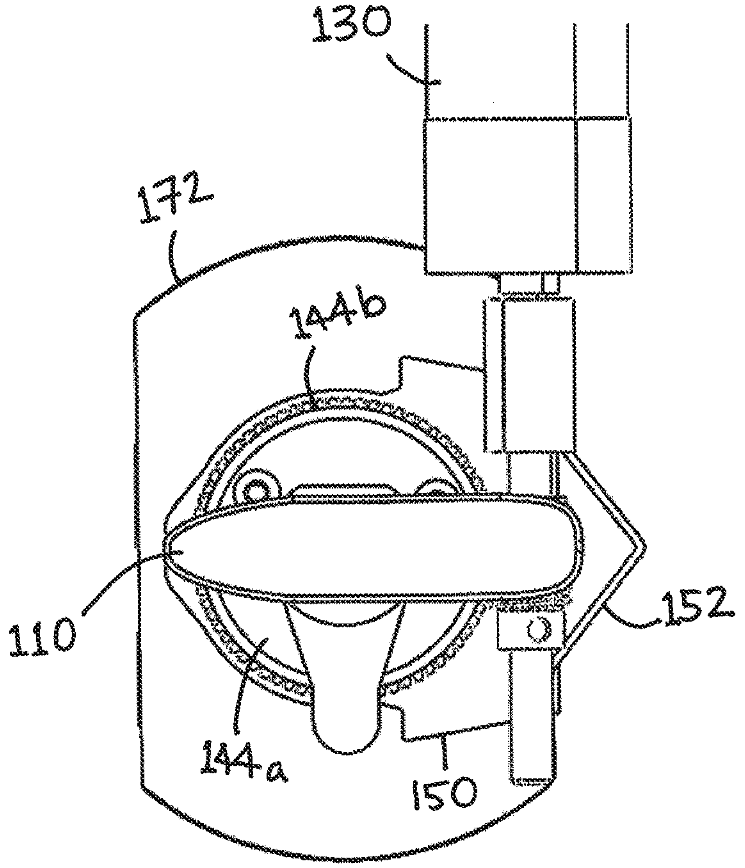
FIG. 24A shows a front view of the gear train in the unlocked initial position as the manual egress handle is used manually to lock the associated deadbolt lock (manual mode).
Figure 24B:
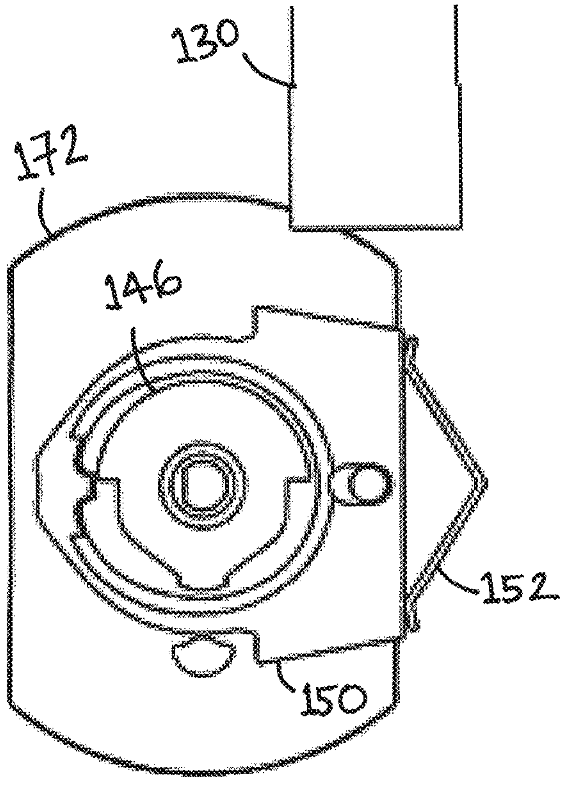
FIG. 24B shows a front view of the gear train (with the manual egress handle and worm wheel removed) in the unlocked initial position as the manual egress handle is used manually to lock the associated deadbolt lock (manual mode).
Figure 25A:
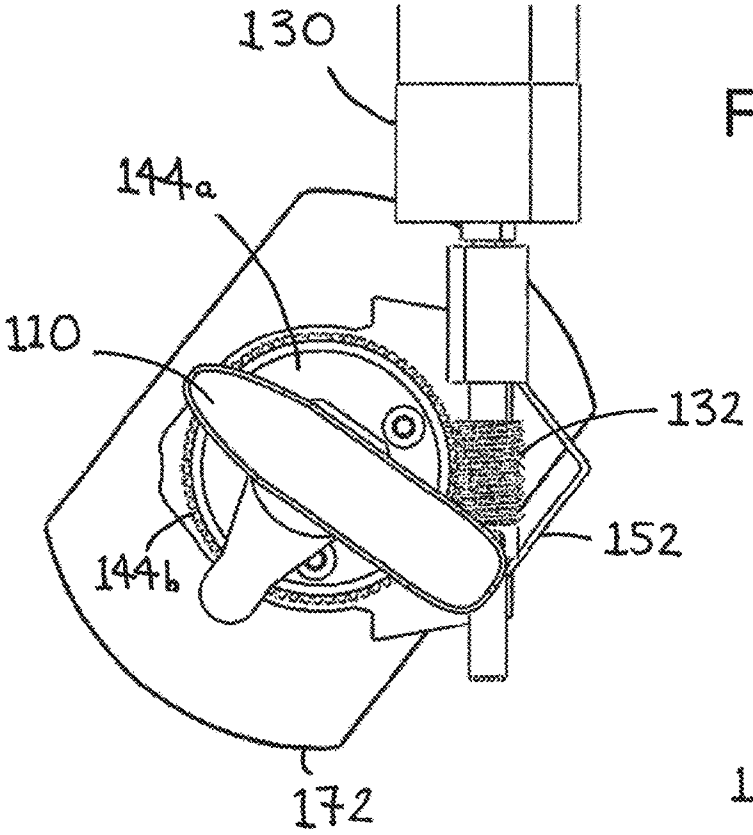
FIG. 25A shows a front view of the gear train in the mid-way position as the manual egress handle is used manually to lock the associated deadbolt lock (manual mode).
Figure 25B:
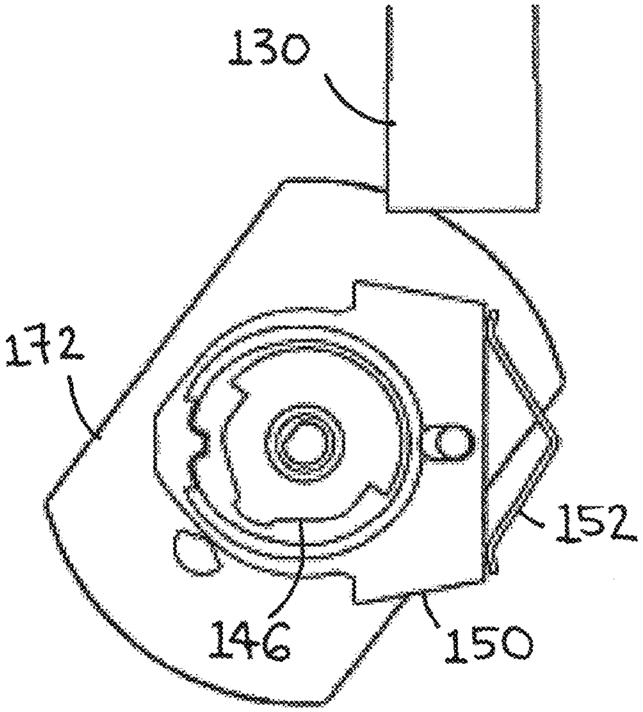
FIG. 25B shows a front view of the gear train (with the manual egress handle and worm wheel removed) in the mid-way position as the manual egress handle is used manually to lock the associated deadbolt lock (manual mode).
Figure 25C:
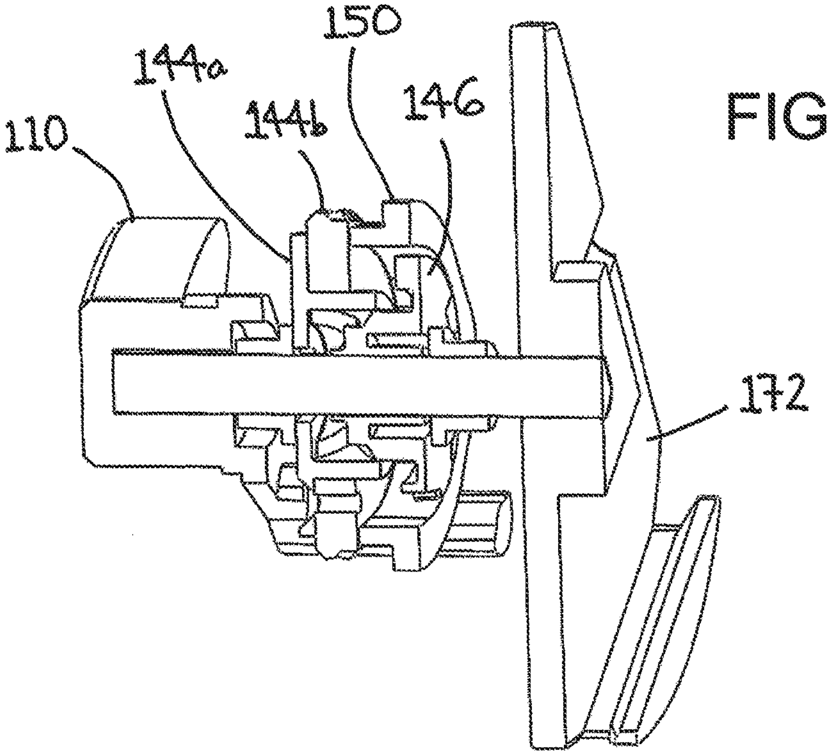
FIG. 25C shows a cross-sectional side view of the gear train in a mid-way position as the manual egress handle is used manually to lock the associated deadbolt lock (manual mode).
Figure 25D:
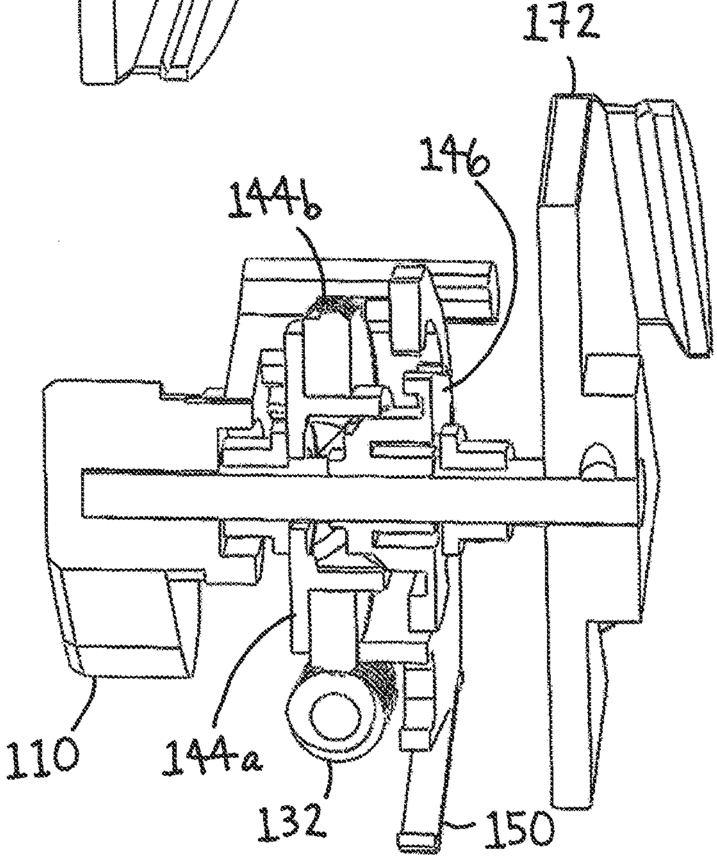
FIG. 25D shows a cross-sectional top view of the gear train in the mid-way position as the manual egress handle is used manually to lock the associated deadbolt lock (manual mode).

The motor driver 126 controls the motor 130. FIGS. 21 and 22 show an exemplary motor 130 for driving the worm gear 132. As shown, the worm gear 132 is functionally connected to and rotatable by motor 130, both of which may be mounted on a surface (e.g. a bearing spider 134). A series of exemplary mechanical connectors (shown as bushings, a shaft, and a coupler) may be used to implement this connection. The motor 130 may be activated by the user selecting an unlock function (e.g. pushing a button) using the actuator unit 200. The motor 130 then rotates the worm gear 132.

An exemplary gear train 140 (including components thereof and components associated therewith) is shown in FIGS. 1 and 23-45. In describing the gear train 140, for purposes of orientation, the portion of the gear train 140 closer or proximate to the door will be described with words such as "inner," "rear," and "down" (the term "down" is not entirely accurate, but because of some of the figures' orientation, it has been used). Similarly, the portion of the gear train 140 farther or remote from the door will be described with words such as "outer," "front," and "up" (the term "up" is not entirely accurate, but because of some of the figures' orientation, it has been used). Theoretically, alternative configurations are possible if the deadbolt interface unit 100 can perform the same functions. Unless specifically claimed, therefore, the description of the configuration is meant to be exemplary and not limit the scope of the invention. The following paragraphs detail components of the exemplary gear train 140, exemplary components associated therewith, and the configuration thereof. The main components of the shown exemplary gear train 140 including, but not limited to, a shaft 142, a deadbolt interface unit manual egress handle 110, a worm wheel 144, a drive crown 146, and a passage control plate 150 (also referred to as the unlock stop plate 150).

The shaft 142 preferably has a manual egress handle 110 (FIG. 36) and an egress handle spring 112 (FIG. 23) at an outer end (or front end), and a coupling lock slide 172 (FIGS. 15-16) at the inner end (or rear end). Rotating the shaft 142 rotates the coupling lock slide 172, which rotates the coupling insert 176, which rotates the adapter 160, which rotates the deadbolt manual egress handle 52, which locks and/or unlocks the deadbolt lock 50. The shaft 142 is preferably (and is shown as) an elongated "coordinated" (keyed) shaft 142 having a longitudinal flat portion 143 (although other types of keying are possible). Some of the central apertures through which the coordinated shaft 142 extends are coordinated (keyed) with the coordinated shaft such that the interior surface of the coordinated central apertures have shapes that mate (match or work with) the external surface of the coordinated shaft. Components with central apertures that are coordinated to match the shape of the coordinated shaft rotate with the coordinated shaft 142. Components with central apertures that are not coordinated to match the shape of the coordinated shaft do not rotate with the coordinated shaft 142. That being said, there are known alternative ways to make some components rotate with a shaft and other components not rotate with the shaft.

The shown deadbolt interface unit manual egress handle 110 (also referred to as the manual egress handle 110) (FIG. 36) includes a gripping portion (e.g. a knob 111*a* that is gripped by the user to be turned) and a downwardly (toward the door) projecting leg 111*b*. The manual egress handle 110 has a pivot that corresponds to the intersection of the manual egress handle 110 and the shaft 142. For example, the lower surface of the knob 111*a* may have a coordinated central aperture (see, for example, the cross-sectional side views of FIGS. 24C-D to FIGS. 35C-D) that intersects with the outer end (or front end) coordinated shaft 142. Because they are coordinated, rotating the manual egress handle 110 causes the coordinated shaft 142 to rotate together. The shown projecting leg 111*b* is off center from the pivot of the manual egress handle 110 and would be substantially parallel to the shaft 142. When the manual egress handle 110 is rotated, the leg 111*b* interacts with the peripheral edge of the passage control plate 150 to push the passage control plate 150 out of the way of the drive crown 146 so the drive crown 146 can lower (move toward the door) and move independently from (but remain physically connected to) the worm wheel 144. An egress handle spring 112 (FIG. 23) helps to position the manual egress handle 110.

The worm wheel 144 (FIGS. 37-38) is shown as having a wheel crown 144*a*. The worm wheel 144 can be thought of as a traditional worm wheel gear 144*b* with a centrally located worm wheel crown 144*a*. The worm wheel crown 144*a* and the traditional worm wheel gear 144*b* may be constructed separately or as a unitary worm wheel 144. The shown worm wheel 144 has a central aperture 145*a* through which the shaft 142 extends. The worm wheel central aperture 145*a* is shown as being circular (without a flat edge that would be coordinated with the coordinated shaft 142) so that the worm wheel 144, without the assistance of other structure, does not rotate with the coordinated shaft 142 in manual mode. The rear (door side) of the worm wheel crown 144*a* is shown as having peaks 145*b* and valleys 145*c* surrounding the central aperture 145*a*. The shown worm wheel 144 preferably has an outer "toothed" (teeth 145*d*) circumference suitable for interacting with the worm gear 132. In remote mode, when the actuator unit 200 is used for locking or unlocking, the worm gear 132 rotates, which causes the worm wheel 144 to rotate, which causes the drive crown 146 to rotate, which causes the shaft 142 to rotate, which ultimately locks and/or unlocks the deadbolt lock 50.

Figure 39:
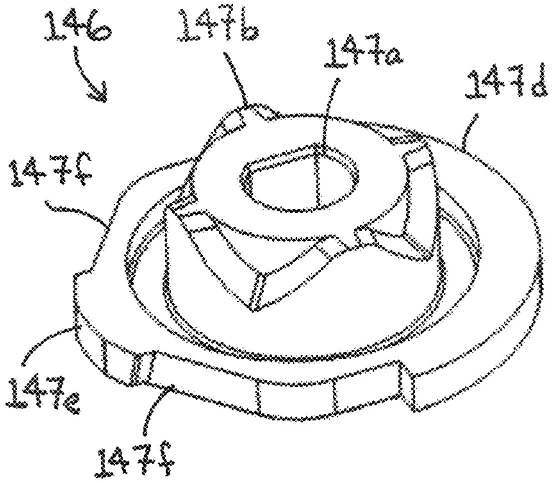
FIG. 39 is a front view of an exemplary drive crown.
Figure 40:
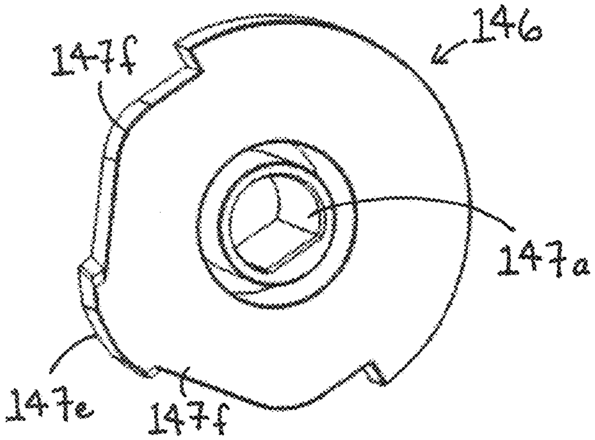
FIG. 40 is a rear perspective view of the exemplary drive crown of FIG. 39.
Figure 41:
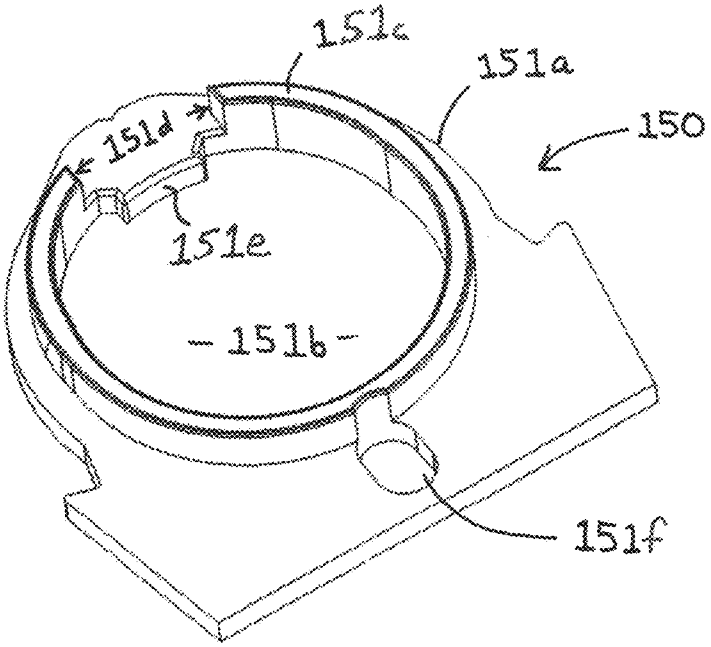
FIG. 41 is a perspective view of an exemplary passage control plate.

The drive crown 146 (FIGS. 39-40) preferably has a coordinated central aperture 147*a* (shown has having a flat portion of its inner diameter that would mate with the flat portion 143 of the coordinated shaft 142) through which the coordinated shaft 142 extends. Because of this coordination (keying), the drive crown 146 and the shaft 142 rotate in tandem. As shown in FIG. 39, the front of the drive crown 146 has peaks 147*b* (that selectively nest/interact with the valleys 145*c* of the worm wheel crown 144*a*) and valleys 147*c* (that selectively nest/interact with the peaks 145*b* of the worm wheel crown 144*a*) surrounding the central aperture 147*a*. When the drive crown 146 nests with the worm wheel crown 144*a*, they rotate in tandem (and the shaft 142 and all the coordinated components rotate with them). When the drive crown 146 and the worm wheel crown 144*a* are not nested, the drive crown 146 rotates independently of the worm wheel crown 144*a*. The drive crown 146 is shown as having an outer circumference that includes an arcuate portion 147*d*, a projecting tongue 147*e* opposite the arcuate portion 147*d*, and a transition surface 147*f* between the projecting tongue 147*e* and the arcuate portion 147*d*.

A compression spring 148 (FIG. 23) is shown as positioned below the drive crown 146 for urging components such as the drive crown 146, shaft 142, and egress handle 110, which is upwards (away from the door).

The passage control plate 150 (FIGS. 41-43) is shown as having a plate body 151*a* with a large plate opening 151*b* defined therein. The majority of the plate opening 151*b* has a diameter just slightly longer than the longest diameter of the drive crown 146 (from the outer edge of the projecting tongue 147*e* to the outer edge of the arcuate portion 147*d*). The plate opening 151*b* is shown as being mostly surrounded by a plate peripheral wall 151*c*. There is an optional opening 151*d* in the plate peripheral wall 151*c*. An inwardly projecting plate tongue 151*e* that projects into the plate opening 151*b* is designed to selectively interact with the projecting tongue 147*e*. When the projecting tongue 147*e* is at least partially above (away from the door) the projecting plate tongue 151*e*, the drive crown 146 cannot lower (move toward the door). The part of the plate body 151*a* substantially near the worm gear 132 is designed (angled) to work with plate guide projections 108*a*. An oblong aperture 151*f* (between the plate peripheral wall 151*c* and the edge of the plate body 151*a* substantially near the worm gear 132) interacts with at least one nub projection 108*b* such that the distance the passage control plate 150 can slide is limited by the movement of the nub projection 108*b* within the oblong aperture 151*f*.

A plate return spring 152 (FIGS. 42-43) is designed to urge the passage control plate 150 toward the shaft 142 and away from the worm gear 132. As shown, the plate return spring 152 is fixed to (or integral with) a spring support projection 108*c*. The plate return spring 152 provides pressure or force against the edge of the passage control plate 150. When the projecting tongue 147*e* is aligned with the inwardly projecting plate tongue 151*e*, the pressure or force of the plate return spring 152 causes the projecting tongue 147*e* to be supported by the inwardly projecting plate tongue 151*e*. This causes the passage control plate 150 to prevent (block) the drive crown 146 from lowering (moving toward the door) which, in turn, prevents the shaft 142 from rotating (and thereby opening the deadbolt lock 50).

Additional components such as standoffs and bearings are shown, but not specifically described.

FIGS. 24-35 show exemplary mechanical steps of the deadbolt interface unit 100, gear train 140, and associated components. Details of the mechanical steps' subtleties are also shown in FIGS. 42-49.

Figure 27C:
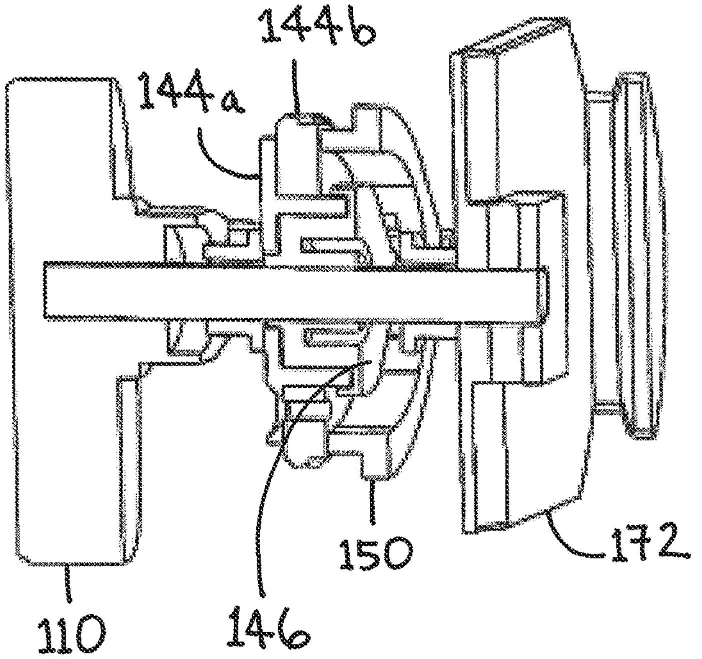
FIG. 27C shows a cross-sectional side view of the gear train in a locked initial position as the manual egress handle is used manually to unlock the associated deadbolt lock (manual mode).
Figure 27D:
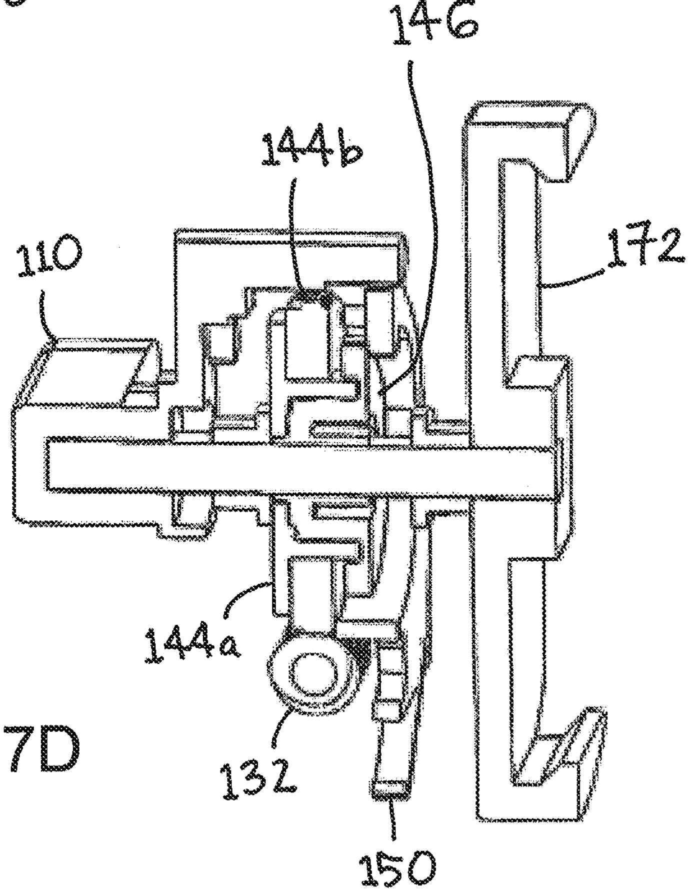
FIG. 27D shows a cross-sectional top view of the gear train in the locked initial position as the manual egress handle is used manually to unlock the associated deadbolt lock (manual mode).
Figure 28A:
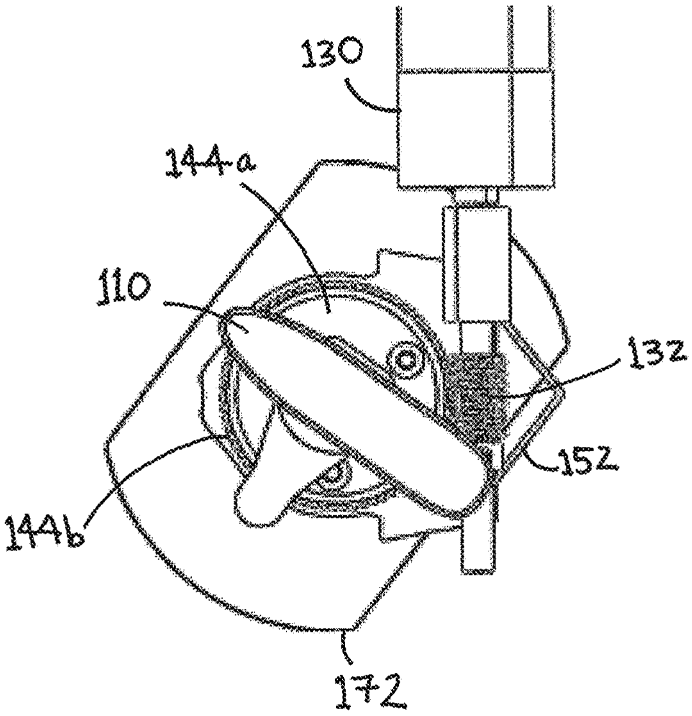
FIG. 28A shows a front view of the gear train in the mid-way position as the manual egress handle is used manually to unlock the associated deadbolt lock (manual mode).
Figure 28B:
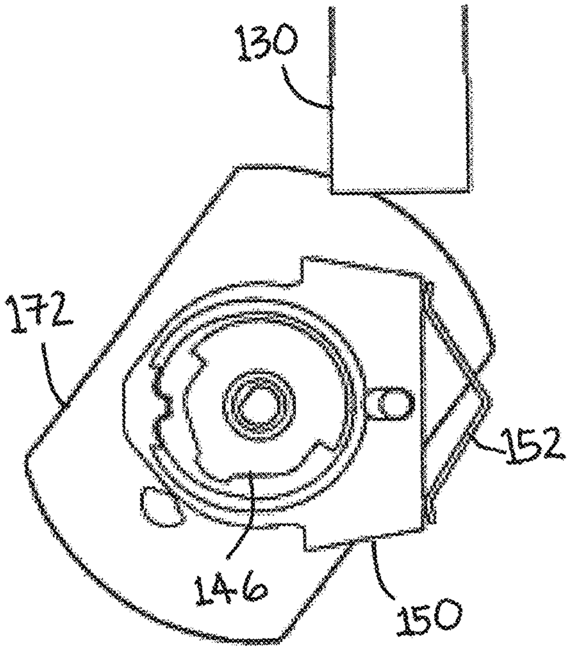
FIG. 28B shows a front view of the gear train (with the manual egress handle and worm wheel removed) in the mid-way position as the manual egress handle is used manually to unlock the associated deadbolt lock (manual mode).
Figure 28C:
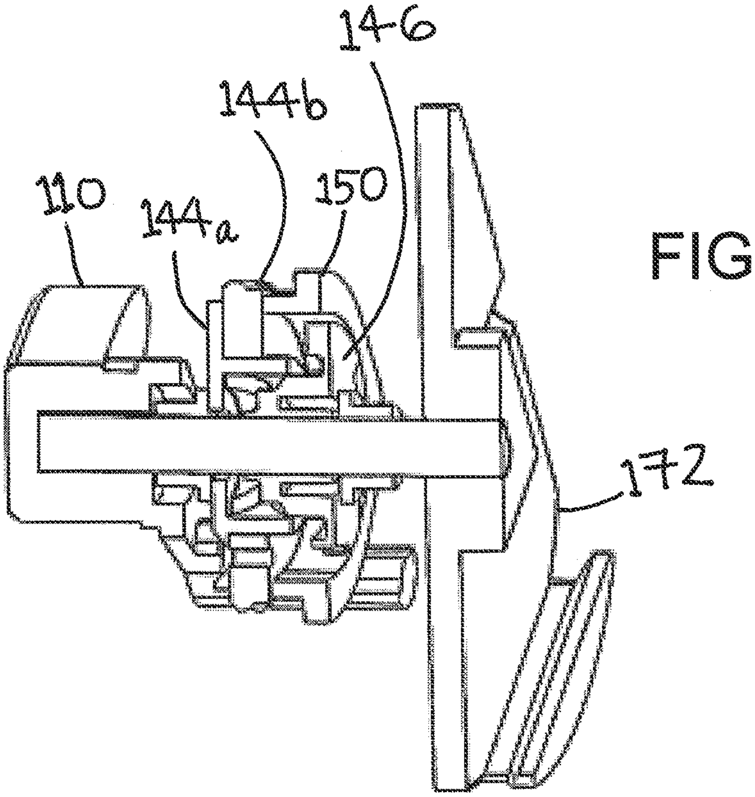
FIG. 28C shows a cross-sectional side view of the gear train in a mid-way position as the manual egress handle is used manually to unlock the associated deadbolt lock (manual mode).
Figure 28D:
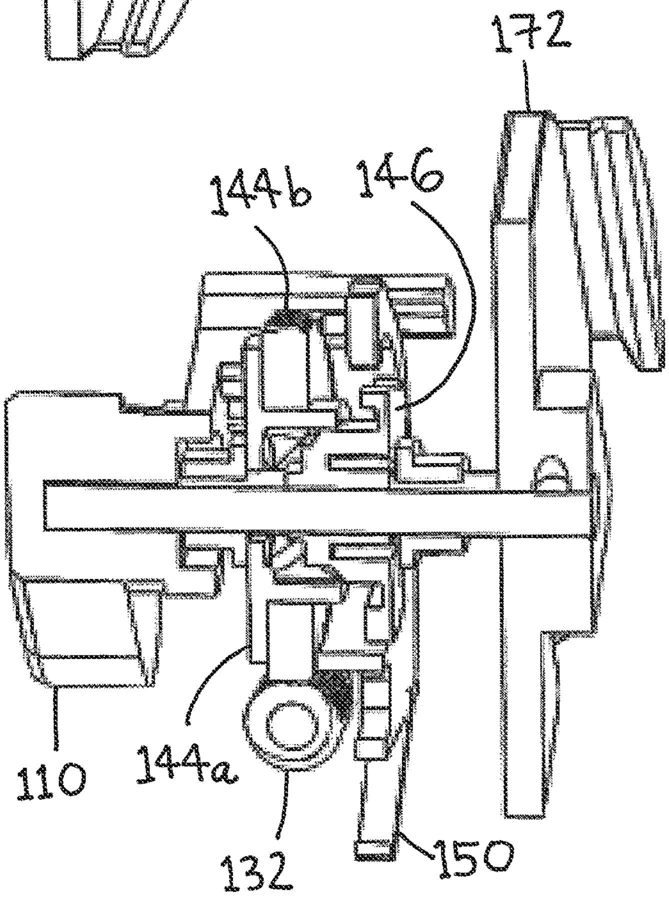
FIG. 28D shows a cross-sectional top view of the gear train in the mid-way position as the manual egress handle is used manually to unlock the associated deadbolt lock (manual mode).
Figure 29A:
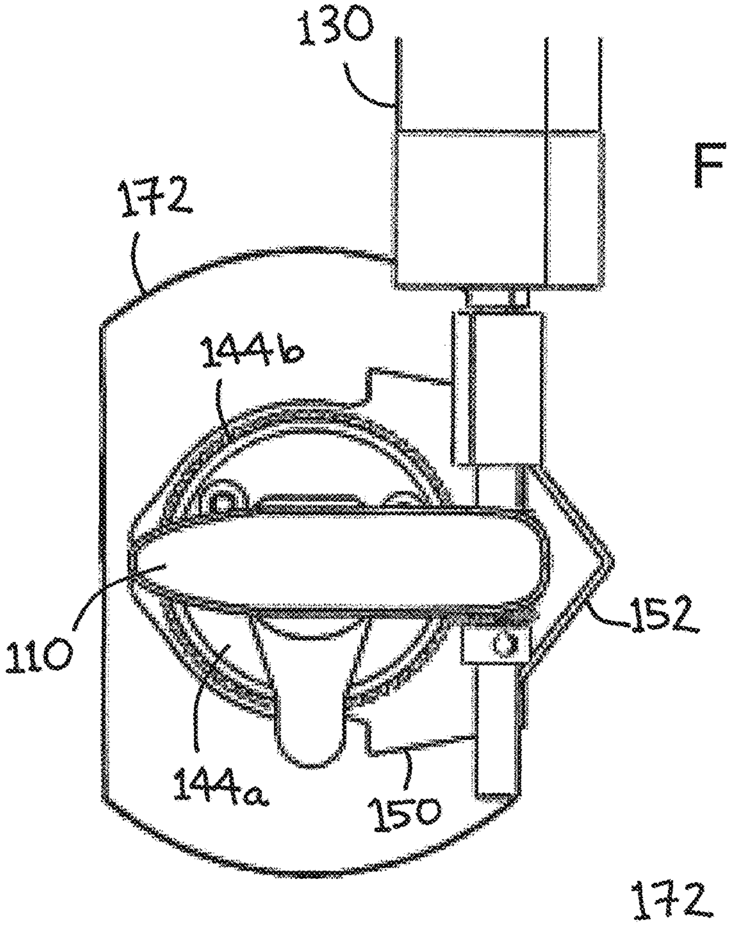
FIG. 29A shows a front view of the gear train in the unlocked finished position as the manual egress handle is used manually to unlock the associated deadbolt lock (manual mode).
Figure 29B:
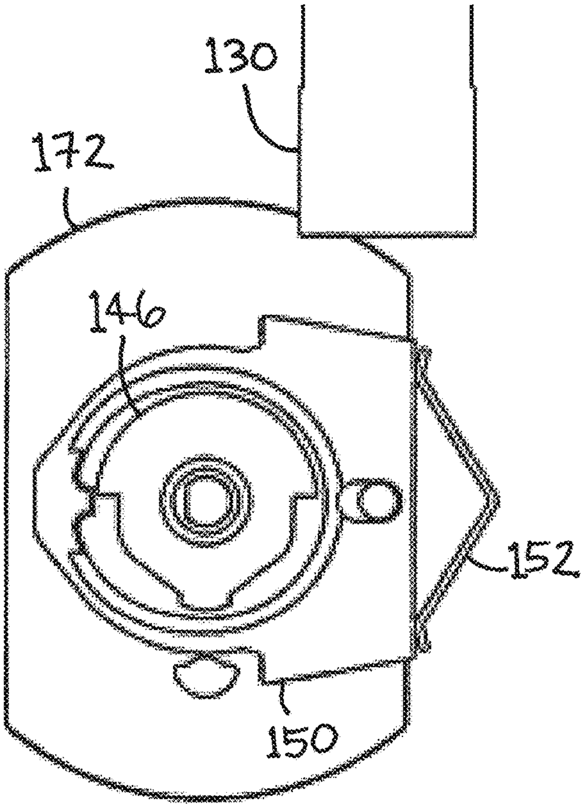
FIG. 29B shows a front view of the gear train (with the manual egress handle and worm wheel removed) in the unlocked finished position as the manual egress handle is used manually to unlock the associated deadbolt lock (manual mode).
Figure 29C:
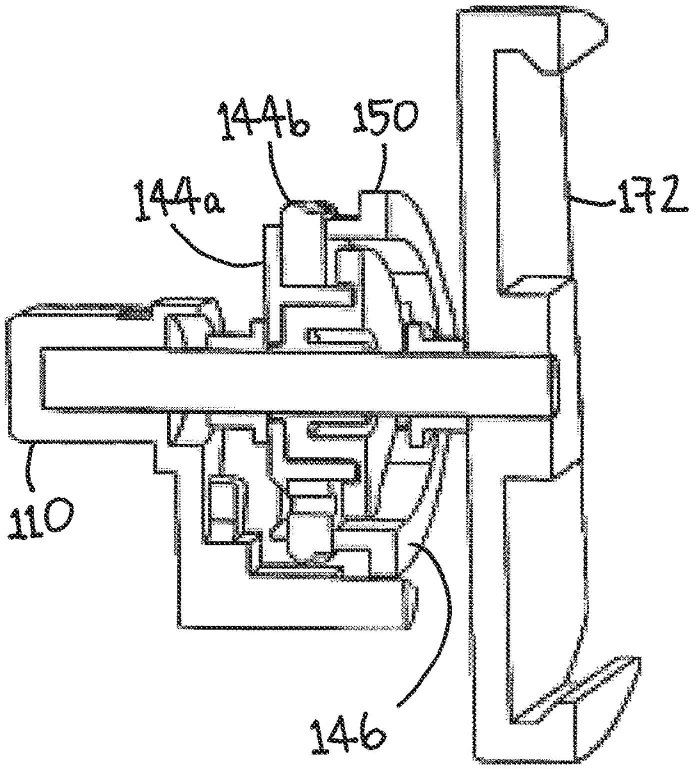
FIG. 29C shows a cross-sectional side view of the gear train in an unlocked finished position as the manual egress handle is used manually to unlock the associated deadbolt lock (manual mode).
Figure 29D:
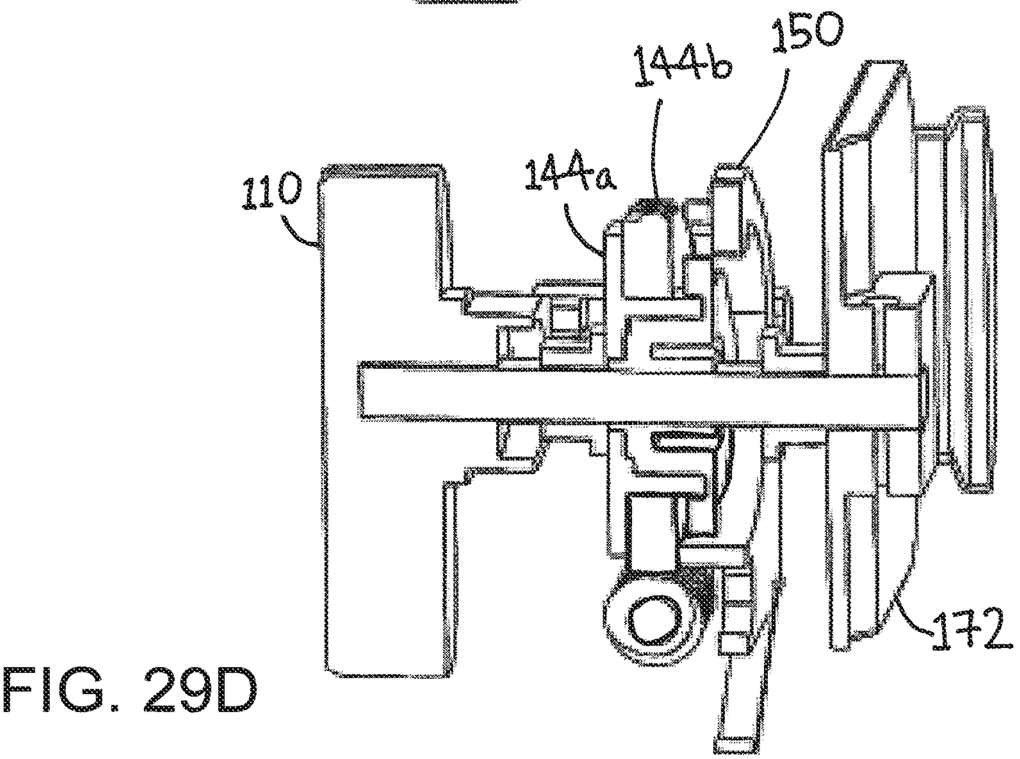
FIG. 29D shows a cross-sectional top view of the gear train in the unlocked finished position as the manual egress handle is used manually to unlock the associated deadbolt lock (manual mode).
Figure 30A:
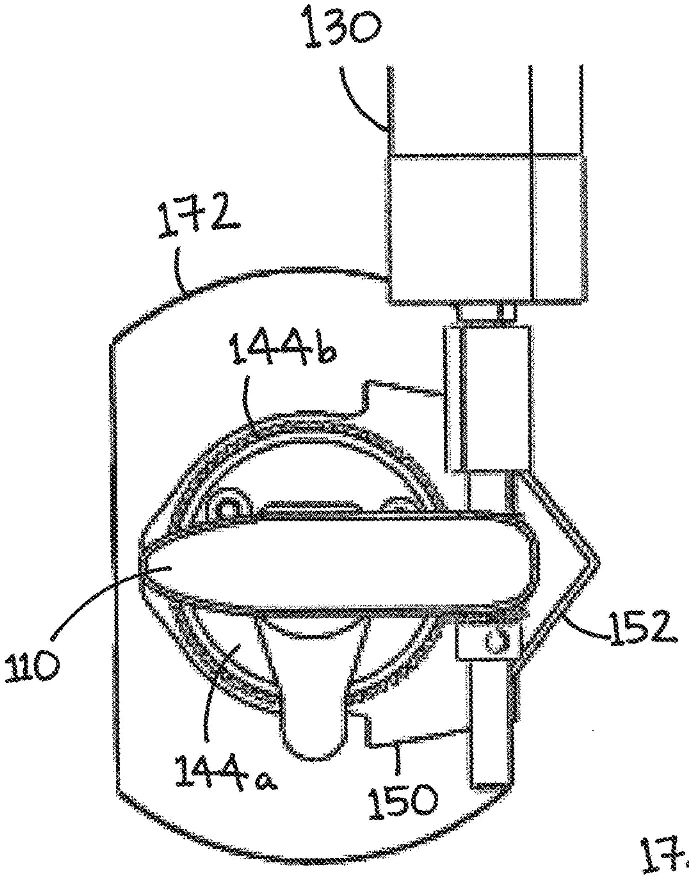
FIG. 30A shows a front view of the gear train in the unlocked initial position as the actuator unit is used to lock the associated deadbolt lock (remote mode).
Figure 30B:
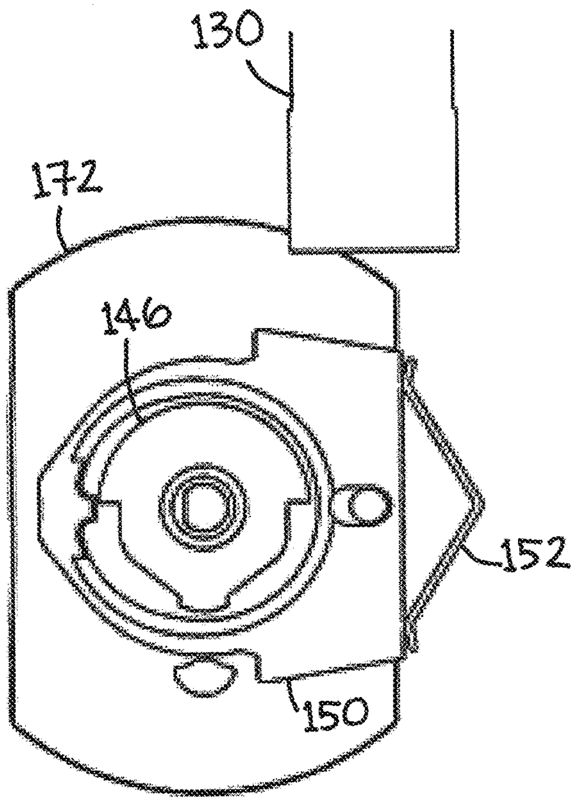
FIG. 30B shows a front view of the gear train (with the manual egress handle and worm wheel removed) in the unlocked initial position as the actuator unit is used to lock the associated deadbolt lock (remote mode).
Figure 30C:
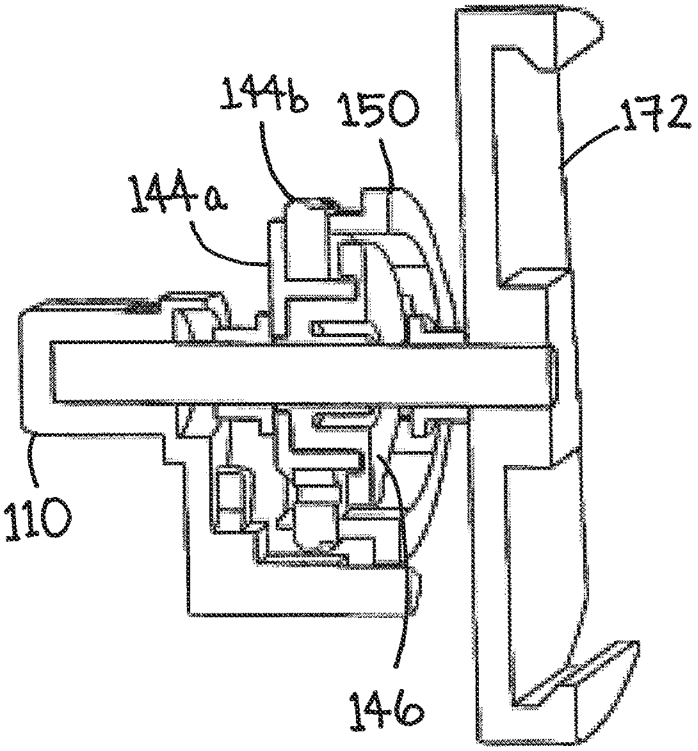
FIG. 30C shows a cross-sectional side view of the gear train in an unlocked initial position as the actuator unit is used to lock the associated deadbolt lock (remote mode).
Figure 30D:
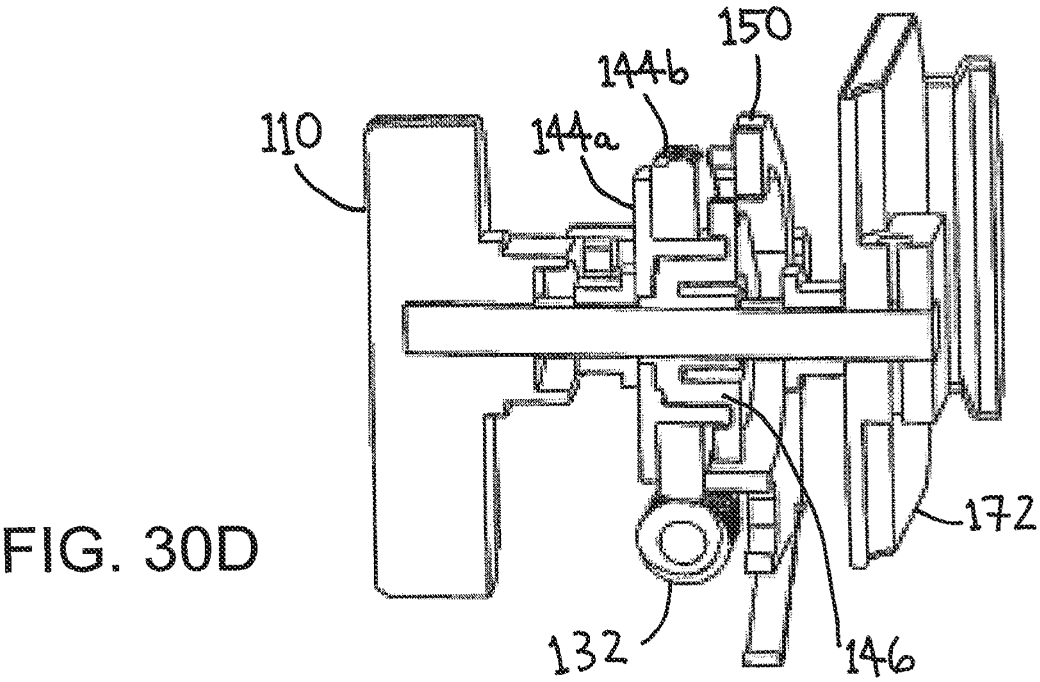
FIG. 30D shows a cross-sectional top view of the gear train in the unlocked initial position as the actuator unit is used to lock the associated deadbolt lock (remote mode).
Figure 31A:
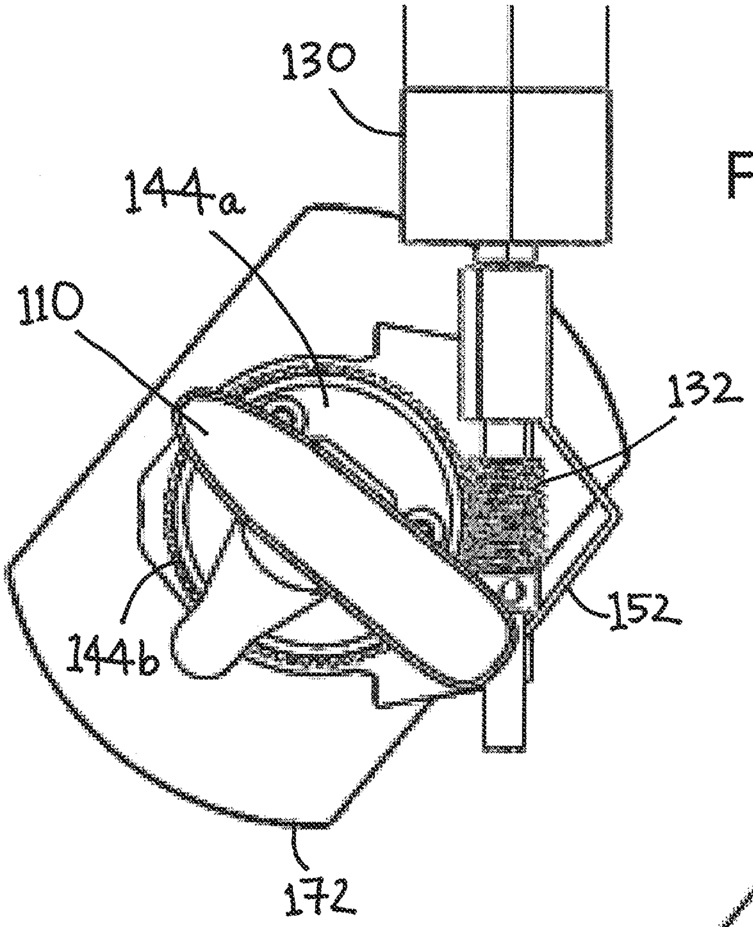
FIG. 31A shows a front view of the gear train in the mid-way position as the actuator unit is used to lock the associated deadbolt lock (remote mode).
Figure 31B:
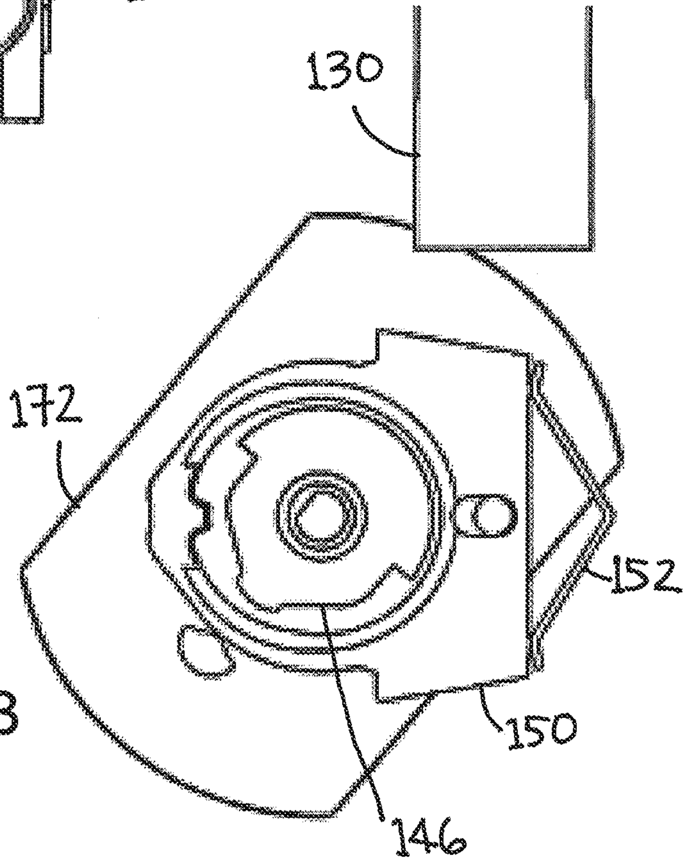
FIG. 31B shows a front view of the gear train (with the manual egress handle and worm wheel removed) in the mid-way position as the actuator unit is used to lock the associated deadbolt lock (remote mode).
Figure 31C:
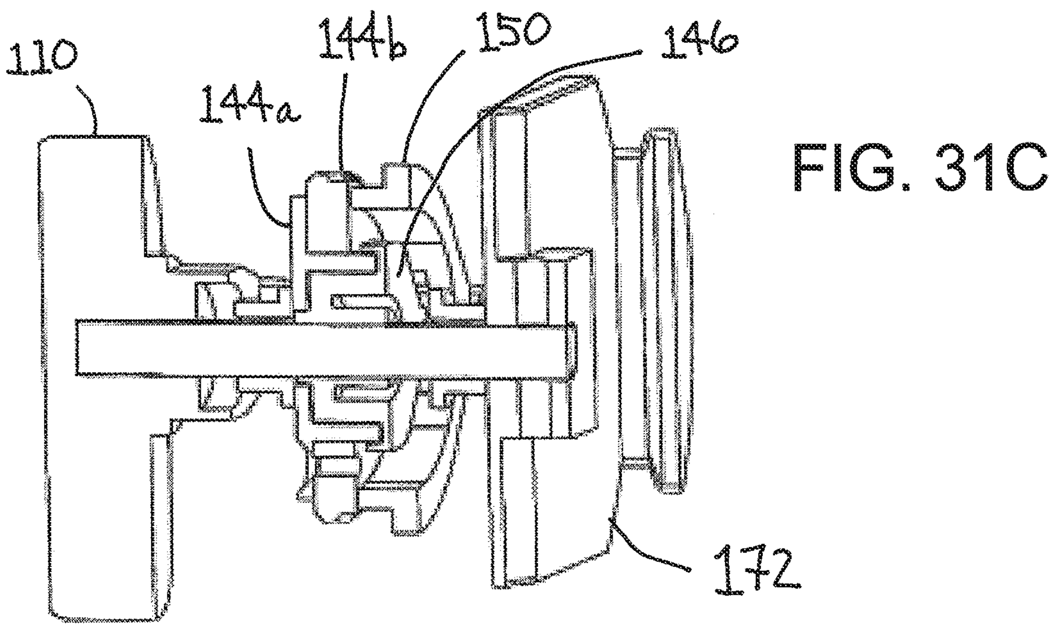
FIG. 31C shows a cross-sectional side view of the gear train in a mid-way position as the actuator unit is used to lock the associated deadbolt lock (remote mode).
Figure 31D:
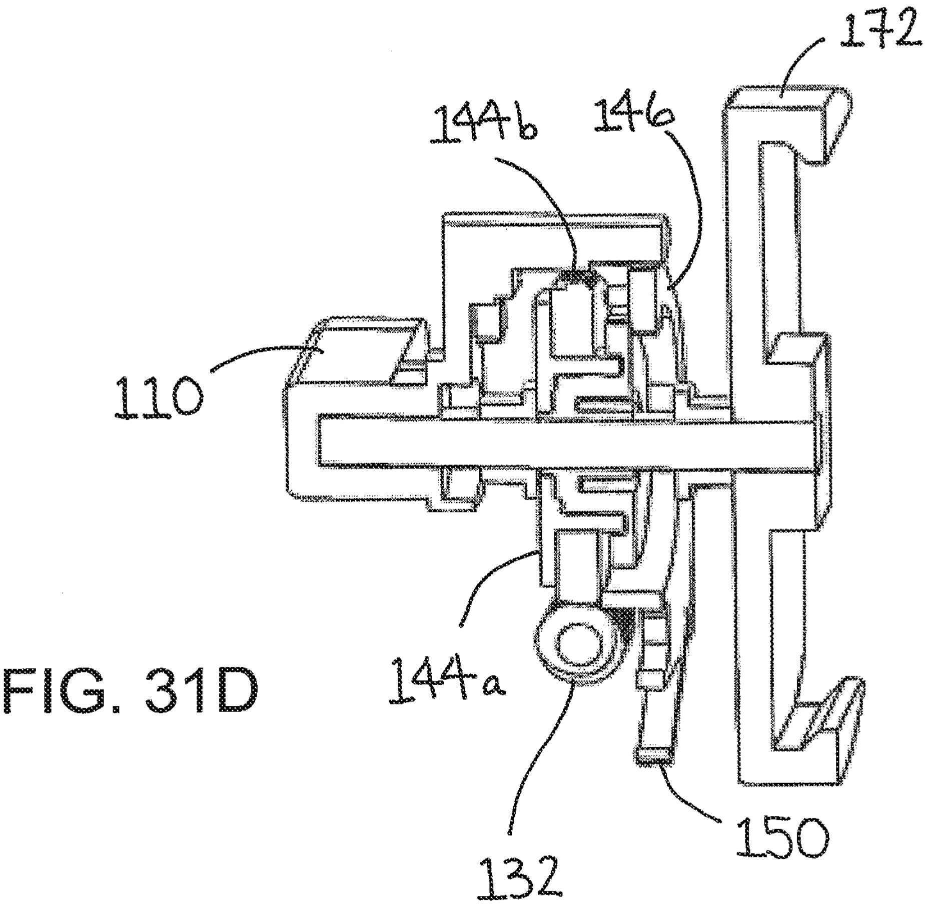
FIG. 31D shows a cross-sectional top view of the gear train in the mid-way position as the actuator unit is used to lock the associated deadbolt lock (remote mode).
Figure 32A:
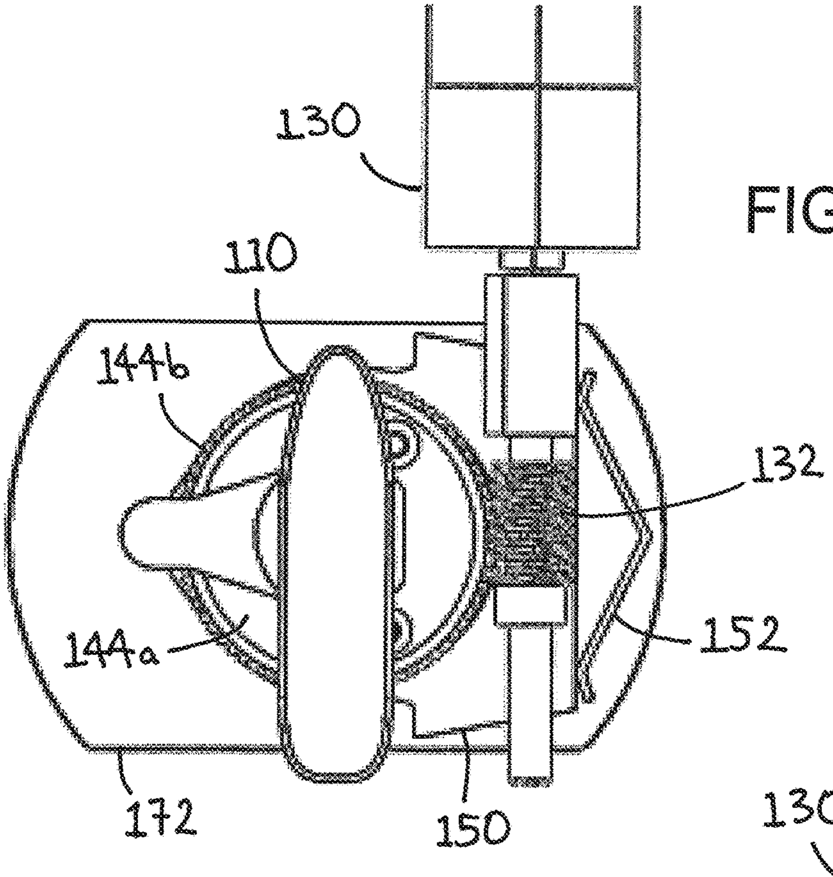
FIG. 32A shows a front view of the gear train in the locked finished position as the actuator unit is used to lock the associated deadbolt lock (remote mode).
Figure 32B:
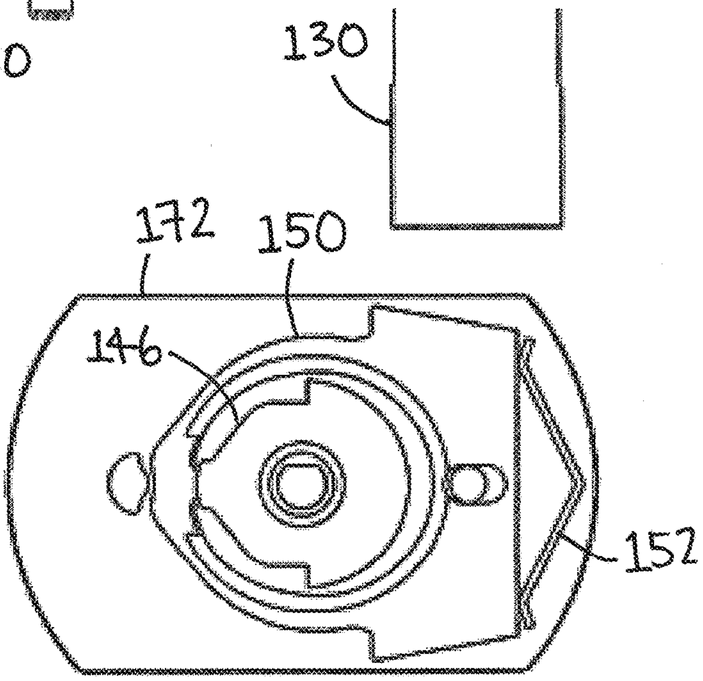
FIG. 32B shows a front view of the gear train (with the manual egress handle and worm wheel removed) in the locked finished position as the actuator unit is used to lock the associated deadbolt lock (remote mode).
Figure 32C:
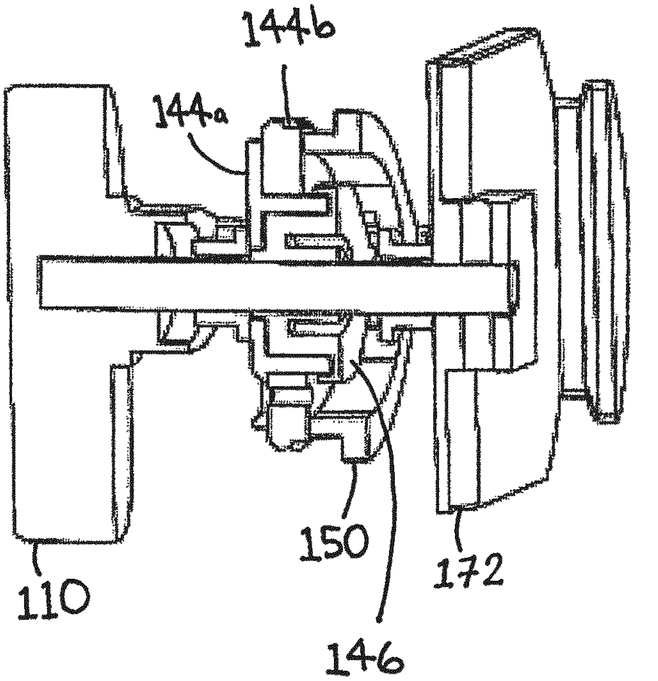
FIG. 32C shows a cross-sectional side view of the gear train in a locked finished position as the actuator unit is used to lock the associated deadbolt lock (remote mode).
Figure 32D:
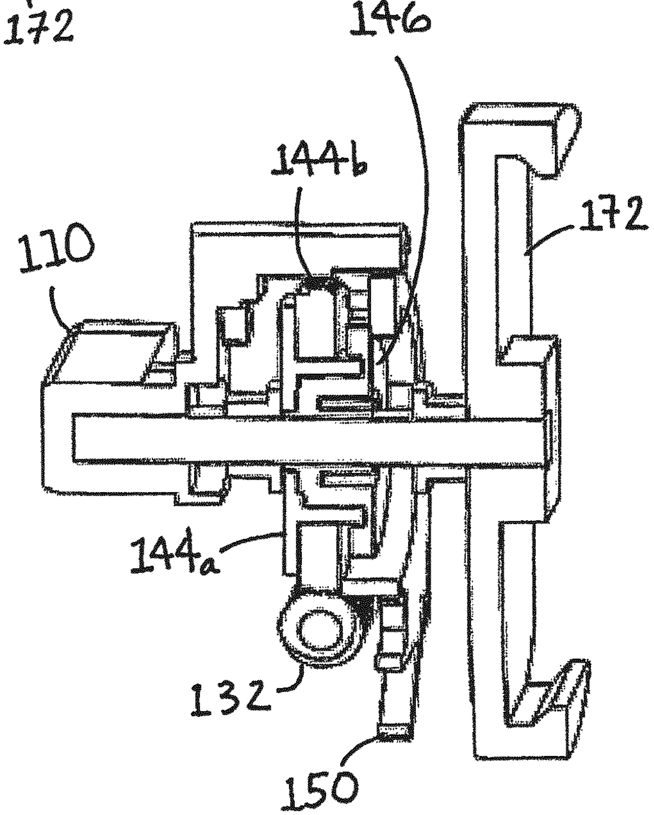
FIG. 32D shows a cross-sectional top view of the gear train in the locked finished position as the actuator unit is used to lock the associated deadbolt lock (remote mode).
Figure 33A:
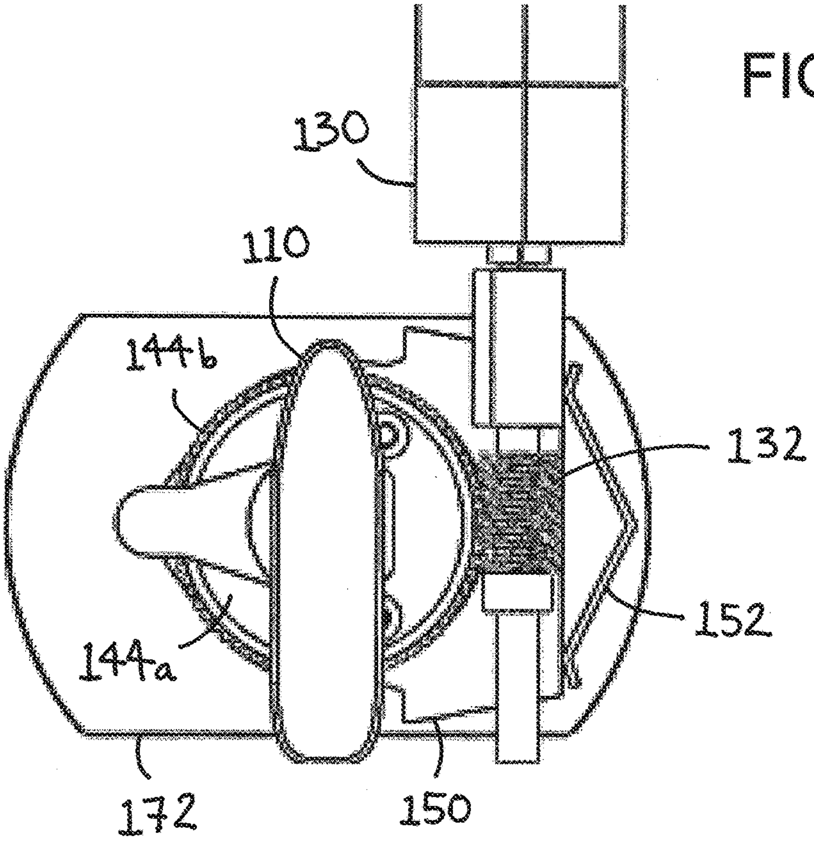
FIG. 33A shows a front view of the gear train in the locked initial position as the actuator unit is used to unlock the associated deadbolt lock (remote mode).
Figure 33B:
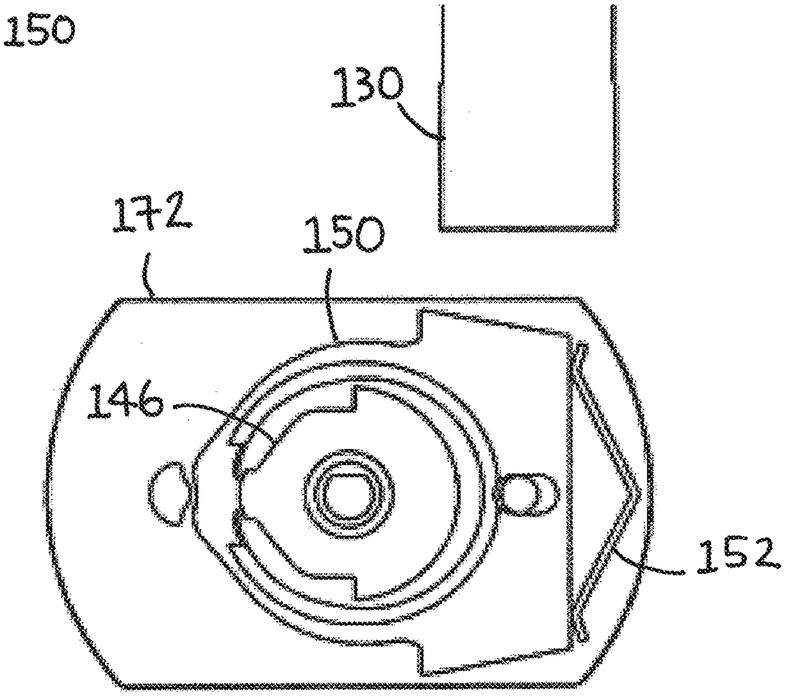
FIG. 33B shows a front view of the gear train (with the manual egress handle and worm wheel removed) in the locked initial position as the actuator unit is used to unlock the associated deadbolt lock (remote mode).
Figure 33C:
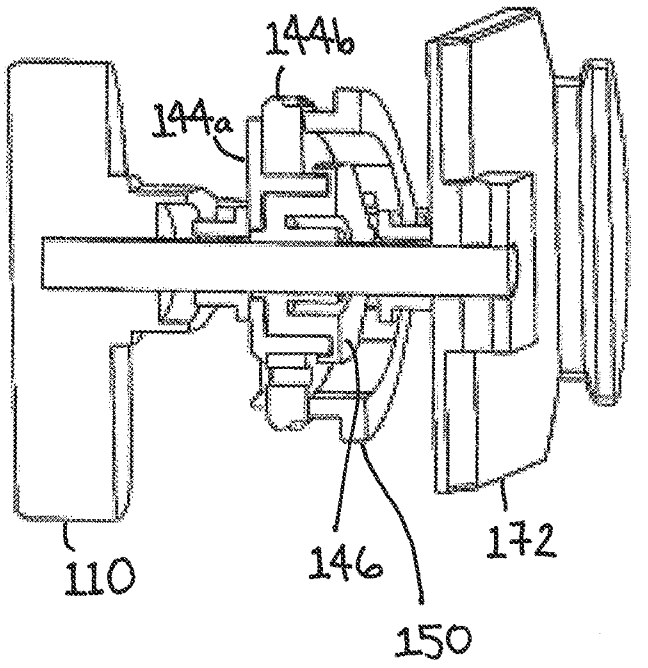
FIG. 33C shows a cross-sectional side view of the gear train in a locked initial position as the actuator unit is used to unlock the associated deadbolt lock (remote mode).
Figure 33D:
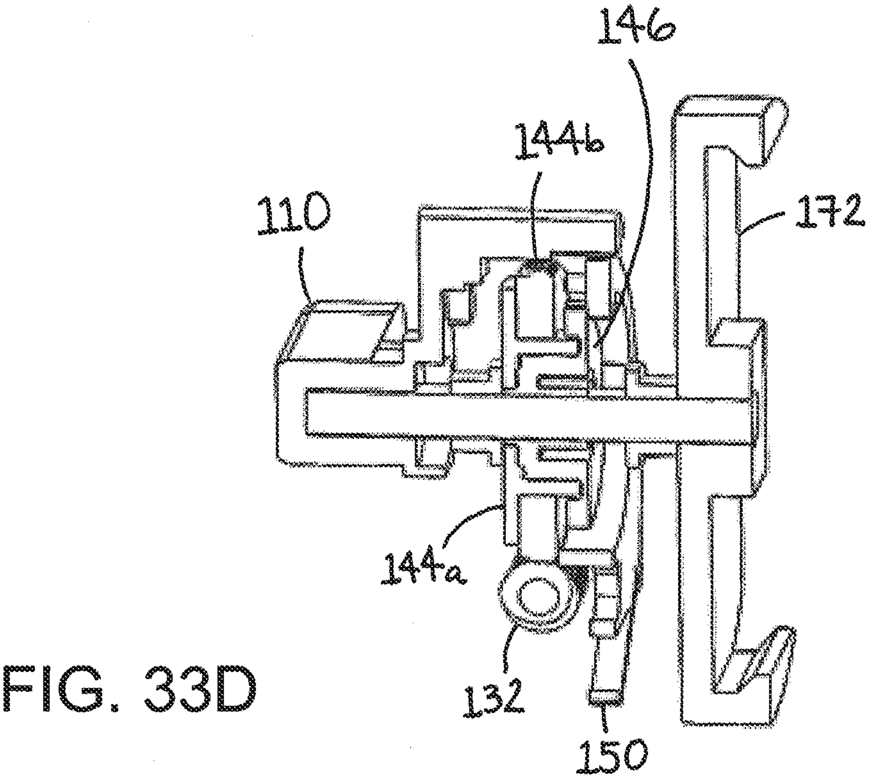
FIG. 33D shows a cross-sectional top view of the gear train in the locked initial position as the actuator unit is used to unlock the associated deadbolt lock (remote mode).
Figure 34A:
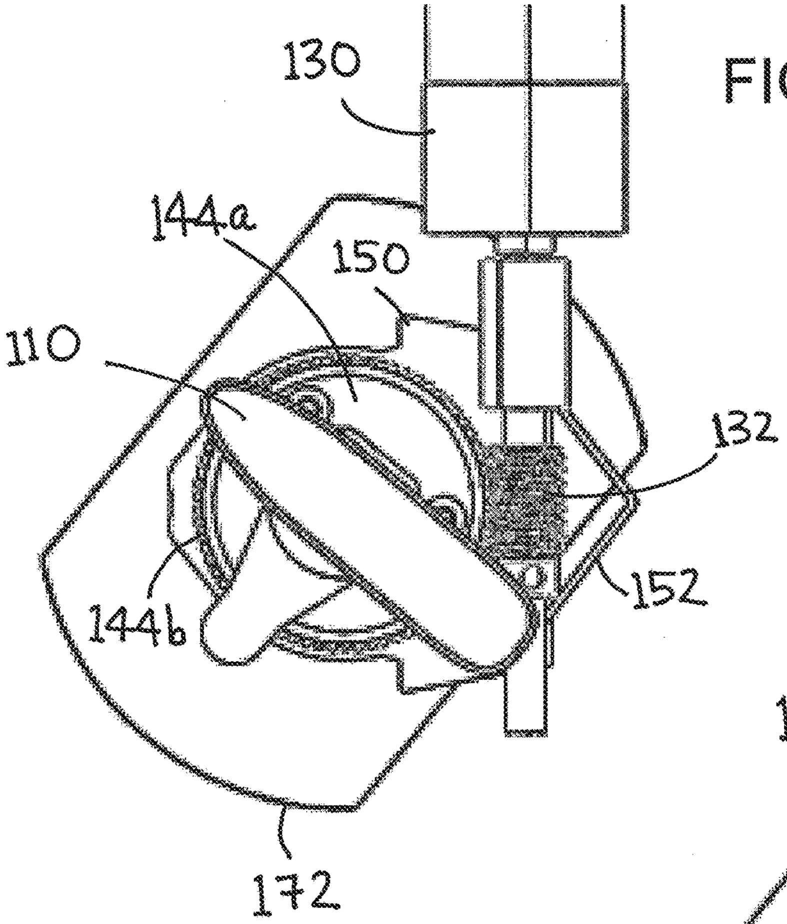
FIG. 34A shows a front view of the gear train in the mid-way position as the actuator unit is used to unlock the associated deadbolt lock (remote mode).
Figure 34B:
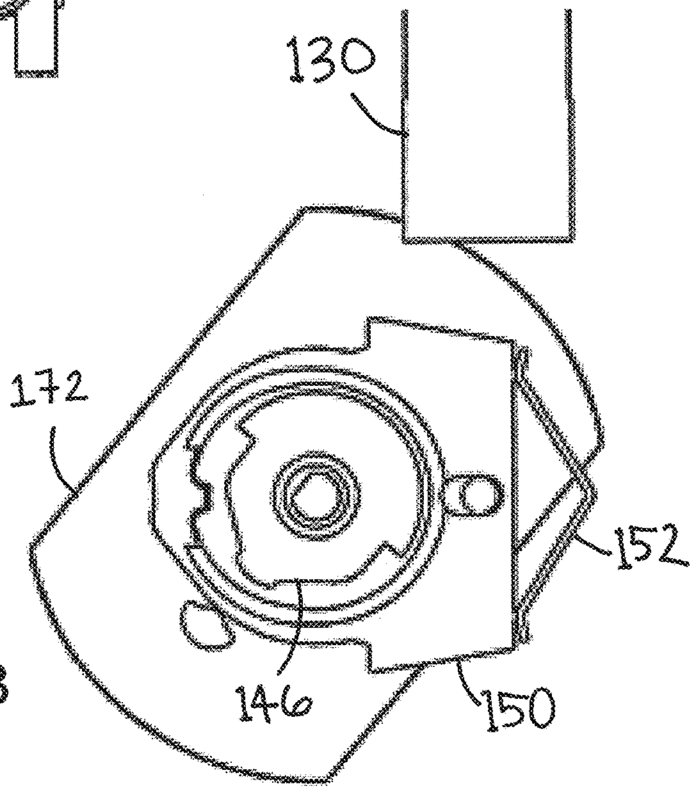
FIG. 34B shows a front view of the gear train (with the manual egress handle and worm wheel removed) in the mid-way position as the actuator unit is used to unlock the associated deadbolt lock (remote mode).
Figure 34C:
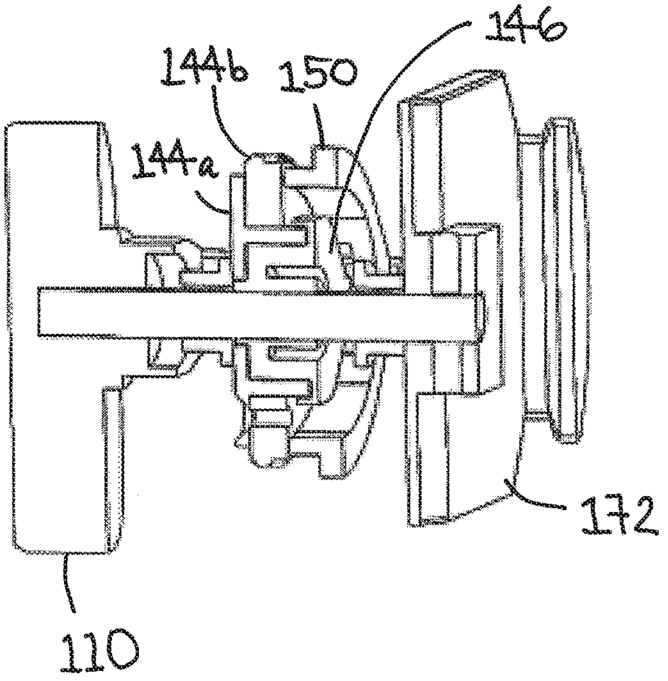
FIG. 34C shows a cross-sectional side view of the gear train in a mid-way position as the actuator unit is used to unlock the associated deadbolt lock (remote mode).
Figure 34D:
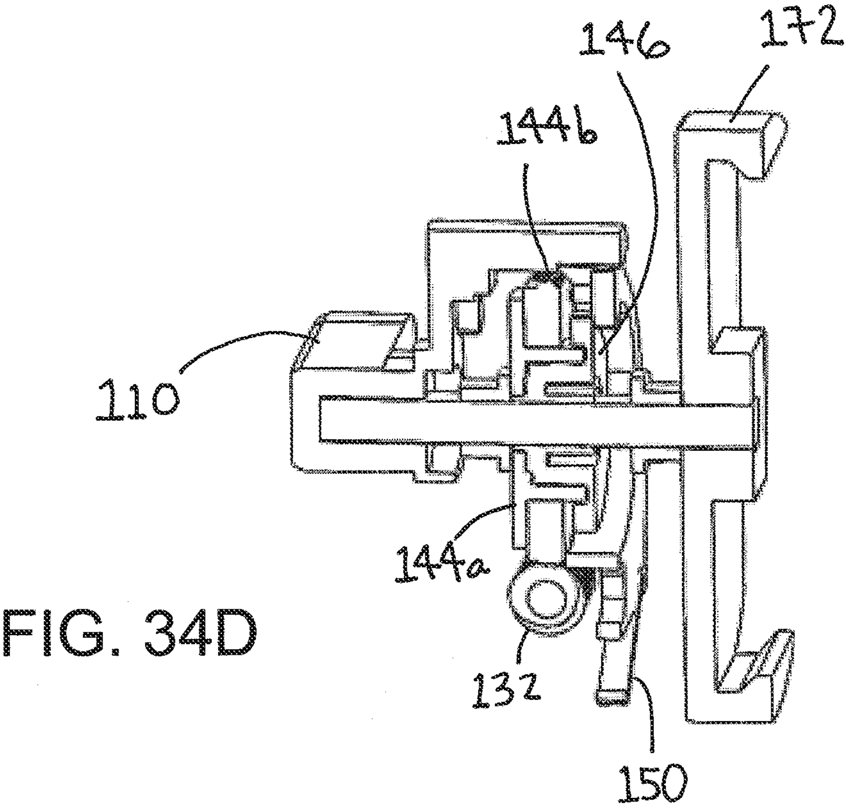
FIG. 34D shows a cross-sectional top view of the gear train in the mid-way position as the actuator unit is used to unlock the associated deadbolt lock (remote mode).
Figure 35A:
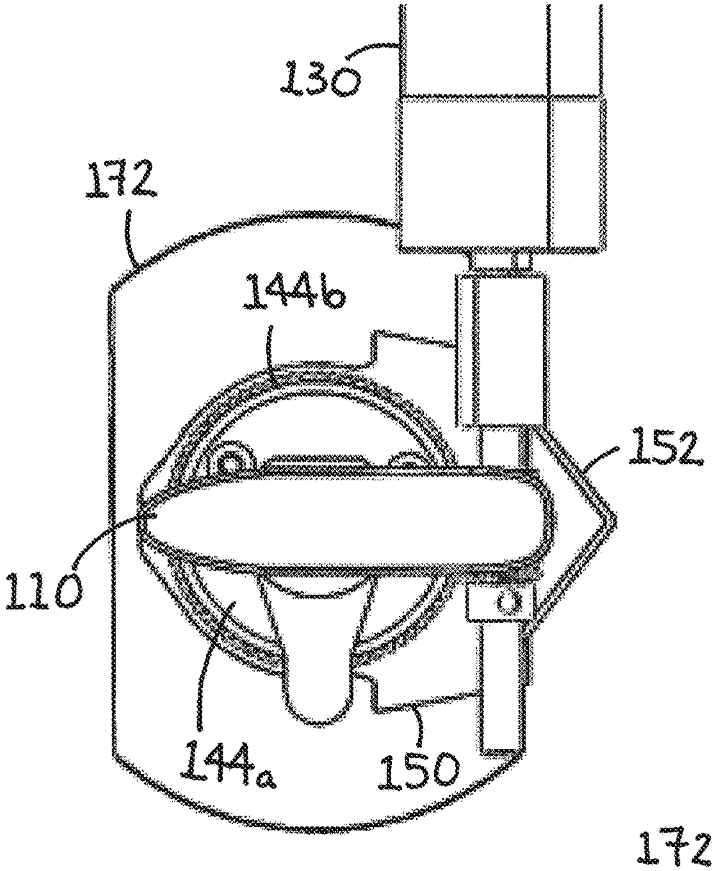
FIG. 35A shows a front view of the gear train in the unlocked finished position as the actuator unit is used to unlock the associated deadbolt lock (remote mode).
Figure 35B:
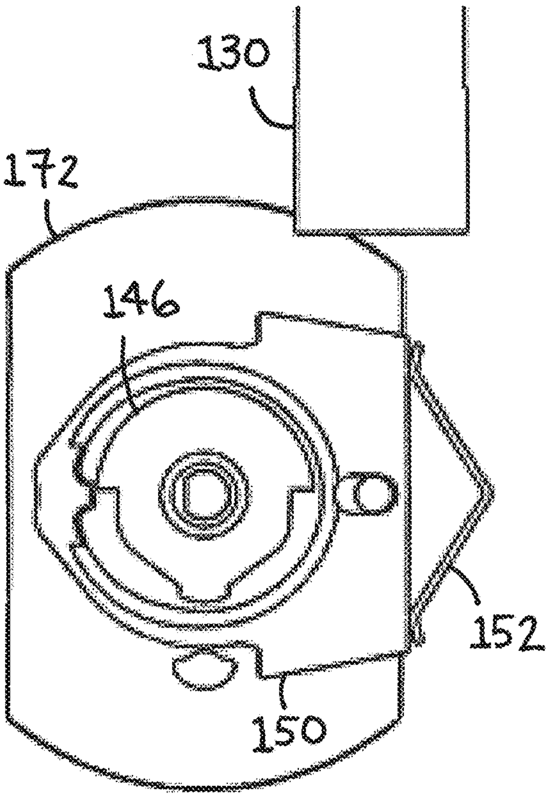
FIG. 35B shows a front view of the gear train (with the manual egress handle and worm wheel removed) in the unlocked finished position as the actuator unit is used to unlock the associated deadbolt lock (remote mode).
Figure 35C:
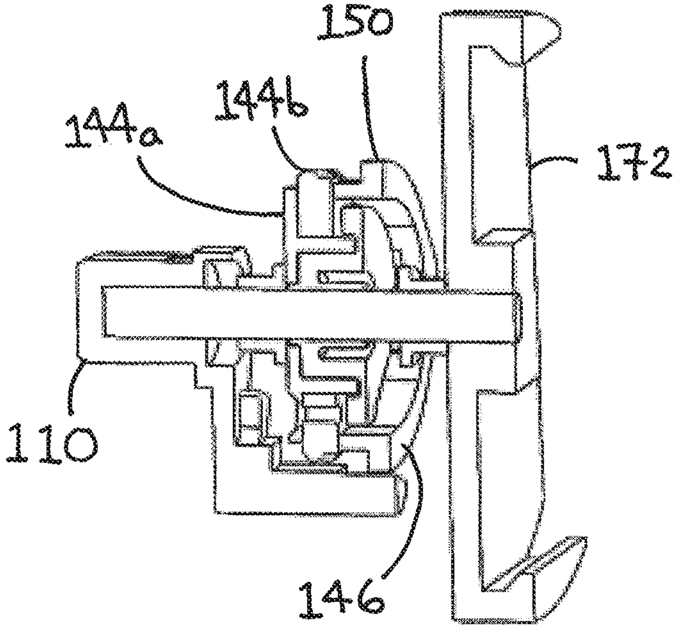
FIG. 35C shows a cross-sectional side view of the gear train in an unlocked finished position as the actuator unit is used to unlock the associated deadbolt lock (remote mode).
Figure 35D:
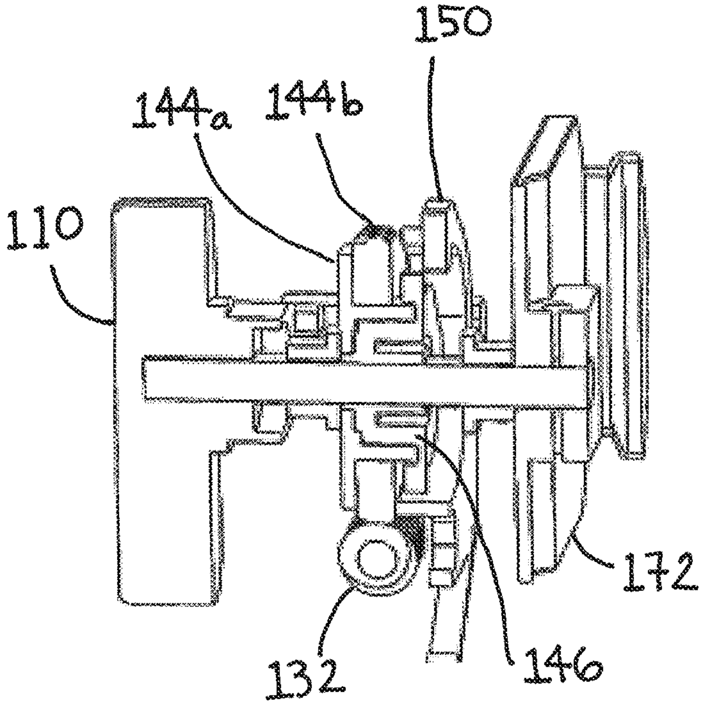
FIG. 35D shows a cross-sectional top view of the gear train in the unlocked finished position as the actuator unit is used to unlock the associated deadbolt lock (remote mode).
Figure 36:
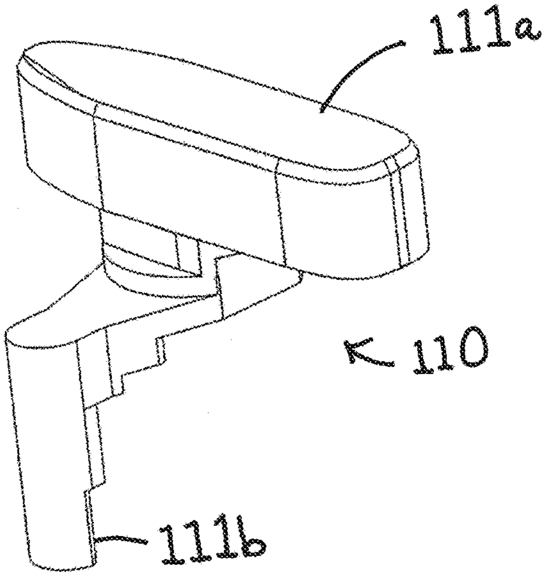
FIG. 36 is a perspective view of an exemplary egress handle.

If the rotation is manual (in manual mode as shown in FIGS. 27-29), the drive crown 146 moves independently from the worm wheel 144. FIG. 42 shows the passage control plate 150 positioned in a "pass-through" position with pressure from the plate return spring 152 pushing and holding the passage control plate 150 away from the spring support projection 108*c*. In this pass-through position, the passage control plate 150 is shifted so that the projecting plate tongue 151*e* is "disengaged" from (not blocking and allowing movement of the passage control plate 150 toward the door) the drive crown 146 projecting tongue 147*e*. As it is no longer blocked, the drive crown 146 is able to lower (moves toward the door) as shown in FIG. 44. The worm wheel 144 remains stationary as it is held in place by the stationary worm gear 132, but because the drive crown 146 lowers (moves toward the door as shown in FIG. 44) it can move independently along the cam surface of the worm wheel 144 (FIGS. 49A-E).

Figure 37:
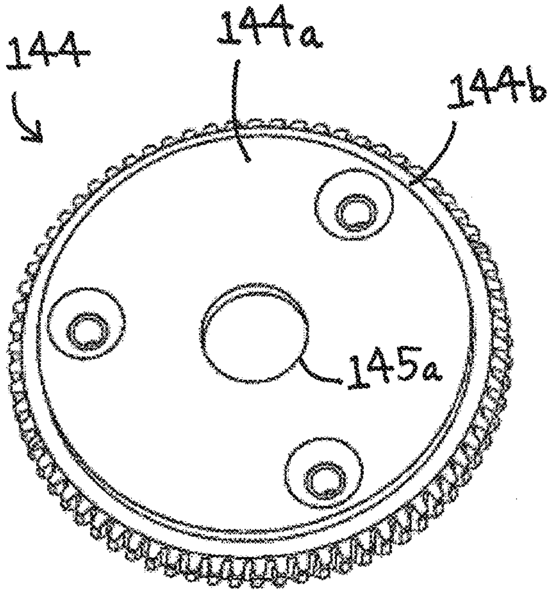
FIG. 37 is a front view of an exemplary worm wheel.
Figure 38:
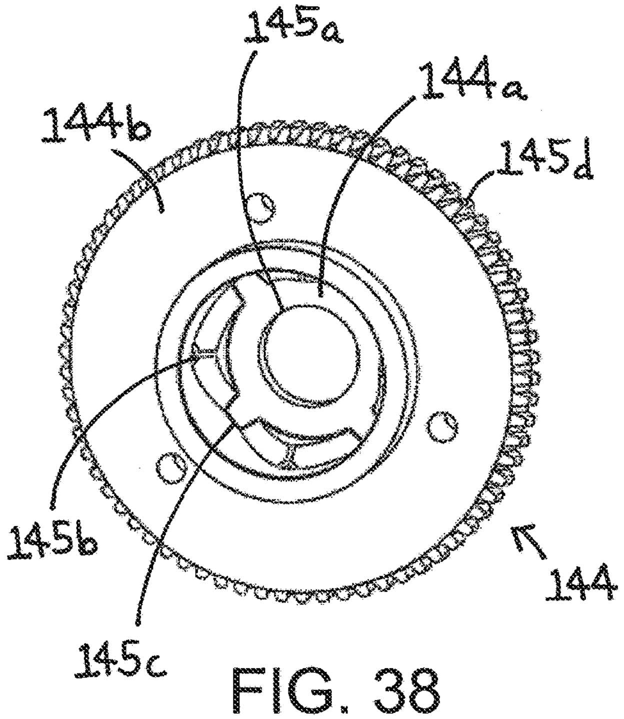
FIG. 38 is a rear perspective view of the exemplary worm wheel of FIG. 37.
Figure 49A:
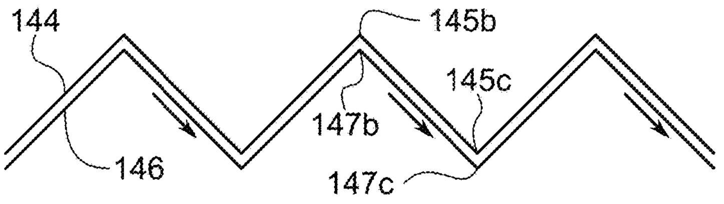
FIGS. 49A-49E are a series of conceptual drawings showing the relevant movement between the peaks and valleys of the worm wheel crown and the peaks and valleys of the drive crown in the manual mode.
Figure 49B:
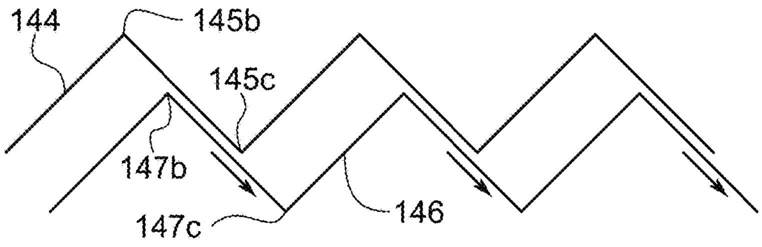
Figure 49C:
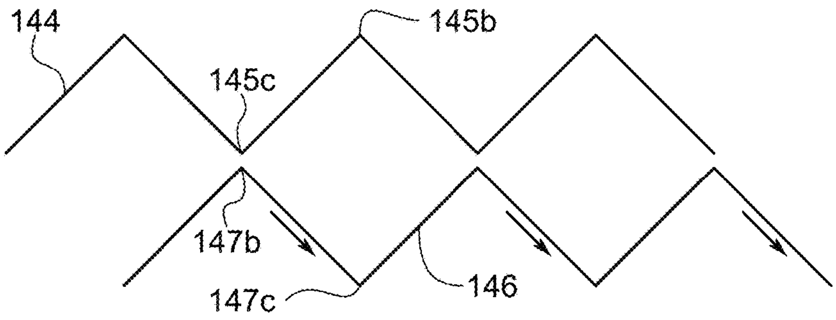
Figure 49D:
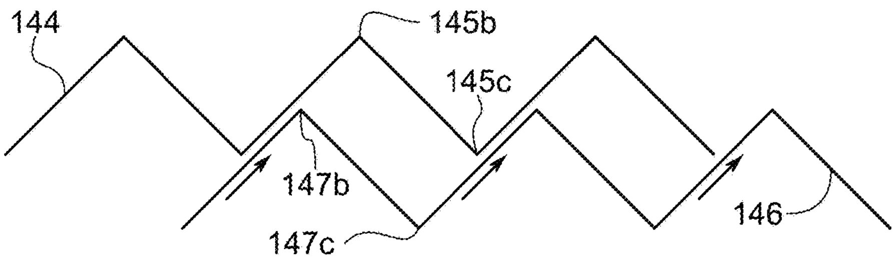
Figure 49E:
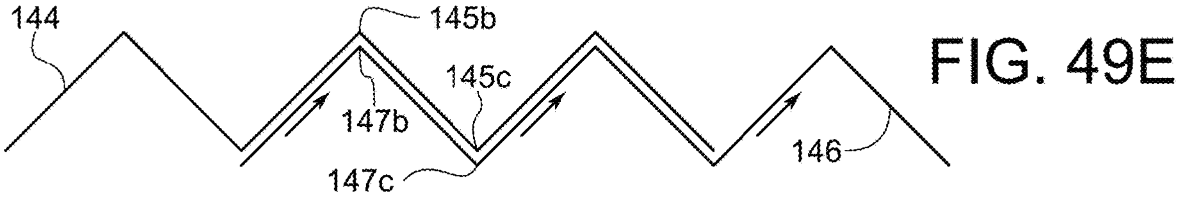
Figure 50:
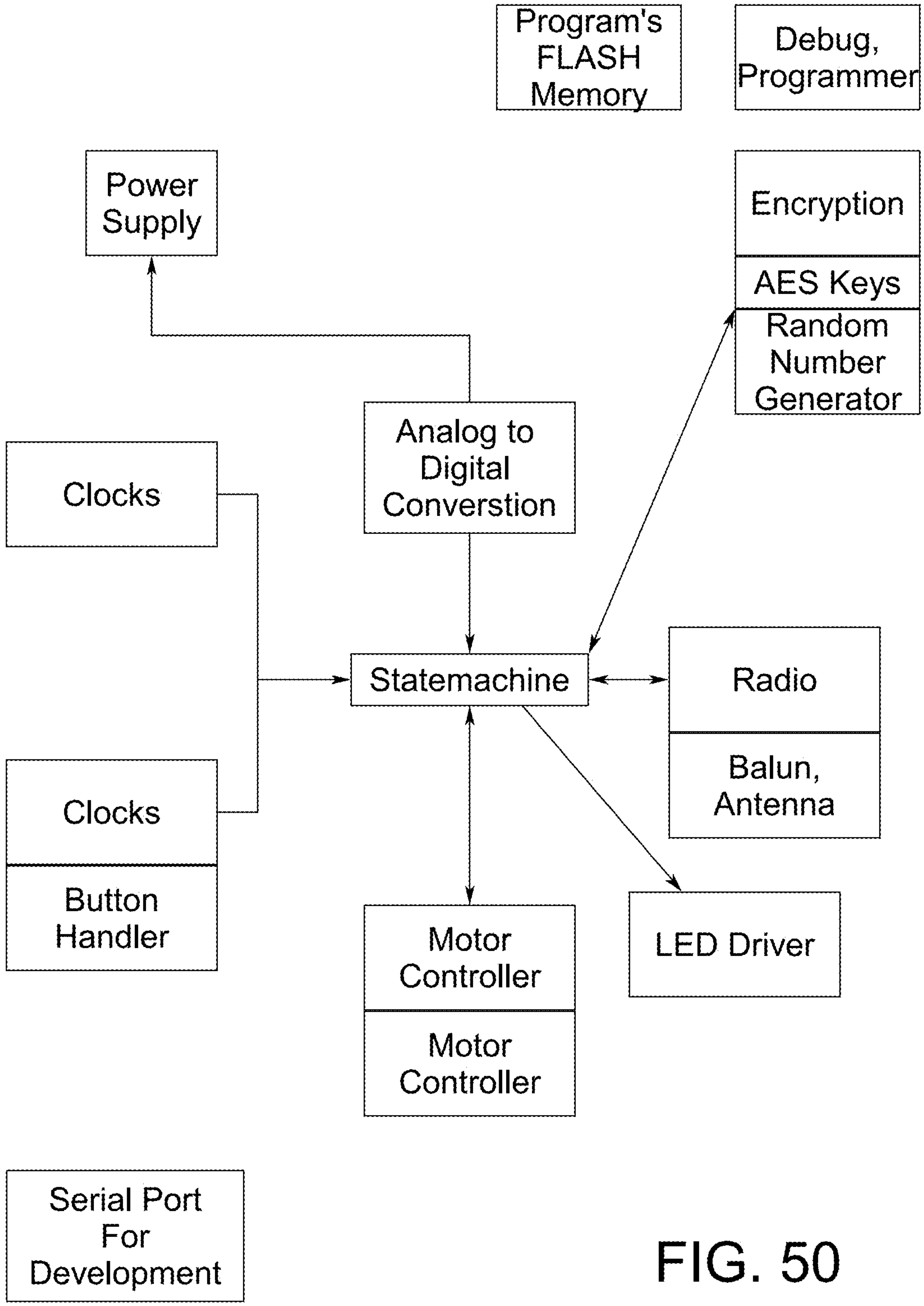
FIG. 50 is a block diagram of exemplary electronics of an exemplary deadbolt control system.

FIGS. 49A-49E show exemplary independent rotation/motion of the drive crown 146 moving independently along the cam surface (including the peaks and valleys) of the worm wheel 144 (preferably without actual separation). (The peaks and valleys are shown in FIGS. 49A-49E with sharp angles (points), but are more likely to be shaped as shown in FIGS. 37-38.) In FIG. 49A, the worm wheel 144 peaks 145*b* and valleys 145*c* are nested with the drive crown 146 peaks 147*b* and valleys 145*c*. As the manual egress handle 110 is turned and slightly moves inward (toward the door), the drive crown 146 slides/lowers in relation to the worm wheel 144 (FIG. 49B), continues so that the peaks 145*b*, 147*b* are substantially aligned (FIG. 49C), the slides/raises (with the pressure provided by the compression spring 148 overcoming the inward motion) in relation to the worm wheel 144 (FIG. 49D), and returns to nest with the drive crown 146 peaks 147*b* and valleys 145*c* (FIG. 49E) (although rotated one peak/valley). Rotating the manual egress handle 110 in the opposite direction would reverse the process (the arrows of FIGS. 49A-49E would be pointed in the opposite direction). Because the drive crown 146 is coordinated with the shaft 142, the shaft 142 (and other components coordinated with the shaft 142) also rotate.

If the rotation is remote (in remote mode as shown in FIGS. 33-35), the drive crown 146 and the worm wheel 144 move in tandem. FIG. 43 shows the passage control plate 150 positioned in a "blocking" position with pressure from the projecting leg 111*b* holding the passage control plate 150 toward from the spring support projection 108*c*. (Pressure from the plate return spring 152 is overcome by pressure from the projecting leg 111*b*.) In this blocking position, the passage control plate 150 is shifted so that the projecting plate tongue 151*e* "engages" (blocks) the drive crown 146 projecting tongue 147*e*. As it is blocked, the drive crown 146 remains nested with the worm wheel 144 as shown in FIG. 45. In this nested position, the worm wheel 144 and the drive crown 146 move together or not at all.

Figure 46:
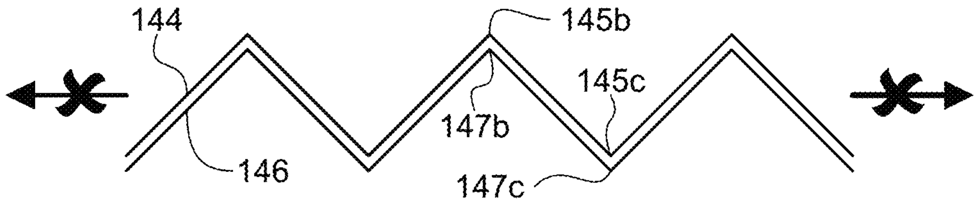
FIG. 46 is a conceptual drawing showing that there is no movement between the peaks and valleys of the worm wheel crown and the peaks and valleys of the drive crown when the deadbolt control system is locked.
Figure 47:
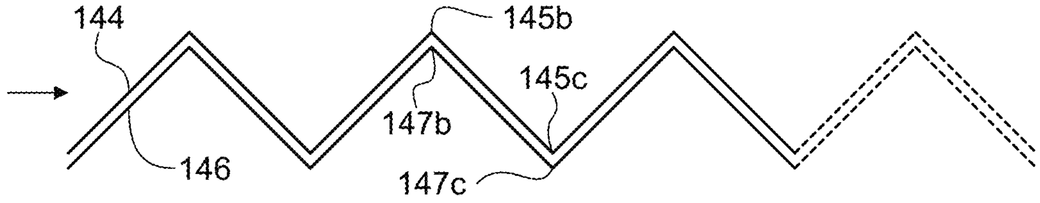
FIG. 47 is a conceptual drawing showing that the peaks and valleys of the worm wheel crown and the peaks and valleys of the drive crown move together (the worm wheel crown moving the drive crown) when the deadbolt control system moves in the remote mode.

FIGS. 45, 46, and 47 show the worm wheel 144 and the drive crown 146 positioned close together (nested). FIGS. 46 and 47 show the worm wheel 144 peaks 145*b* and valleys 145*c* nested with the drive crown 146 peaks 147*b* and valleys 145*c*. When the worm wheel 144 is stationary (as it is held in place by the stationary worm gear 132), the drive crown 146 cannot move (FIG. 46). Put another way, because the worm gear 132 is not moving/rotating, the worm wheel 144 cannot move/rotate (this is what prevents movement during the intruder mode) and, therefore, the drive crown 146 does not move. When the worm wheel 144 rotates, the nested drive crown 146 moves in tandem (FIG. 47). Put another way, because the worm gear 132 is moving/rotating (e.g. having been activated by the actuator unit 200 in remote mode), the worm wheel 144 moves/rotates which, in turn, causes the drive crown 146 to rotate. Because the drive crown 146 is coordinated with the shaft 142, the shaft 142 (and other components coordinated with the shaft 142) also rotates.

Figure 48A:
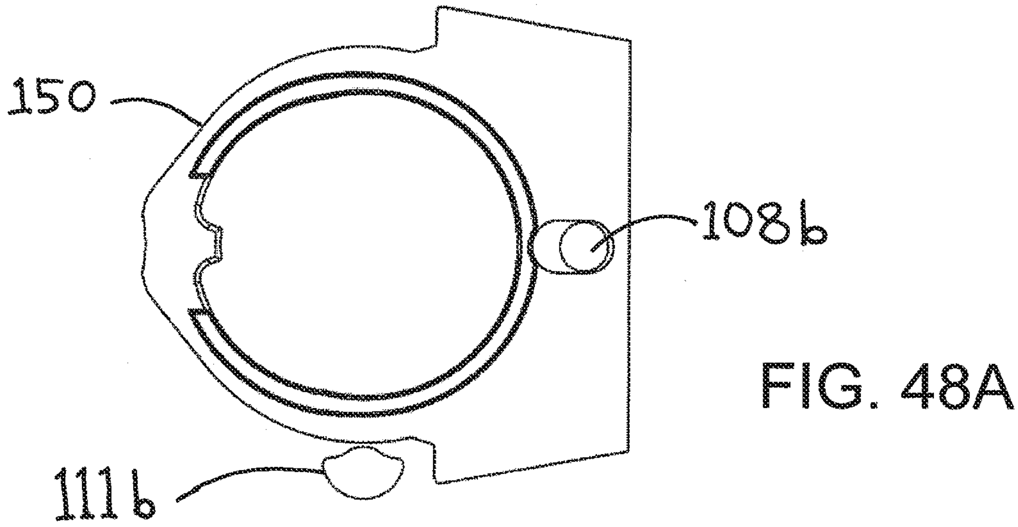
Figure 48B:
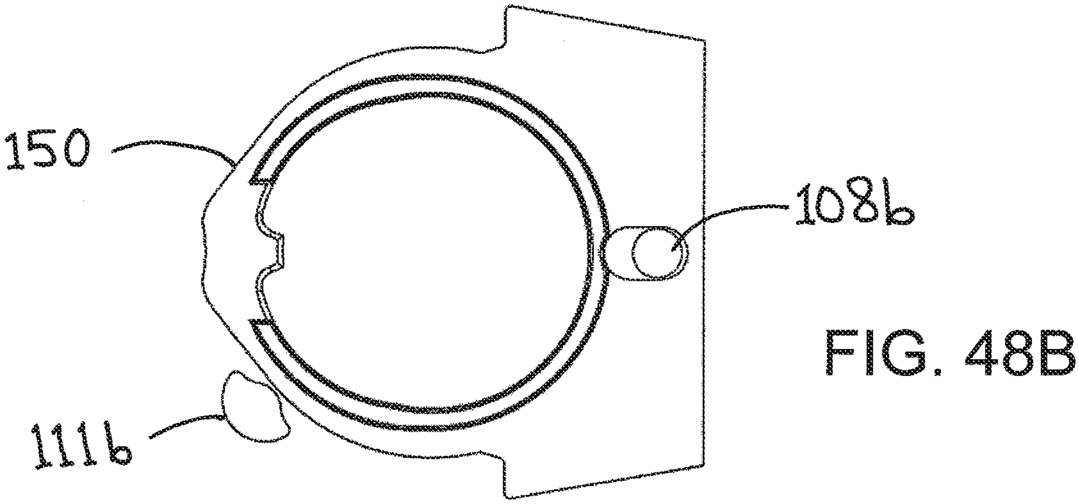
Figure 48C:
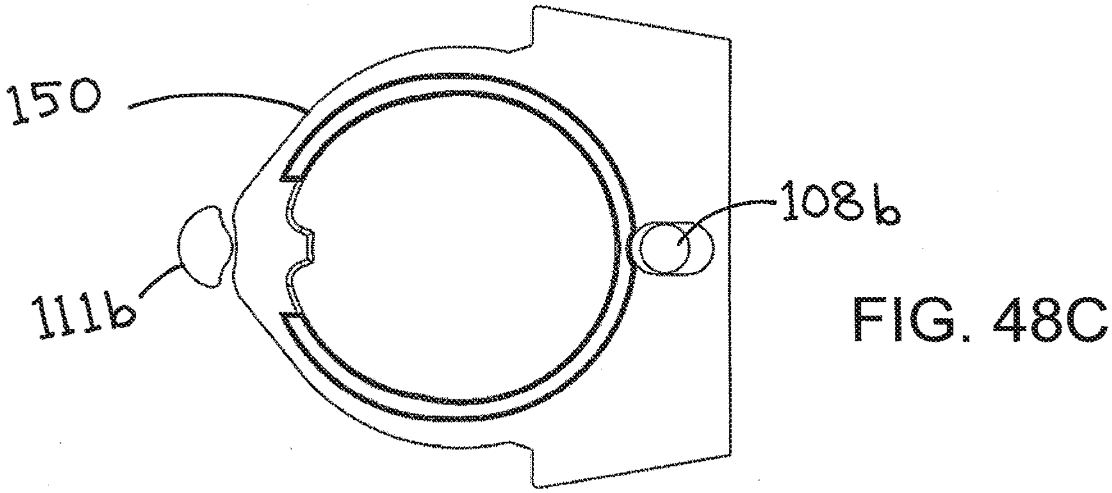

The sliding of the passage control plate 150 between positions is shown as being accomplished by mechanical means. FIG. 42 shows the passage control plate 150 in the pass-through position (away from the spring support projection 108*c*) in which pressure from the plate return spring 152 pushes and holds the passage control plate 150 away from the spring support projection 108*c*. FIG. 43 shows the passage control plate 150 held in the blocking position (toward the spring support projection 108*c*) in which pressure from the plate return spring 152 has been overcome by pressure from the projecting leg 111*b* and the passage control plate 150 is slid toward the spring support projection 108*c*. As shown in FIGS. 48A-48C, to overcome the pressure from the plate return spring 152, the projecting leg 111*b* moves (as the manual egress handle 110 turns) along the outer circumference of the passage control plate 150 starting in a pass-through position (FIG. 48A) and moving toward a blocking position (FIG. 48C). Slop (discussed herein) is capitalized on in manual mode (see FIG. 42) by allowing the projecting leg 111*b* to move far enough to push the passage control plate 150 toward the spring support projection 108*c*. As the projecting leg 111*b* moves, it pushes the passage control plate 150 toward the plate return spring 152 (overcoming the pressure from the plate return spring 152). As the user rotates the manual egress handle 110 it moves slightly inward (toward the door). This inward motion overcomes the outward (away from the door) pressure provided by the compression spring 148 (FIG. 23) such that the drive crown 146 can lower (move toward the door) (FIG. 44) and move independently along the cam surface of the worm wheel 144 (FIGS. 49A-E). A user turning the manual egress handle 110 in the opposite direction would cause the projecting leg 111*b* to move in the opposite direction. Once it is no longer overcome by the projecting leg 111*b*, the pressure from the plate return spring 152 would push the passage control plate 150 back into in the pass-through position (away from the spring support projection 108*c*).

The ability to selectively connect (nest) or disconnect (un-nest) the drive crown 146 with the worm wheel 144 (and the associated worm gear 132) can be thought of as a clutch 141 (FIG. 1) and/or a reverse-clutch. When the worm wheel 144 and drive crown 146 are disconnected (e.g. for rotation in the manual mode), then the drive crown 146 moves/rotates independently of the worm wheel 144. When the worm wheel 144 and drive crown 146 are connected (e.g. for rotation in the remote mode), they move/rotate in tandem. This would be typical of a traditional clutch. However, because the worm wheel 144 and drive crown 146 can be connected to prevent movement (see FIG. 46), the clutch 141 can also be thought of as a reverse-clutch.

When the deadbolt interface unit 100 is in a locked position, it is virtually impossible that an intruder can defeat the deadbolt lock 50. In the locked position, the passage control plate 150 prevents the downward movement of the drive crown 146. Since the drive crown 146 cannot move downward, it cannot rotate. Since the drive crown 146 cannot rotate, the deadbolt lock 50 cannot be unlocked (FIG. 43) by any means whether by key, lock picking tool, bypass tool, bump keys, or the like. The reverse-clutch prevents rotation of the deadbolt manual egress handle 52 of the deadbolt lock 50. This is accomplished because, when the worm wheel 144 is nested with the drive crown 146, there is a mechanical connection from the deadbolt manual egress handle 52 to the worm gear 132. Specifically, movement of the deadbolt manual egress handle 52 is controlled by the spring-loaded adapter 160. Movement of the spring-loaded adapter 160 is controlled by the coupling insert 176. Movement of the coupling insert 176 is controlled by the coupling lock slide 172. The coupling lock slide 172 is coordinated with the coordinated shaft 142 and they can only move in tandem. The shaft 142 is coordinated with the drive crown 146 and they can only move in tandem. If the drive crown 146 is nested with the worm wheel 144 (which it is in the locked position) as the passage control plate 150 prevents the drive crown 146 from moving downward, then the drive crown 146 and the worm wheel 144 can only move in tandem. The movement of the worm wheel 144 is controlled by the worm gear 132. So, if the worm gear 132 is stationary, the worm wheel 144 is stationary, the nested drive crown 146 is stationary, the shaft 142 is stationary, the coupling lock slide 172 is stationary, the coupling insert 176 is stationary, the spring-loaded adapter 160 is stationary, and the coupling deadbolt manual egress handle 52 is stationary. Put another way, as long as the worm gear 132 is stationary and the gear train 140 is in the locked final position, it would be almost impossible for an intruder to defeat the deadbolt interface unit 100, as the nested drive crown 146 is stationary due to the passage control plate 150 preventing downward motion of the drive crown 146, which in turn prevents rotation, and thus there may be no intruder access.

The deadbolt interface unit 100 may provide feedback to the user. For example, when the deadbolt interface unit 100 successfully is locked by the user, the deadbolt interface unit 100 may provide feedback such as visual feedback (e.g. a green light such as LED 101 shown in FIG. 1), tactile feedback (e.g. a refreshable Braille display for the sight impaired), and/or audible feedback (e.g. a pleasant beep or ring). If the deadbolt interface unit 100 fails to lock (e.g. and unsuccessful locking attempt by the user), the deadbolt interface unit 100 may provide feedback such as visual feedback (e.g. a red light such as LED 101 shown in FIG. 1) and/or audible feedback (e.g. a less pleasant or persistent beep or ring). The deadbolt interface unit 100 may provide feedback for an attempt to override the deadbolt interface unit 100 (e.g. an attempted break in) with visual feedback (e.g. a persistent flashing red light) and/or audible feedback (e.g. a persistent unpleasant beep or ring). Visual, tactile, and/or audible feedback may be provided by one or more feedback devices 101 (which may be, for example, LEDs, speakers, monitor displays, refreshable Braille display, touch screen, or other such devices). The deadbolt interface unit 100 may provide indirect feedback (alone or in combination with the feedback discussed above) by forwarding a signal to the actuator unit 200 that may provide feedback.

FIG. 55 shows that firmware loops and state-machines may be used to control both the deadbolt interface unit 100 and the actuator unit 200.

Actuator Unit 200

As discussed herein, the deadbolt control systems described herein preferably have a remote mode in which a deadbolt lock 50 can be controlled without the need to physically touch the deadbolt manual egress handle 52 or the deadbolt interface unit manual egress handle 110. Remote actuation may be accomplished using at least one paired actuator unit 200 such that each actuator unit controls locking and unlocking the deadbolt lock in the remote mode. Each actuator unit preferably can be uniquely and mutually in a resettable pairing relationship (a unique and mutual resettable pairing) with the deadbolt interface unit.

Figure 52:
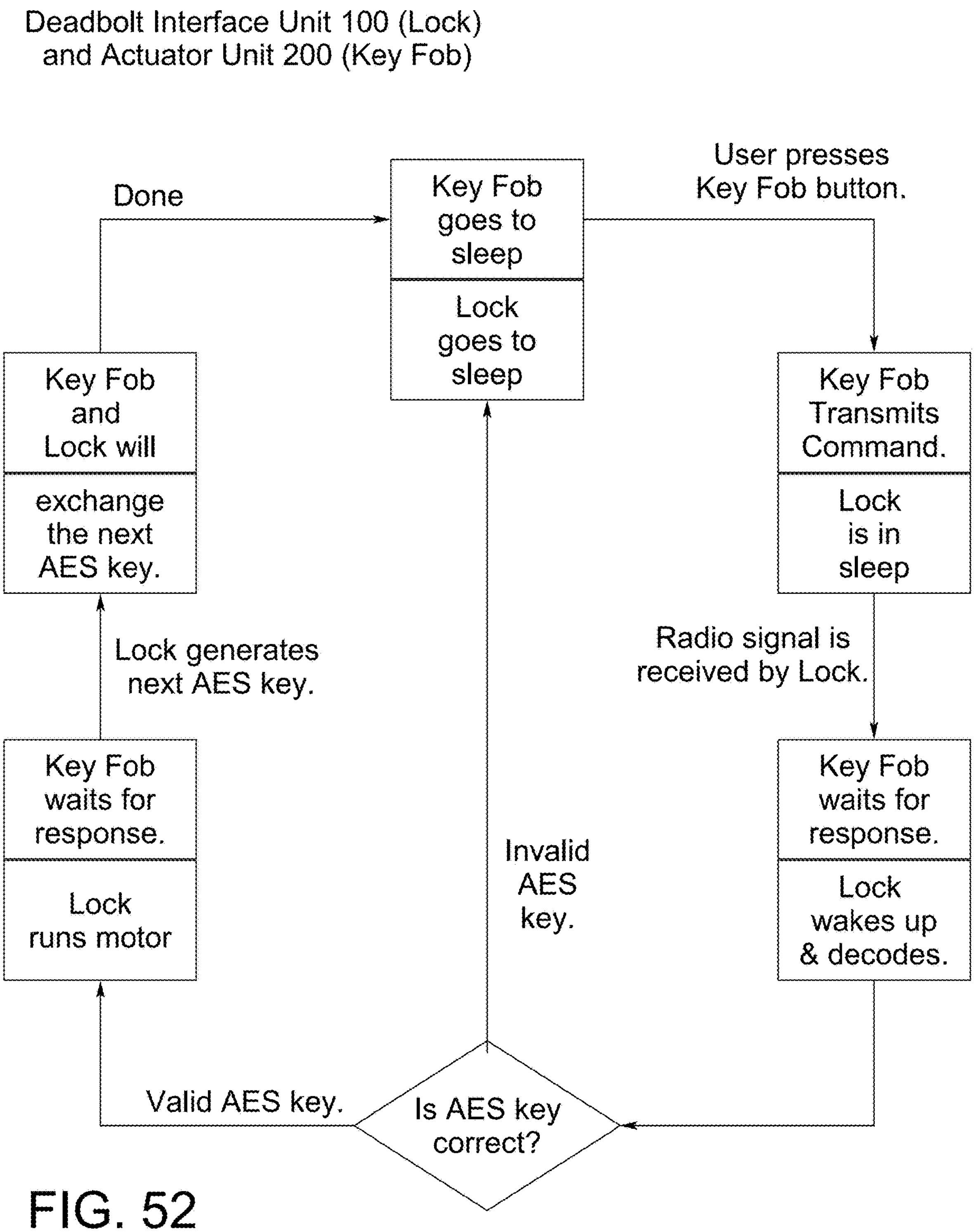
FIG. 52 is a flowchart showing exemplary control states for an exemplary actuator unit 200 (e.g. a fob) and an exemplary deadbolt interface unit.
Figure 53:
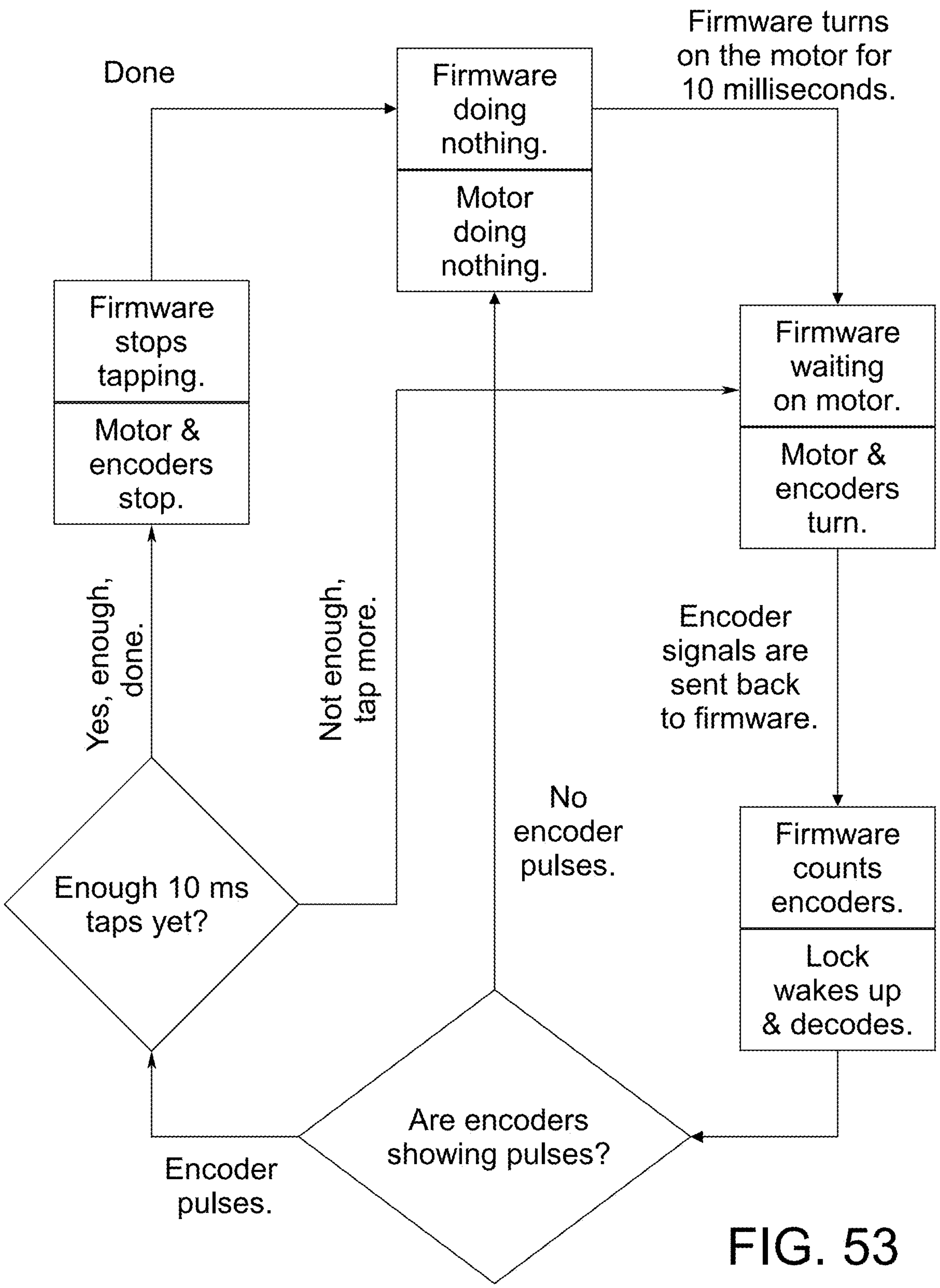
FIG. 53 is a flowchart showing exemplary motor tapping using an encoder.

An exemplary simplified actuator unit 200 is shown generally in FIG. 1. Exemplary simplified control states of an actuator unit 200 are shown in FIG. 52. In addition, exemplary schematic diagram of an actuator unit 200 is shown in FIGS. 57A-57D. Using the actuator unit 200, the user may toggle between an "unlocked" state (with the projecting/retracting bolt 56 in the retracted position) as shown in FIG. 8 and a "locked" state (with the projecting/retracting bolt 56 in the projected position) as shown in FIG. 9.

An actuator unit 200 may be implemented as a "fob" (similar to a remote transmitter for locking/unlocking an automobile). The actuator unit 200 preferably has an actuator housing 202 with a door (not shown) for removing and replacing a power source (shown in the lower left portion of FIG. 57A). At least one actuating mechanism (e.g. a lock button 204 and unlock button 206) is preferably accessible from the outside of the actuator housing 202. Although not shown, the actuator housing 202 may also have mechanical means (e.g. a hole, slot, loop, ring, magnetic quick release, clip, carabineer, and/or other mechanical structure) for connecting the actuator unit 200 to a key chain, handle, wristband, lanyard, or other device that facilitates the user carrying the actuator unit 200.

As shown in FIG. 1, within the actuator housing 202 there may be at least one actuator unit printed circuit board (PCB) 220. Associated with (e.g. mounted upon or functionally connected to) the PCB 220 are components including, but not limited to, an actuator unit lock switch/circuit 204', an actuator unit unlock switch/circuit 206', an actuator unit controller 222, an actuator unit transceiver 224, an optional actuator unit vibration motor 230, an optional actuator unit visual/audible feedback device 232, and/or other components traditionally associated with a fob. FIGS. 57A-57D show electronics that may be associated with the exemplary actuator unit 200.

The lock button 204 is functionally associated with lock switch/circuit 204'. The unlock button 206 is functionally associated with an unlock switch/circuit 206'. A user depressing the lock button 204 would cause a signal to be sent/received (via transceivers 124, 224) that, in turn, would cause the deadbolt interface unit 100 to lock (rotate) the deadbolt interface unit manual egress handle 110. A user depressing the unlock button 206 would cause a signal to be sent/received (via transceivers 124, 224) that, in turn, would cause the deadbolt interface unit 100 to unlock (rotate) the deadbolt interface unit manual egress handle 110. Although described as "buttons," the lock and unlock buttons 204, 206 could be a single push button (e.g. a single button that can distinguish between inputs such as a quick depression input versus a long depression input, a single depression versus a multiple depression) or other types of actuating mechanisms (e.g. a switch, rotary or knob, toggle or rocker, temperature sense switch, magnetic switch, slide switch, thumbwheel, or other such devices for sending a signal to change the state of a circuit).

The controller 222 preferably includes the software (e.g. programs and subprograms) and hardware (e.g. processors and memory) necessary to control the functions of the actuator unit 200. The software would include, for example, instructions to implement functions and control subcomponents including, but not limited to, those shown in FIGS. 50-55.

The shown transceiver 224 may communicate, for example, with the transceiver 124 using, for example, an AES 128-bit encoded RF signal. (It should be noted that other levels of encoding (e.g. 512-bit) and other coding schemes are possible.) The communications may be, for example, instructions pertaining to unlocking, locking, and resetting. The transceiver 224 may include, be replaced with, and/or augmented by other technology may be used to implement "signals," "communications," and/or "transmissions" including, but not limited to the shown associated antenna 224'.

The actuator unit 200 may provide feedback to the user via communication mechanisms including, but not limited to, the optional vibration motor 230 and/or the optional visual/audible feedback device 232. Tactile feedback provided by an optional vibration motor 230 or refreshable Braille display would help to make the deadbolt control system ADA compliant. Visual, tactile, and/or audible feedback may be provided by at least one optional visual/tactile/audible feedback devices 232 (which may be, for example, LEDs, speakers, monitor displays, refreshable Braille display, touch screen, or other such devices). For example, when the deadbolt interface unit 100 successfully is locked by the user, the actuator unit 200 may provide visual feedback (e.g. a green light), audible feedback (e.g. a pleasant beep or ring), and/or tactile feedback (e.g. a light vibration). If the deadbolt interface unit 100 fails to lock (e.g. and unsuccessful locking attempt by the user), the actuator unit 200 may provide visual feedback (e.g. a red light), audible feedback (e.g. a less pleasant or persistent beep or ring), and/or tactile feedback (e.g. a strong or persistent vibration). The actuator unit 200 may provide feedback for an attempt to override the deadbolt interface unit 100 (e.g. an attempted break in) with visual feedback (e.g. a persistent flashing red light), audible feedback (e.g. a persistent unpleasant beep or ring), and/or tactile feedback (e.g. a strong or persistent series of vibrations).

Preferred exemplary deadbolt control systems may have "advanced pairing capability" between at least one deadbolt interface unit 100 and at least one actuator unit 200. A plurality (e.g. ten) of actuator units 200 may be paired to one deadbolt interface unit 100 so that multiple people can control a single deadbolt interface unit 100. This would allow each member of a household (and/or service providers) to have a deadbolt interface unit 100 to control the home's front door deadbolt interface unit 100. Further, a single actuator unit 200 may be paired to a plurality (e.g. ten) of deadbolt interface units 100 so that a single person can control multiple actuator units 200. This would allow a person caring for a relative (or a property owner with multiple apartment units) to have one actuator unit 200 that controls multiple deadbolt interface units 100. From the user's standpoint, there may be a setup process for pairing the interface unit(s) and actuator unit(s) of the deadbolt control system. FIG. 51 shows an exemplary pairing function of an exemplary deadbolt control system.

The actuator unit 200 is preferably a "fob" as it has advantages over alternatives such as a smart phone having a programmable application ("app") thereon. For example, users are familiar with a standard-style, two-button key fob that may be used with automobiles. Fobs also have the advantage of being a simple, convenient, secure device that controls the deadbolt actuator unit 100 as compared to the multi-step sequence that would be required if a smart phone were used. Additionally, smart phone apps are entrusted to a third-party, and are a favorite target of hackers. It should be noted, however, that alternative systems may use alternative actuator units including, but not limited to, a smart phone having a programmable application ("app") thereon.

Deadbolt Control Systems in Use

Authorized users (e.g. homeowners) will interact with the deadbolt control system in two primary ways: using the deadbolt interface unit manual egress handle 110 and/or using the actuator unit 200. From the interior area, authorized users are able to use a deadbolt interface unit manual egress handle 110 of the deadbolt interface unit 100 in much the same manner as they would use a deadbolt manual egress handle 52 of a traditional deadbolt lock 50. From the exterior area, authorized users are able to use the actuator unit 200 to lock and unlock the deadbolt lock 50 in much the same manner as they would use a car fob to lock and unlock a car door. Unauthorized users (e.g. an intruder), however, are unable to enter the interior area even if they have a key.

FIGS. 24-35 show exemplary mechanical steps of the deadbolt interface unit 100, gear train 140, and associated components. FIGS. 24-29 show the exemplary mechanical steps of the manual mode. FIGS. 30-35 show the exemplary mechanical steps of the remote mode. FIGS. 24-26 and FIGS. 30-32 show exemplary mechanical steps in the locking (transitioning from an unlocked position to a locked position) of the associated deadbolt lock 50. FIGS. 27-29 and FIGS. 33-35 show exemplary mechanical steps in the unlocking (transitioning from a locked position to an unlocked position) of the associated deadbolt lock 50. Each of the four processes (manual locking, manual unlocking, remote locking, and remote unlocking,) is shown in three sets of figures representing an initial position, a midway position, and an end position. There are four depictions of each position: (A) a front view; (B) a front view with the manual egress handle and worm wheel removed; (C) a cross-sectional side view; and (D) a cross-sectional top view. The four views are referred to generally by their figure numbers (e.g. FIGS. 24A-D may also be referred to as FIG. 24). Details of the mechanical steps subtleties are also shown in FIGS. 42-49.

FIGS. 24-26 show the exemplary mechanical steps of the exemplary gear train 140 and associated components when a user uses the manual egress handle 110 to lock manually the associated deadbolt lock 50. As these figures depict, the drive crown 146 remains stationary in the manual mode.

FIG. 24 shows the gear train 140 starting in an initial unlocked position (the manual egress handle 110 is shown as horizontal), the passage control plate 150 in the pass-through position, and the drive crown 146 nested with the worm wheel 144. From this position, the manual egress handle 110 may be manually rotated and slightly depressed (albeit with the depression most likely being an unconscious movement) to lock the deadbolt lock 50. FIG. 25 shows the gear train 140 in a midway rotation position (the manual egress handle 110 is shown as angled), the passage control plate 150 in the pass-through position, and the drive crown 146 un-nested (FIG. 25C) from the worm wheel 144. FIG. 26 shows the gear train 140 in a final locked position (the manual egress handle 110 is shown as vertical), the passage control plate 150 in the blocking position, and the drive crown 146 nested with the worm wheel 144.

FIGS. 27-29 show the exemplary mechanical steps of the exemplary gear train 140 and associated components when a user uses the manual egress handle 110 to unlock manually the associated deadbolt lock 50. As these figures depict, in the manual mode, the drive crown 146 remains stationary. FIG. 27 shows the gear train 140 starting in the initial locked position (the manual egress handle 110 is shown as vertical), the passage control plate 150 in the blocking position, and the drive crown 146 nested with the worm wheel 144. FIG. 28 shows the gear train 140 in a midway rotation position (the manual egress handle 110 is shown as angled), the passage control plate 150 in the pass-through position, and the drive crown 146 un-nested (FIG. 25C) from the worm wheel 144. In this position, the manual egress handle 110 may be manually rotated and slightly depressed (albeit with the depression most likely being an unconscious movement) to unlock the deadbolt lock 50. FIG. 29 shows the gear train 140 in a final unlocked position (the manual egress handle 110 is shown as horizontal), the passage control plate 150 in the pass-through position, and the drive crown 146 nested with the worm wheel 144.

FIGS. 30-32 show the exemplary mechanical steps of the exemplary gear train 140 and associated components when a user uses the actuator unit 200 to lock remotely the associated deadbolt lock 50. As these figures depict, in the remote mode, the drive crown 146 has movement. The movement of the handle is incidental as it is attached to the coordinated shaft 142. Similarly, the passage control plate 150 moves between the pass-through position and the locked position, even though the drive crown 146 remains nested (there is no depression of the manual egress handle 110). FIG. 30 shows the gear train 140 starting in an initial unlocked position (the manual egress handle 110 is shown as horizontal), the passage control plate 150 in the pass-through position, and the drive crown 146 nested with the worm wheel 144. When the user presses the lock button 204 of the actuator unit 200, a signal is sent/received (via the transceivers 124, 224) to lock the deadbolt lock 50. This causes the worm gear 132 to rotate, which causes the worm wheel 144 to rotate. FIG. 31 shows the gear train 140 in a midway rotation position (the manual egress handle 110 is shown as angled), the passage control plate 150 in the pass-through position, and the drive crown 146 nested (FIG. 31C) with the worm wheel 144. Because the drive crown 146 is nested with the worm wheel 144, they both rotate in tandem. This causes the shaft 142 to rotate, which ultimately locks the deadbolt lock 50. FIG. 32 shows the gear train 140 in a final locked position (the manual egress handle 110 is shown as vertical), the passage control plate 150 in the blocking position, and the drive crown 146 nested with the worm wheel 144.

FIGS. 33-35 show the exemplary mechanical steps of the exemplary gear train 140 and associated components when a user uses the actuator unit 200 to unlock remotely the associated deadbolt lock 50. As these figures depict, in the remote mode, the drive crown 146 has movement. The movement of the handle is incidental as it is attached to the coordinated shaft 142. Similarly, the passage control plate 150 moves between the pass-through position and the locked position, even though the drive crown 146 remains nested (there is no depression of the manual egress handle 110). FIG. 33 shows the gear train 140 starting in an initial locked position (the manual egress handle 110 is shown as vertical), the passage control plate 150 in the blocking position, and the drive crown 146 nested with the worm wheel 144. When the user presses the unlock button 206 of the actuator unit 200 a signal is sent/received (via the transceivers 124, 224) to unlock the deadbolt lock 50. This causes the worm gear 132 to rotate which causes the worm wheel 144 to rotate. FIG. 34 shows the gear train 140 in a midway rotation position (the manual egress handle 110 is shown as angled), the passage control plate 150 in the pass-through position, and the drive crown 146 nested (FIG. 34C) with the worm wheel 144. Because the drive crown 146 is nested with the worm wheel 144, they both rotate in tandem. This causes the shaft 142 to rotate, which ultimately unlocks the deadbolt lock 50. FIG. 35 shows the gear train 140 in a final unlocked position (the manual egress handle 110 is shown as horizontal), the passage control plate 150 in the pass-through position, and the drive crown 146 nested with the worm wheel 144.

Miscellaneous

When the batteries are drawn down to a low power, Low-Power-Mode will flash the Red "error" LED 101 (FIG. 1), and will only allow users to unlock the deadbolt actuator unit 100, and thereby the deadbolt lock 50. Namely, it does not allow a lock function to take place. When the user does replace the power source 150 (e.g. batteries), the system will determine that a fresh power source 150 was installed, and will exit Low-Power-Mode after it has sampled the power source 150 voltage. Both the deadbolt actuator unit 100 and the actuator unit 200 have this Low-Power-Mode.

FIGS. 50-54 are flowcharts illustrating methods and systems associated with the deadbolt control system. It will be understood that each block of these flowcharts, components of all or some of the blocks of these flowcharts, and/or combinations of blocks in these flowcharts, may be implemented by software (e.g. coding, software, computer program instructions, software programs, subprograms, or other series of computer-executable or processor-executable instructions), by hardware (e.g. processors, memory), by firmware (a variation, subset, or hybrid of hardware and/or software), and/or a combination of these forms. As an example, in the case of software, computer program instructions (computer-readable program code) may be loaded onto a computer to produce a machine, such that the instructions that execute on the computer create structures for implementing the functions specified in the flowchart block or blocks. These computer program instructions may also be stored in a memory that can direct a computer to function in a particular manner, such that the instructions stored in the memory produce an article of manufacture including instruction structures that implement the function specified in the flowchart block or blocks. The computer program instructions may also be loaded onto a computer to cause a series of operational steps to be performed on or by the computer to produce a computer implemented process such that the instructions that execute on the computer provide steps for implementing the functions specified in the flowchart block or blocks. The term "loaded onto a computer" also includes being loaded into the memory of the computer or a memory associated with or accessible by the computer. The term "memory" is defined to include any type of computer (or other technology)-readable media including, but not limited to, attached storage media (e.g. hard disk drives, network disk drives, servers), internal storage media (e.g. RAM, FRAM, ROM), removable storage media (e.g. CDs, DVDs, flash drives, memory cards, floppy disks), and/or other known or yet to be discovered storage media. The term "computer" is meant to include any type of processor, programmable logic device, or other type of known or yet to be discovered programmable apparatus. Accordingly, blocks of the flowcharts support combinations of steps, structures, and/or modules for performing the specified functions. It will also be understood that each block of the flowcharts, and combinations of blocks in the flowcharts, may be divided and/or joined with other blocks of the flowcharts without affecting the scope of the invention. This may result, for example, in computer-readable program code being stored in its entirety on a single memory, or various components of computer-readable program code being stored on more than one memory.

The terms and phrases used herein may have additional definitions and/or examples throughout the specification. Where otherwise not specifically defined, words, phrases, and acronyms are given their ordinary meaning in the art. The following paragraphs provide basic parameters for interpreting terms and phrases used herein.

It should be noted that some terms used in this specification are meant to be relative. For example, some directional terms describe the installed deadbolt interface unit 100. For example, the term "top" is meant to be relative to the term "bottom," the term "front" is meant to be relative to the terms "rear" and "back," and the term "side" is meant to describe a "face" or "view" that connects the "front" and the "back." In relation to the gear train 140, terms such as "inner," "rear," and "down" are used in relation to terms such as "outer," "front," and "up." (The terms "down" and "up" are not entirely accurate, but because of some of the figures' orientation, they have been used). Rotation of the system or component that would change the designation might change the terminology, but not the concept.

The terms "signals," "communications," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "signals," "communications," and/or "transmissions" including, for example, transmitters, receivers, and transceivers (e.g. transceivers 124 and 224). "Signals," "communications," "and/or "transmissions" described herein would use appropriate technology for their intended purpose. For example, hard-wired communications (e.g. wired serial communications) would use technology appropriate for hard-wired communications, short-range wireless communications (e.g. Radiofrequency (RF), Bluetooth, Ultra Wideband (UWB), or infrared or induction wireless) would use technology appropriate for short distance wireless communications, and long-range wireless communications (e.g. WiFi or Cellular) would use technology appropriate for long distance wireless communications. Appropriate security (e.g. SSL or TLS) for each type of communication is included herein. Signals, communications, or other transmissions may be controlled using programs or sub-programs designed for this purpose.

When used in relation to "signals," "communications," and/or "transmissions," the terms "provide" and "providing" (and variations thereof) are meant to include standard means of provision including "transmit" and "transmitting," but can also be used for non-traditional provisions as long as the "signals," "communications," and/or "transmissions" are "received" (which can also mean obtained). The terms "transmit" and "transmitting" (and variations thereof) are meant to include standard means of transmission, but can also be used for non-traditional transmissions as long as the "signals," "communications," and/or "transmissions" are "sent." The terms "receive" and "receiving" (and variations thereof) are meant to include standard means of reception, but can also be used for non-traditional methods of obtaining as long as the "signals," "communications," and/or "transmissions" are "obtained."

The term "associated" (and related terms such as "associate" and "associates") is defined to mean integral or original, retrofitted, attached (physically and/or mechanically), connected (including functionally connected), positioned near, and/or accessible by. For example, the shown deadbolt interface unit 100 is associated with the deadbolt manual egress handle 52 both physically and mechanically. Another example is that the shown deadbolt interface unit 100 is remotely associated (via signals) with the at least one actuator unit 200.

Terms such as "may," "might," "can," and "could" are used to indicate alternatives and optional features and only should be construed as a limitation if specifically included in the claims. For example, although it is indicated that the shown transceiver 124 may communicate with the transceiver 224 using an AES 128-bit encoded RF signal, alternative means of communication may be used, alternative signals may be used, and/or other types of components may be used for communications. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type. For example, the shown "exemplary mechanical connectors" are meant to be examples of mechanical connectors, but other mechanical connectors could be just as desirable.

It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references (including, but not limited to, publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A deadbolt control and security system for preventing rotation of a deadbolt manual egress handle of a deadbolt lock, the deadbolt control and security system comprising:

(a) a deadbolt interface unit having a manual mode and a remote mode;

(b) said deadbolt interface unit comprising:

(i) a deadbolt interface unit manual egress handle;

(ii) a gear train having a shaft coordinated with said deadbolt interface unit manual egress handle;

(iii) a unit-handle coupler that interfaces between said deadbolt manual egress handle and said deadbolt interface unit manual egress handle via said shaft;

(iv) a motor;

(v) a power source; and (vi) a clutch;

(c) at least one actuator unit;

(d) wherein, in said manual mode, only said deadbolt interface unit manual egress handle controls locking and unlocking said deadbolt lock; and (e) wherein, in said remote mode, only said at least one actuator unit controls locking and unlocking said deadbolt lock.

2. The deadbolt control and security system of claim 1, wherein said deadbolt interface unit prevents said deadbolt lock from being unlocked using a key, lock picking tools, bump keys, or other bypass tools.

3. The deadbolt control and security system of claim 1 further comprising:

(a) said manual mode having a manual locking function in which said deadbolt interface unit manual egress handle locks said deadbolt lock;

(b) said manual mode having a manual unlocking function in which said deadbolt interface unit manual egress handle unlocks said deadbolt lock;

(c) said remote mode having a remote locking function in which said at least one actuator unit locks said deadbolt lock; and (d) said remote mode having a remote unlocking function in which said at least one actuator unit unlocks said deadbolt lock.

4. The deadbolt control and security system of claim 1, said unit-handle coupler further comprising:

(a) an adapter;

(b) a coupling lock slide;

(c) a coupling insert functionally connecting said adapter and said coupling lock slide;

(d) said adapter selectively attachable to said deadbolt manual egress handle;

(e) said coupling lock slide coordinated to said shaft; and (f) said coupling insert transmitting torque and accommodating misalignment between said adapter and said coupling lock slide.

5. The deadbolt control and security system of claim 1, said gear train further comprising:

(a) said shaft;

(b) said deadbolt interface unit manual egress handle;

(c) a worm wheel rotated by a worm gear rotated by said motor;

(d) a passage control plate, movement of said deadbolt interface unit manual egress handle controlling movement of said passage control plate; and (e) a drive crown coordinated to said shaft, movement of said passage control plate allowing said drive crown to move independently from said worm wheel.

6. The deadbolt control and security system of claim 1, further comprising:

(a) said deadbolt interface unit manual egress handle comprising:

(i) a gripping portion; and (ii) a downwardly projecting leg;

(b) said gear train further comprising:

(i) said shaft;

(ii) said deadbolt interface unit manual egress handle;

(iii) a worm wheel rotated by a worm gear rotated by said motor;

(iv) a passage control plate, said downwardly projecting leg moving said passage control plate when said deadbolt interface unit manual egress handle is rotated; and (v) a drive crown coordinated to said shaft, movement of said passage control plate allowing said drive crown to move independently from said worm wheel; and (c) wherein rotating said deadbolt interface unit manual egress handle causes said shaft, said unit-handle coupler, and said deadbolt manual egress handle to rotate.

7. The deadbolt control and security system of claim 1, said clutch comprising said motor, a worm gear rotated by said motor, a worm wheel rotated by said worm gear, a drive crown, and a passage control plate, said clutch selectively connecting and disconnecting said drive crown from said worm wheel.

8. The deadbolt control and security system of claim 1, said clutch comprising said motor, a worm gear rotated by said motor, a worm wheel rotated by said worm gear, a drive crown, and a passage control plate, said clutch selectively connecting and disconnecting said drive crown from said worm wheel, wherein said drive crown moves independently of said worm wheel when said worm wheel and said drive crown are disconnected for rotation, and wherein said drive crown and said worm wheel move in tandem when said worm wheel and said drive crown are connected for rotation.

9. The deadbolt control and security system of claim 1, said clutch comprising:

(a) said motor;

(b) a worm gear rotated by said motor;

(c) a worm wheel rotated by said worm gear;

(d) a drive crown;

(e) a passage control plate, movement of said deadbolt interface unit manual egress handle controlling movement of said passage control plate; and (f) said worm wheel and said drive crown connecting or disconnecting in response to movement of said passage control plate;

(g) wherein said drive crown moves independently of said worm wheel when said worm wheel and said drive crown are disconnected for rotation in said manual mode;

(h) wherein said drive crown and said worm wheel move in tandem or are held in place together when said worm wheel and said drive crown are connected for rotation in said remote mode.

10. The deadbolt control and security system of claim 1, further comprising:

(a) said deadbolt interface unit associated with a deadbolt interface unit controller, a deadbolt interface unit transceiver, and a deadbolt interface unit motor driver for driving said motor;

(b) said at least one actuator unit associated with an actuator unit controller and an actuator unit transceiver; and (c) wherein said deadbolt interface unit is remotely associated with the at least one actuator unit via signals between said deadbolt interface unit transceiver and said actuator unit transceiver.

11. The deadbolt control and security system of claim 1, said at least one actuator unit including at least one additional feature selected from the group consisting of:

(a) a vibration motor for providing tactile feedback; and (b) a unique and mutual resettable pairing with said deadbolt interface unit.

12. The deadbolt control and security system of claim 1, said gear train further comprising:

(a) said shaft;

(b) said deadbolt interface unit manual egress handle;

(c) a worm wheel rotated by a worm gear rotated by said motor;

(d) a passage control plate, movement of said deadbolt interface unit manual egress handle controlling movement of said passage control plate; and (e) a drive crown coordinated to said shaft, movement of said passage control plate allowing said manual egress handle to move said drive crown independently away from said worm wheel.

* * * * *